United States Patent
Sakai et al.

(10) Patent No.: US 9,429,791 B2
(45) Date of Patent: Aug. 30, 2016

(54) LIQUID CRYSTAL DISPLAY DEVICE

(71) Applicant: Sharp Kabushiki Kaisha, Osaka-shi, Osaka (JP)

(72) Inventors: Akira Sakai, Osaka (JP); Masahiro Hasegawa, Osaka (JP); Takayuki Nishiyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 172 days.

(21) Appl. No.: 14/374,239

(22) PCT Filed: Jan. 25, 2013

(86) PCT No.: PCT/JP2013/051619
§ 371 (c)(1),
(2) Date: Jul. 24, 2014

(87) PCT Pub. No.: WO2013/111867
PCT Pub. Date: Aug. 1, 2013

(65) Prior Publication Data
US 2014/0368771 A1    Dec. 18, 2014

(30) Foreign Application Priority Data

Jan. 27, 2012  (JP) .................................. 2012-015790
Apr. 17, 2012  (JP) .................................. 2012-093996

(51) Int. Cl.
*G02F 1/13*    (2006.01)
*G02F 1/1335*  (2006.01)
(Continued)

(52) U.S. Cl.
CPC ..... *G02F 1/133528* (2013.01); *G02F 1/13363* (2013.01); *G02F 2001/133541* (2013.01);
(Continued)

(58) Field of Classification Search
CPC .................. G02F 1/13363; G02F 1/133632; G02F 1/133634; G02F 1/133636; G02F 2001/133631; G02F 2001/133633; G02F 2001/133635; G02F 2001/133637; G02F 2001/133638
See application file for complete search history.

(56) References Cited

U.S. PATENT DOCUMENTS

2003/0071952 A1    4/2003    Yoshida et al.
2007/0159585 A1    7/2007    Yoshida et al.
(Continued)

FOREIGN PATENT DOCUMENTS

JP    2002-040428 A    2/2002
JP    2003-186017 A    7/2003
(Continued)

OTHER PUBLICATIONS

Official Communication issued in International Patent Application No. PCT/JP2013/051619, mailed on May 7, 2013.
(Continued)

*Primary Examiner* — Mariceli Santiago
(74) *Attorney, Agent, or Firm* — Keating & Bennett, LLP

(57) ABSTRACT

The present invention provides a liquid crystal display device which can achieve cost reduction, excellent productivity, and a high contrast ratio within a wide viewing angle range. The liquid crystal display device of the present invention includes, in the order set forth, a first polarizer, a first λ/4 plate, a liquid crystal cell, a second λ/4 plate, a third Type-I birefringent layer, a Type-IV birefringent layer, and a second polarizer. An in-plane slow axis of the first λ/4 plate forms an angle of about 45° with an absorption axis of the first polarizer. An in-plane slow axis of the second λ/4 plate is substantially perpendicular to the in-plane slow axis of the first λ/4 plate. An absorption axis of the second polarizer is substantially perpendicular to the absorption axis of the first polarizer. An in-plane slow axis of the third Type-I birefringent layer is substantially parallel with the absorption axis of the second polarizer. The liquid crystal display device displays a black screen by aligning liquid crystal molecules in the liquid crystal layer in the direction substantially vertical to the substrate surface.

15 Claims, 31 Drawing Sheets

(51) Int. Cl.
*G02F 1/13363* (2006.01)
*G02F 1/1337* (2006.01)

(52) U.S. Cl.
CPC .............. *G02F2001/133638* (2013.01); *G02F 2001/133742* (2013.01); *G02F 2413/04* (2013.01); *G02F 2413/06* (2013.01); *G02F 2413/08* (2013.01)

(56) References Cited

U.S. PATENT DOCUMENTS

| | | |
|---|---|---|
| 2010/0289988 A1 | 11/2010 | Sakai et al. |
| 2011/0025966 A1 | 2/2011 | Sakai |
| 2011/0170041 A1 | 7/2011 | Sakai |
| 2011/0181814 A1 | 7/2011 | Sakai |
| 2011/0261297 A1 | 10/2011 | Yoshida et al. |
| 2012/0188492 A1 | 7/2012 | Sakai |
| 2013/0010221 A1 | 1/2013 | Yoshida et al. |

FOREIGN PATENT DOCUMENTS

| | | |
|---|---|---|
| JP | 2003-207782 A | 7/2003 |
| JP | 2008-146003 A | 6/2008 |
| JP | 2008-152220 A | 7/2008 |
| JP | 2008-176260 A | 7/2008 |
| JP | 2009-037049 A | 2/2009 |
| WO | 2009/125515 A1 | 10/2009 |
| WO | 2010/087058 A1 | 8/2010 |
| WO | 2010/137372 A1 | 12/2010 |

OTHER PUBLICATIONS

Ge et al., "13.2: Wide-View Circular Polarizers for Mobile Liquid Crystal Displays", IDRC 08, ISSN1083, 2008, pp. 266-268.

Hirota et al., "Retardation Films with In-Plane Oblique Slow-Axis", IDW '08, fmcP-11, 2008, pp. 1733-1736.

Takahashi et al., "34.2: Viewing-Angle Compensation of IPS and Circularly Polarized VA-LCDs Using a Novel Ultra-Thin Homeotropically Aligned Liquid-Crystalline Polymer Film", SID Digest, 2010, pp. 491-494.

(a)

(b)

(c)

LIQUID CRYSTAL DISPLAY DEVICE

TECHNICAL FIELD

The present invention relates to a liquid crystal display device. The present invention specifically relates to a liquid crystal display device of vertical alignment (VA) mode using a circularly polarizing plate.

BACKGROUND ART

Liquid crystal display devices are widely used as display devices for various information processing apparatuses such as computers and televisions. In particular, TFT-type liquid crystal display devices (hereinafter, also referred to as "TFT-LCDs") come into wide use, and thus further development of the market thereof is expected. This leads to a demand for much improved image quality. The following description takes a TFT-LCD as an example, but the present invention is not limited to TFT-LCDs and can be applied to the whole liquid crystal display devices, such as liquid crystal display devices of simple matrix type and those of plasma address type.

The mode most widely used in TFT-LCDs up to now is a mode in which liquid crystal having positive anisotropy of dielectric constant is horizontally aligned between substrates opposed to each other, that is, a twisted nematic (TN) mode. TN-mode liquid crystal display devices are characterized in that the alignment direction of liquid crystal molecules adjacent to one substrate is twisted with an angle of 90° with the alignment direction of liquid crystal molecules adjacent to the other substrate. An inexpensive production technique is established for such TN-mode liquid crystal display devices, and the TN-mode liquid crystal display devices are industrially mature. However, it is difficult to achieve a high contrast ratio on TN-mode liquid crystal display devices.

On the other hand, liquid crystal display devices of another mode are known in which liquid crystal having negative anisotropy of dielectric constant is vertically aligned between substrates opposed to each other, in other words, VA-mode liquid crystal display devices. In VA-mode liquid crystal display devices, liquid crystal molecules are aligned in the direction substantially vertical to the substrate surface when no voltage is applied, and thus the liquid crystal cell hardly shows birefringence and optical rotation, so that light passes through the liquid crystal cell with the polarization state thereof being hardly changed. Thus, the display device including a pair of polarizers (linear polarizer) disposed on the top and the bottom of a liquid crystal cell such that the absorption axes of the polarizers are perpendicular to each other (hereinafter, also referred to as "crossed-Nicols polarizers") can display a substantially perfectly black screen when no voltage is applied. When a voltage not lower than the threshold voltage is applied (hereinafter, abbreviated as "when a voltage is applied"), the liquid crystal molecules are inclined to be substantially parallel with the substrates, thereby showing a high birefringence and displaying a white screen. Accordingly, such VA-mode liquid crystal display devices can easily achieve a very high contrast ratio.

If the liquid crystal molecules are aligned in one direction when a voltage is applied, such a VA-mode liquid crystal display device suffers asymmetry in viewing angle characteristics. Thus, an alignment-division-type VA mode (what is called a multi-domain VA mode (MVA mode)) is widely used in which the liquid crystal molecules are divided into multiple sections with multiple inclination directions in each pixel by, for example, figuring out a good structure of pixel electrodes or disposing alignment-controlling means such as protrusions in pixels.

In order to maximize the transmittance in the state of displaying a white screen, the MVA-mode liquid crystal display device is designed such that the axis azimuth of a polarizer and the inclination azimuth of liquid crystal molecules when a voltage is applied usually form an angle of 45°. This is because the transmittance in the form of disposing a birefringent medium between crossed-Nicols polarizers is proportional to $\sin^2(2\alpha)$ where $\alpha$ (unit: rad) represents an angle formed by the axis of a polarizer and the slow axis of the birefringent medium. In typical MVA modes, the liquid crystal molecules may be divided into four domains with inclination azimuths of 45°, 135°, 225°, and 315°. Even in such an MVA mode with four divided domains, Schlieren texture or alignment in unexpected directions are observed in many cases at a border of domains or near alignment-controlling means, causing transmittance loss.

In order to solve such problems, a VA-mode liquid crystal display device using a circularly polarizing plate is proposed (for example, see Patent Literature 1). In such a liquid crystal display device, the transmittance with a birefringent medium being disposed between left- and right-handed circularly polarizing plates perpendicular to each other is independent from the angle formed by the axis of a polarizer and the slow axis of the birefringent medium. Thus, even though the liquid crystal molecules are not inclined in an azimuth of 45°, 135°, 225°, or 315°, a desired transmittance can be secured just by controlling the inclination angle of the liquid crystal molecules. Consequently, for example, a circular protrusion may be formed at the center of a pixel so that the liquid crystal molecules are inclined in all the azimuths, or may be inclined in random azimuths without any control of the inclination azimuths. The VA mode using a circularly polarizing plate herein is also referred to as a circularly polarized light VA mode or a circularly polarized light mode. In contrast, the VA mode using a linearly polarizing plate herein is referred to as a linearly polarized light VA mode or a linearly polarized light mode. As is well known, the circularly polarizing plate is typically formed by combination of a linearly polarizing plate and a $\lambda/4$ plate.

Circularly polarized light has a characteristic that the left-handed and right-handed chiralities are changed when the light is reflected on a mirror or the like. For example, when a left-handed circularly polarizing plate is placed on a mirror and light is applied, the light passes through the circularly polarizing plate and is converted into left-handed circularly polarized light, and the light is then reflected on the mirror and converted into right-handed circularly polarized light. The right-handed circularly polarized light cannot pass through the left-handed circularly polarizing plate, so that the circularly polarizing plate is known to have an optical effect of preventing reflection. Such an optical effect of preventing reflection of the circularly polarizing plate prevents unnecessary reflection when a display device is observed in bright environment (e.g. outside). Thus, the circularly polarizing place is known to have an effect of improving the contrast ratio of display devices such as VA-mode liquid crystal display devices in bright environment. The unnecessary reflection herein is considered to occur mainly due to transparent electrodes existing in a display device or metal wiring of TFT elements. If such unnecessary reflection is not prevented, even a display device displaying a substantially perfectly black screen in dark environment provides a large amount of light when displaying a black screen viewed in a bright environment, resulting in reduction in contrast ratio.

As mentioned above, the circularly polarized light VA mode using a circularly polarizing plate can achieve the effect of improving the transmittance and the effect of preventing unnecessary reflection. Still, conventional circularly polarized light VA-mode liquid crystal display devices have a low contrast ratio in inclined viewing angles, and thus fail to give sufficient viewing angle characteristics. Accordingly, such devices require much improvement. Here, various techniques for improving the viewing angle characteristics are proposed using a birefringent layer (phase difference film). For example, Patent Literature 1 discloses the following method (A);
Patent Literature 2 discloses the following method (B);
Patent Literature 3 discloses the following method (C);
Patent Literature 4 discloses the following method (D); and
Non-Patent Literature 1 discloses the following method (E).

(A) A method using two λ/4 plates satisfying nx>ny>nz (B) A method using two λ/4 plates satisfying nx>ny>nz and one or two Type-II birefringent layer(s) satisfying nx<ny≤nz in combination (C) A method using two λ/4 plates satisfying nx>nz>ny and a birefringent layer satisfying nx=ny>nz in combination (D) A method using the components in the method (C) and one or two λ/2 plate(s) satisfying nx>nz>ny in combination (E) A method using two uniaxial λ/4 plates (satisfying nx>ny=nz, what is called A plates), a birefringent layer satisfying nx=ny>nz, and a birefringent layer satisfying nx>nz>ny in combination However, the methods (A), (B), and (C) still require improvement in viewing angle characteristics. The methods (C), (D), and (E) require a biaxial phase difference film satisfying nx>nz>ny (satisfying 0<Nz<1), which is difficult to produce and costs high. The methods require further improvement in this respect.

The present inventors have performed various studies for solving the above problems, and proposed the following method (F) (see Patent Literature 5).

(F) A method using two λ/4 plates, a Type-III birefringent layer satisfying nx=ny>nz, a Type-I birefringent layer satisfying nx>ny≥nz, and a Type-II birefringent layer satisfying nx<ny≤nz The method (F) improves the viewing angle characteristics by optimally designing the Nz coefficients (parameters representing the biaxiality) of two λ/4 plates. However, it requires further improvement in viewing angle characteristics under the design condition of two general biaxial λ/4 plates satisfying nx>ny≥nz (Nz≥1.0).

Accordingly, the present inventors have further studied to find out the following: by preparing biaxial λ/4 plates satisfying nx>ny≥nz as the two λ/4 plates (first and second λ/4 plates), by adjusting the Nz coefficients thereof to substantially the same values, and by disposing a birefringent layer satisfying nx<ny≤nz at least between the first λ/4 plate and the first polarizer or between the second λ/4 plate and the second polarizer, a circularly polarized light VA-mode liquid crystal display device having a high contrast ratio in a wide viewing-angle range can be easily produced. The present inventors have filed a patent application relating to this method (see Patent Literature 6 and 7).

For production of a circularly polarizing plate, one method is disclosed in which a polarizing plate is produced by a roll-to-roll technique using a λ/4 plate having an in-plane slow axis in the direction diagonal to the flowing direction (machine direction) (for example, see Non-Patent Literature 2). This method allows for adjusting the Nz coefficient of the λ/4 plate to 1.1 to 2.0.

For the circularly polarizing plate, documents disclose that the viewing angle characteristics of a liquid crystal display panel including a liquid crystal layer having a phase difference Δnd of 260 nm can be improved using a λ/4 plate having an Nz coefficient of 2.1, a λ/4 plate having an Nz coefficient of 1.6, a birefringent layer having a phase difference Rth in the perpendicular direction of 300 nm and satisfying nz>nx=ny, and a biaxial phase difference film having an in-plane phase difference of 110 nm and an Nz coefficient of 1.4 (for example, see Non-Patent Literature 3).

CITATION LIST

Patent Literature

Patent Literature 1: JP 2002-40428 A
Patent Literature 2: JP 2009-37049 A
Patent Literature 3: JP 2003-207782 A
Patent Literature 4: JP 2003-186017 A
Patent Literature 5: WO 2009/125515
Patent Literature 6: WO 2010/087058
Patent Literature 7: WO 2010/137372
Patent Literature 8: JP 2008-146003 A Non-Patent Literature Non-Patent Literature 1: Zhibing Ge, and 6 others, "Wide-View Circular Polarizers for Mobile Liquid Crystal Displays", IDRC08, 2008, p. 266-268

Non-Patent Literature 2: M. Hirota, and 4 others, "Retardation Films with In-Plane Oblique Slow-Axis", IDW'08, 2008, p. 1733-1736

Non-Patent Literature 3: Y. Takahashi, and 3 others, "Viewing-Angle Compensation of IPS and Circularly Polarized VA-LCDs Using a Novel Ultra-Thin Homeotropically Aligned Liquid-Crystalline", SID2010, 2010, p. 491-494

SUMMARY OF INVENTION

Technical Problem

As mentioned above, a circularly polarizing plate is typically formed by combination of a linearly polarizing plate and a λ/4 plate. In this case, the absorption axis of the linearly polarizing plate and the in-plane slow axis of the λ/4 plate need to form an angle of about 45°. Thus, in order to improve the productivity, one method of producing a circularly polarizing plate is currently developed in which a λ/4 plate stretched in an oblique direction, a uniaxially stretched polarizer, and a protection film (e.g. a TAC film) are stacked by a roll-to-roll technique. Further, a λ/4 plate with an Nz coefficient of about 1.6 and a circularly polarizing plate including this λ/4 plate are commercially available.

However, a λ/4 plate with a high Nz coefficient may cause difficulty in production of a circularly polarizing plate by a roll-to-roll technique. For example, even a technique in Non-Patent Literature 2 fails to provide a circularly polarizing plate including a λ/4 plate having an Nz coefficient of higher than 2.0. Thus, a λ/4 plate having a high Nz coefficient may cause reduction in productivity of a circularly polarizing plate and an increase in production cost. In the case of producing a circularly polarizing plate including a λ/4 plate having a high Nz coefficient by a roll-to-roll technique, the quality thereof may be poor.

Even the techniques in Patent Literature 6 and 7 may give high Nz coefficients to first and second λ/4 plates in accordance with the conditions such as the phase difference of a liquid crystal layer, the presence of a Type-III birefringent layer, and the phase difference of a Type-III birefringent layer. If this is the case, substantially the same Nz coefficients of the first and second λ/4 plates may cause reduction in productivity, increase in production cost, and reduction in quality of two circularly polarizing plates on the top and the bottom. For example, production of two circularly polarizing plates on the top and the bottom by batch treatment (sheet-by-sheet treatment) causes marked reduction in productivity. Reduction in quality of a circularly polarizing plate results in deterioration in viewing angle characteristics of a circularly polarized light VA-mode liquid crystal display device.

If no Type-III birefringent layer is disposed in the techniques of Patent Literature 6 and 7, the liquid crystal layer needs compensation of the absence of a Type-III birefringent layer by adjusting the Nz coefficients of the first and second λ/4 plates. Further, a circularly polarizing plate on the viewing side of a liquid crystal cell usually has various surface-treated layers. Thus, when the phase difference of a liquid crystal layer is changed, the two circularly polarizing plates on the top and the bottom are required to be re-produced in accordance with the phase difference of the liquid crystal layer and the types of the surface-treated layers. This prevents mass production of small kinds of articles, and causes disadvantages in cost and productivity. Further, this may prevents a shift to mass production. Thus, the techniques in Patent Literature 6 and 7 need further improvement in cost reduction and an increase in productivity. In the present description, the circularly polarizing plate disposed on the viewing side of a liquid crystal cell is also referred to as a viewing-side circularly polarizing plate, and a circularly polarizing plate disposed on the back side of a liquid crystal cell is also referred to as a back-side circularly polarizing plate.

The present invention is devised in consideration of the above situations, and aims to provide a liquid crystal display device which can achieve cost reduction, excellent productivity, and a high contrast ratio within a wide viewing angle range.

Solution to Problem

The present inventors have performed various studies on a liquid crystal display device which allows for cost reduction, is excellent in productivity, and achieves a high contrast ratio within a wide viewing angle range, and they have focused on the phase difference condition of a birefringent layer disposed between a pair of polarizers (first and second polarizers) in a crossed-Nicols state. Then, they have found that light leakage in the state of displaying a black screen can be suppressed within a wide viewing angle range and a high contrast ratio can be achieved by preparing biaxial λ/4 plates satisfying nx>ny≥nz (the "birefringent layer satisfying nx>ny≥nz" herein is defined as a Type-I birefringent layer) as the two λ/4 plates (first and second λ/4 plates) and disposing a birefringent layer satisfying nx<ny≤nz (the "birefringent layer satisfying nx<ny≤nz" herein is defined as a Type-II birefringent layer) between the first λ/4 plate and the first polarizer. The present inventors have further found the following: that is, even though the sum of the Nz coefficients of the first and second λ/4 plates is high, giving different Nz coefficients to the plates allows for production of a circularly polarizing plate including a λ/4 plate with a smaller Nz coefficient by a high-productivity method (e.g. a method using a roll-to-roll technique). In addition, the circularly polarizing plate including a λ/4 plate with a smaller Nz coefficient may be a commercially available circularly polarizing plate. Then, they have found the following: that is, because the Nz coefficients of the first and second λ/4 plate can be adjusted separately, the Nz coefficients can be very flexibly adjusted corresponding to design changes such as changes in phase difference of a liquid crystal layer and in the type of a surface-treated layer. More specifically, for example, when the phase difference of a liquid crystal layer is changed, the liquid crystal layer can be compensated by adjusting only the Nz coefficient of one λ/4 plate. In such a case, the liquid crystal layer may also be compensated by adjusting only the Nz coefficient of one λ/4 plate and disposing a Type-III birefringent layer having an appropriate phase difference on the circularly polarizing plate including the λ/4 plate. In other words, just a design change of one circularly polarizing plate makes it possible to manage a change in the phase difference of the liquid crystal layer. Furthermore, the present inventors have found that a Type-II birefringent layer is not necessarily a single layer, and may be replaced by a stacked article of birefringent layers having substantially the same polarization conversion function (for example, a stacked article of a birefringent layer satisfying nx>ny≥nz (Type-I birefringent layer) and a birefringent layer satisfying nx≈ny≤nz (the "birefringent layer satisfying nx≈ny≤nz" herein is defined as a Type-IV birefringent layer).

Non-Patent Literature 3 discloses an example of a liquid crystal display panel including a birefringent layer similar to the Type-IV birefringent layer, but just discloses an example where the phase difference of a liquid crystal layer is 260 nm. Then, the document fails to disclose that optimal values of the Nz coefficient of a λ/4 plate and the phase difference of a birefringent layer satisfying nz>nx=ny depend on the phase difference of the liquid crystal layer. The phase difference of 260 nm is smaller than the usually set value of λ/2 (the half of a wavelength 550 nm). Thus, even if liquid crystal molecules perfectly fall when a voltage is applied, the maximum transmittance may not be achieved. In accordance with the studies by the present inventors, an appropriate phase difference of a liquid crystal layer for maximum transmittance is 275 nm or greater. Given that the liquid crystal molecules do not perfectly fall when a voltage is applied, this value is more preferably 290 nm or greater. Non-Patent Literature 3 only discloses an example of a biaxial phase difference film with an Nz coefficient of 1.4; still, in accordance with the studies by the present inventors, the Nz coefficient of a biaxial phase difference film may not be 1.4. In this case, optimal values of the phase difference of a biaxial phase difference film and a phase difference of a birefringent layer satisfying nz>nx=ny depend on the Nz coefficient of the biaxial phase difference film.

Non-Patent Literature 3 discloses an example of a liquid crystal display panel including a birefringent layer similar to the Type-IV birefringent layer in addition to the λ/4 plate. Still, the order of stacking the birefringent layers is different from that in a second liquid crystal display device of the present invention to be mentioned later, and thus the mechanism of optical compensation is quite different from each other. As a result, optimal values of the phase difference parameters, axis angles, and the like are quite different from each other.

Finally, the present inventors have arrived at the solution of the above problems and have completed the present invention.

In other words, the present invention relates to a liquid crystal display device including, in the order set forth: a first polarizer; a first Type-I birefringent layer with an in-plane phase difference thereof being adjusted to λ/4 (hereinafter, also referred to as a "first λ/4 plate"); a liquid crystal cell including a pair of substrates opposed to each other and a liquid crystal layer disposed between the pair of substrates; a second Type-I birefringent layer with an in-plane phase difference thereof being adjusted to λ/4 (hereinafter, also referred to as a "second λ/4 plate"); a Type-IV birefringent layer; a third Type-I birefringent layer; and a second polarizer, where the Type-I birefringent layer is a birefringent layer satisfying nx>ny≥nz, and the Type-IV birefringent layer is a birefringent layer satisfying nx≈ny≤nz, an in-plane slow axis of the first Type-I birefringent layer forming an angle of about 45° with an absorption axis of the first polarizer, an in-plane slow axis of the second Type-I birefringent layer being substantially perpendicular to the in-plane slow axis of the first Type-I birefringent layer, an absorption axis of the second polarizer being substantially perpendicular to the absorption axis of the first polarizer, an in-plane slow axis of the third Type-I birefringent layer being substantially perpendicular to the absorption axis of the second polarizer, the liquid crystal cell satisfying a phase difference Rlc in the perpendicular direction of 275 nm or greater, and the liquid crystal display device displaying a black screen by aligning liquid crystal molecules in the liquid crystal layer in the direction substantially vertical to the substrate surface (hereinafter, also referred to as a first liquid crystal display device of the present invention).

The present invention also relates to a liquid crystal display device including, in the order set forth: a first polarizer; a first Type-I birefringent layer with an in-plane phase difference thereof being adjusted to λ/4 (hereinafter, also referred to as a "first λ/4 plate"); a liquid crystal cell including a pair of substrates opposed to each other and a liquid crystal layer disposed between the pair of substrates; a second Type-I birefringent layer with an in-plane phase difference thereof being adjusted to λ/4 (hereinafter, also referred to as a "second λ/4 plate"); a third Type-I birefringent layer; a Type-IV birefringent layer; and a second polarizer, where the Type-I birefringent layer is a birefringent layer satisfying nx>ny≥nz, and the Type-IV birefringent layer is a birefringent layer satisfying nx≈ny≤nz, an in-plane slow axis of the first Type-I birefringent layer forming an angle of about 45° with an absorption axis of the first polarizer, an in-plane slow axis of the second Type-I birefringent layer being substantially perpendicular to the in-plane slow axis of the first Type-I birefringent layer, an absorption axis of the second polarizer being substantially perpendicular to the absorption axis of the first polarizer, an in-plane slow axis of the third Type-I birefringent layer being substantially parallel with the absorption axis of the second polarizer, and the liquid crystal display device displaying a black screen by aligning liquid crystal molecules in the liquid crystal layer in the direction substantially vertical to the substrate surface (hereinafter, also referred to as a second liquid crystal display device of the present invention).

The term "polarizer" herein means an element having a function of converting natural light into linearly polarized light, and is synonymous with a polarizing film. The term "birefringent layer" is a layer having optical anisotropy, and is synonymous with a phase difference film, a retarder, optically anisotropic layer, a birefringent medium, and the like. The term "birefringent layer" herein means one in which one of the absolute values of the in-plane phase difference R and the phase difference Rth in the perpendicular direction to be mentioned later is 10 nm or greater, preferably 20 nm or greater, from the viewpoint of sufficiently achieving the effects of the present invention. As mentioned above, the term "Type-I birefringent layer" herein means a birefringent layer satisfying nx>ny≥nz, and the term "Type-II birefringent layer" herein means a birefringent layer satisfying nx<ny≤nz. Here, nx and ny represent principal refractive indices in the in-plane direction for light having a wavelength of 550 nm, and nz represents a principal refractive index in the out-of-plane direction (perpendicular direction) for light having a wavelength of 550 nm.

The term "in-plane phase difference R" herein means an in-plane phase difference (unit: nm) defined as $R=|nx-ny| \times d$, where nx and ny represent the principal refractive indices in the in-plane direction of birefringent layers (including liquid crystal cell and λ/4 plate), nz represents the principal refractive index in the out-of-plane direction (perpendicular direction), and d represents the thickness of a birefringent layer. The term "phase difference Rth in the perpendicular direction" means an out-of-plane (perpendicular direction) phase difference (unit: nm) defined as $Rth=(nz-(nx+ny)/2) \times d$. The term "λ/4 plate" means a layer having optical anisotropy with a substantially ¼ wavelength (this is precisely 137.5 nm, but it is at least higher than 115 nm and lower than 160 nm) for light having a wavelength of 550 nm, and is synonymous with a λ/4 phase difference film and a λ/4 retarder.

The term "in-plane slow axis (fast axis)" means the direction of principal dielectric axis (direction of x axis or y axis) corresponding to the principal refractive index ns (nf) where ns represents a larger one of the in-plane principal refractive indices nx and ny, and nf represents a smaller one thereof. The term "Nz coefficient" means a parameter representing the degree of biaxiality of a birefringent layer defined as $Nz=(ns-nz)/(ns-nf)$. Unless otherwise mentioned, the measurement wavelength for principal refractive indices and phase differences herein is 550 nm. Even though having the same Nz coefficient, birefringent layers having different average refractive indices ($=(nx+ny+nz)/3$) have different effective phases against light incident in an oblique direction due to an angle of refraction, causing a complicated design guideline. In order to avoid this problem, the average refractive index of each birefringent layer is set to 1.5 unless otherwise mentioned, and thereby calculating the Nz coefficient. For birefringent layers having an actual average refractive index of not 1.5, the index is converted on the assumption that the average refractive index is 1.5. The same shall apply to the phase difference Rth in the perpendicular direction. The phrase "the first Type-I birefringent layer and the second Type-I birefringent layer have different Nz coefficients" herein means that the difference between the Nz coefficients is 0.1 or greater, preferably 0.3 or greater.

The phrase "the in-plane slow axis of the first Type-I birefringent layer and the absorption axis of the first polarizer form an angle of about 45°" herein at least means that the angle formed by the in-plane slow axis of the first Type-I birefringent layer and the absorption axis of the first polarizer is 40° to 50°, and particularly preferably 45°. Even if the relative angle between the in-plane slow axis of the first Type-I birefringent layer and the absorption axis of the first polarizer is not perfectly 45°, substantially perpendicular placement of the in-plane slow axis of the first Type-I birefringent layer and the in-plane slow axis of the second Type-I birefringent layer provides a sufficient effect of preventing light leakage in the normal direction to the substrate surface. For prevention of reflection and improvement in transmittance, the relative angle of 45° can provide marked effects. The phrase "the in-plane slow axis of the second Type-I birefringent layer is substantially perpendicular to the in-plane slow axis of the first Type-I birefringent layer" at least means that the in-plane slow axis of the second Type-I birefringent layer and the in-plane slow axis of the first Type-I birefringent layer form an angle of 88° to 92°, particularly preferably 90°. The phrase "the absorption axis of the second polarizer is substantially perpendicular to the absorption axis of the first polarizer" at least means that the absorption axis of the second polarizer and the absorption axis of the first polarizer form an angle of 88° to 92°, particularly preferably 90°. The phrase "the in-plane slow axis of the third Type-I birefringent layer is substantially perpendicular to the absorption axis of the second polarizer" at least means that the in-plane slow axis of the third Type-I birefringent layer and the absorption axis of the second polarizer form an angle of 88° to 92°, particularly preferably 90°. The phrase "the in-plane slow axis of the third Type-I birefringent layer is substantially parallel with the absorption axis of the second polarizer" at least means that the in-plane slow axis of the third Type-I birefringent layer and the absorption axis of the second polarizer form an angle of 0±2°, particularly preferably 0°.

The first liquid crystal display device of the present invention is not especially limited by other members as long as it includes as components the aforementioned first polarizer, first Type-I birefringent layer, liquid crystal cell, second Type-I birefringent layer, Type-IV birefringent layer, third Type-I birefringent layer, and second polarizer. In order to surely change the polarization state of display light to be mentioned later, the first liquid crystal display device of the present invention is preferably in a mode in which the liquid crystal display device includes no birefringent medium between the first polarizer and the second polarizer other than the aforementioned first Type-I birefringent layer, liquid crystal cell, second Type-I birefringent layer, Type-IV birefringent layer, and third Type-I birefringent layer. In order to reduce the number of birefringent layers used in the liquid crystal display device to cut the cost, the first liquid crystal display device of the present invention is more preferably in a mode in which the liquid crystal display device includes no birefringent medium other than the aforementioned first polarizer, first Type-I birefringent layer, liquid crystal cell, second Type-I birefringent layer, Type-IV birefringent layer, third Type-I birefringent layer, and second polarizer. In contrast, the liquid crystal display device may include a birefringent medium in addition to the aforementioned first polarizer, first Type-I birefringent layer, liquid crystal cell, second Type-I birefringent layer, Type-IV birefringent layer, third Type-I birefringent layer, and second polarizer. For example, the liquid crystal display device may include a λ/2 plate with the in-plane phase difference thereof being adjusted to λ/2 for the purpose of adjusting the wavelength dispersibility of layers such as birefringent layers.

The second liquid crystal display device of the present invention is not especially limited by other members as long as it includes as components the aforementioned first polarizer, first Type-I birefringent layer, liquid crystal cell, second Type-I birefringent layer, third Type-I birefringent layer, Type-IV birefringent layer, and second polarizer. In order to surely change the polarization state of display light to be mentioned later, the second liquid crystal display device of the present invention is preferably in a mode in which the liquid crystal display device includes no birefringent medium between the first polarizer and the second polarizer other than the aforementioned first Type-I birefringent layer, liquid crystal cell, second Type-I birefringent layer, third Type-I birefringent layer, and Type-IV birefringent layer. In order to reduce the number of birefringent layers used in the liquid crystal display device to cut the cost, the second liquid crystal display device of the present invention is more preferably in a mode in which the liquid crystal display device includes no birefringent medium other than the aforementioned first polarizer, first Type-I birefringent layer, liquid crystal cell, second Type-I birefringent layer, third Type-I birefringent layer, Type-IV birefringent layer, and second polarizer. In contrast, the liquid crystal display device may include a birefringent medium in addition to the aforementioned first polarizer, first Type-I birefringent layer, liquid crystal cell, second Type-I birefringent layer, third Type-I birefringent layer, Type-IV birefringent layer, and second polarizer. For example, the liquid crystal display device may include a λ/2 plate with the in-plane phase difference thereof being adjusted to λ/2 for the purpose of adjusting the wavelength dispersibility of layers such as birefringent layers.

The present inventors have further found that the factor that prevents display of a perfectly black screen depends on the azimuth. Then, they have found that optical retardation compensation can be performed in multiple directions by disposing a birefringent layer satisfying nx≈ny>nz (the "birefringent layer satisfying nx≈ny>nz" herein is defined as a Type-III birefringent layer) between the first and second λ/4 plates. In a mode where a Type-III birefringent layer is disposed, adjustment of the phase difference value of the Type-III birefringent layer first optimizes the conditions for optical retardation compensation in an azimuth of 0°, and appropriate placement of the phase difference values of the Type-I birefringent layer and the Type-IV birefringent layer then optimizes the conditions for optical retardation compensation in an azimuth of 45° without changing the optimized conditions for optical retardation compensation in an azimuth of 0°, resulting in suppression of light leakage in oblique directions in the state of displaying a black screen within a wider azimuth range. This consequently leads to a high contrast ratio within a wide viewing angle range in relation to both the azimuth and the polar angle. Further, the Type-III birefringent layer can be produced by an easy method using a material having appropriate intrinsic birefringence unlike a biaxial phase difference film adjusted to nx>nz>ny (0<Nz<1). The term "azimuth" herein means a direction in parallel with the substrate surface of the liquid crystal cell ranging from 0 to 360°. The term "polar angle" herein means an angle of inclination from the normal direction of the substrate surface of the liquid crystal cell ranging from 0 to 90°.

In other words, the liquid crystal display devices of the present invention each may further include at least one Type-III birefringent layer at least between the first Type-I birefringent layer and the liquid crystal cell or between the liquid crystal cell and the second Type-I birefringent layer. The Type-III birefringent layer is particularly suitably used in the case where the first Type-I birefringent layer and the second Type-I birefringent layer satisfy the average value of the Nz coefficients of smaller than 2.00. The Type-III birefringent layer is preferably disposed adjacent to the liquid crystal cell. The phrase "disposed adjacent to" herein means that no birefringent medium is disposed between the Type-III birefringent layer and the liquid crystal cell. For example, this includes a mode in which an isotropic film is disposed between the Type-III birefringent layer and the liquid crystal cell. In the case of disposing multiple Type-III birefringent layers, preferably, at least one of the multiple Type-III birefringent layers is disposed adjacent to the liquid crystal cell and the respective Type-III birefringent layers are disposed adjacent to each other.

The expression "nx≈ny" for the Type-III birefringent layer and the Type-IV birefringent layer may also be referred to as "|nx−ny|≈0", and this specifically represents that the in-plane phase difference R (=|nx−ny|×d) is lower than 20 nm, preferably lower than 10 nm. Whether the Type-III birefringent layer consists of multiple layers or of a single layer, the characteristics about the transmitted light intensity of the liquid crystal display device are theoretically completely the same as long as the Type-III birefringent layer(s) is/are disposed on an inner side of the first λ/4 plate and the second λ/4 plate (on the side of the liquid crystal cell) and the sum of the phase differences in the perpendicular direction is the same value. Even though the liquid crystal display device actually includes no Type-III birefringent layer, it theoretically causes no problem to assume that the display device includes a Type-III birefringent layer having a phase difference in the perpendicular direction of 0. Thus, unless otherwise mentioned, the present description only refers to a liquid crystal display device including one Type-III birefringent layer disposed between the first λ/4 plate and the liquid crystal cell as the first or second liquid crystal display device of the present invention for the purpose of simplification.

Typical examples of the polarizer include those prepared by allowing an anisotropic material having dichroism, such as iodine complexes to adsorb and align on a polyvinyl alcohol (PVA) film. Usually, protection films such as triacetyl cellulose (TAC) films are laminated on both sides of a PVA film to secure the mechanical strength and the wet and heat resistance, and the film thereby produced is put into practical use. Still, the term "polarizer" herein means only an element having a function of polarizing light and including no protection film, unless otherwise mentioned. In the case where either of the first and second polarizers is a polarizer (polarizer on the back side) and the other is an analyzer (polarizer on the viewing side), and vice versa, the liquid crystal display device shows theoretically completely the same characteristics about the transmitted light intensity. In other words, one of the first and second Type-I birefringent layers may be disposed on the viewing side of the liquid crystal cell.

In general, however, applications and a demand from users require production of various types of viewing-side circularly polarizing plates with different surface-treated layers. Thus, viewing-side circularly polarizing plates preferably have a simple structure with higher productivity than the back-side circularly polarizing plates. In contrast, the back-side circularly polarizing plates usually require no surface treatment, so that production of only one type thereof is sufficient. Thus, slight complication of the structure of the back-side circularly polarizing plates has relatively less influence on mass production thereof. In consideration of this situation, it is preferable to dispose a Type-I birefringent layer with a higher Nz coefficient (=a birefringent layer which is more difficult to produce by a method with high productivity) on the back side of the liquid crystal cell and to dispose a Type-I birefringent layer with a lower Nz coefficient (=a birefringent layer which is easier to produce by a method with high productivity) on the viewing side of the liquid crystal cell. From the same viewpoint, a Type-III birefringent layer is more preferably disposed only on the back side of the liquid crystal cell.

When the phase difference (Δnd) of the liquid crystal layer is changed in the mode of including a Type-III birefringent layer, this change is usually dealt with by adjusting the phase difference of the Type-III birefringent layer. However, if the Type-III birefringent layer is disposed on the viewing-side circularly polarizing plate, the problem of an increase in the number of types is further accelerated in combination with the problem of an increase in the number of types due to difference in surface treatment. Thus, the Type-III birefringent layer is particularly preferably disposed on the back-side circularly polarizing plate. For example, with respect to five types of surface treatments and four types of phase differences of liquid crystal layers, disposing a Type-III birefringent layer on the viewing-side circularly polarizing plate causes 20 (5×4) types of viewing-side circularly polarizing plates and one type of a back-side circularly polarizing plate, resulting in 21 types of circularly polarizing plates. In contrast, disposing a Type-III birefringent layer on the back-side circularly polarizing plate causes five types of viewing-side circularly polarizing plates and four types of back-side circularly polarizing plates, resulting in merely nine types of circularly polarizing plates.

From this viewpoint, one of the first and second Type-I birefringent layers with a greater Nz coefficient is preferably disposed on the back side of the liquid crystal cell. With the first Type-I birefringent layer having a greater Nz coefficient than the second Type-I birefringent layer, the first or second liquid crystal display device of the present invention preferably further includes a surface-treated layer on the viewing side of the second polarizer. Then, the at least one Type-III birefringent layer is preferably disposed on the back side of the liquid crystal cell. In this case, more preferably, the first Type-I birefringent layer has a greater Nz coefficient than the second Type-I birefringent layer, and the first Type-I birefringent layer is disposed on the back side of the liquid crystal cell.

Unless otherwise mentioned, the description only refers to a liquid crystal display device whose first polarizer is a polarizer for simplification.

The liquid crystal cell includes a pair of substrates opposed to each other and a liquid crystal layer disposed between the pair of substrates. The liquid crystal cell in the present invention is a liquid crystal cell of vertical alignment (VA) mode in which liquid crystal molecules in the liquid crystal layer is aligned in the direction substantially vertical to the substrate surface to display a black screen. Examples of the VA mode include a multi-domain VA (MVA) mode, ultra violet-induced VA (UV2A) mode, continuous pinwheel alignment (CPA) mode, patterned VA (PVA) mode, biased VA (BVA) mode, reverse TN (RTN) mode, and in-plane switching-VA (IPS-VA) mode. The phrase "liquid crystal molecules are aligned in the direction substantially vertical to the substrate surface" herein at least means that the liquid crystal molecules have an average pre-tilt angle of 80° or greater.

The first liquid crystal display device of the present invention includes a first Type-I birefringent layer (first λ/4 plate) with an in-plane phase difference thereof being adjusted to λ/4, a second Type-I birefringent layer (second λ/4 plate) with an in-plane phase difference thereof being adjusted to λ/4, a third Type-I birefringent layer, and a Type-IV birefringent layer between the first polarizer and the second polarizer. The Type-IV birefringent layer and the third Type-I birefringent layer may be disposed on either the viewing side or the back side of the liquid crystal cell. Still, disposing the Type-IV birefringent layer and the third Type-I birefringent layer on the back side of the liquid crystal cell provides an advantage of improved productivity. As mentioned above, the first liquid crystal display device of the present invention may further include a Type-III birefringent layer between the first polarizer and the second polarizer. In order to achieve further cost reduction, the first liquid crystal display device of the present invention preferably includes no Type-III birefringent layer between the first Type-I birefringent layer and the liquid crystal cell nor between the liquid crystal cell and the second Type-I birefringent layer. When the phase difference (Δnd) of the liquid crystal layer is changed in the mode of including no Type-III birefringent layer, it is preferable to adjust the Nz coefficient of the λ/4 plate with a greater Nz coefficient. Thereby, a circularly polarizing plate including the λ/4 plate with a smaller Nz coefficient (=a λ/4 plate which is easier to produce by a method with higher productivity) can be shared by various liquid crystal cells including liquid crystal layers with different phase differences.

The second liquid crystal display device of the present invention includes a first Type-I birefringent layer (first λ/4 plate) with an in-plane phase difference thereof being adjusted to λ/4, a second Type-I birefringent layer (second λ/4 plate) with an in-plane phase difference thereof being adjusted to λ/4, a third Type-I birefringent layer, and a Type-IV birefringent layer between the first polarizer and the second polarizer. The third Type-I birefringent layer and the Type-IV birefringent layer may be disposed on either the viewing side or the back side of the liquid crystal cell. Still, disposing the third Type-I birefringent layer and the Type-IV birefringent layer on the back side of the liquid crystal cell provides an advantage of improved productivity. As mentioned above, the second liquid crystal display device of the present invention may further include a Type-III birefringent layer between the first polarizer and the second polarizer. In order to achieve further cost reduction, the second liquid crystal display device of the present invention preferably includes no Type-III birefringent layer between the first Type-I birefringent layer and the liquid crystal cell nor between the liquid crystal cell and the second Type-I birefringent layer. When the phase difference (Δnd) of the liquid crystal layer is changed in the mode of including no Type-III birefringent layer, it is preferable to adjust the Nz coefficient of the λ/4 plate with a greater Nz coefficient. Thereby, a circularly polarizing plate including the λ/4 plate with a smaller Nz coefficient (=a λ/4 plate which is easier to produce by a method with higher productivity) can be shared by various liquid crystal cells including liquid crystal layers with different phase differences.

The Nz coefficient of the first Type-I birefringent layer, the Nz coefficient of the second Type-I birefringent layer, and the Nz coefficient of the third Type-I birefringent layer may individually be adjusted as appropriate, and these values may be the same as or different from each other. Still, different Nz values make it possible to employ a method of producing a circularly polarizing plate with high productivity as mentioned above. The Nz coefficients are each preferably greater than 1. More preferably, one of the first Type-I birefringent layer and the second Type-I birefringent layer has an Nz coefficient of 2 or greater, and the other of the first Type-I birefringent layer and the second Type-I birefringent layer has an Nz coefficient of not smaller than 1 but smaller than 2. This allows for production of a λ/4 plate with a smaller Nz coefficient by a technique with very excellent productivity (for example, the technique disclosed in Non-Patent Literature 2). Further, a commercially available λ/4 plate (multi-purpose article) with an Nz coefficient of about 1.6 can be used as a λ/4 plate with a smaller Nz coefficient.

Thus, a commercially available circularly polarizing plate can be used as a circularly polarizing plate including a λ/4 plate with a smaller Nz coefficient. Various circularly polarizing plates undergone different surface treatments are commercially available. As mentioned here, adjusting the Nz coefficient of one of the λ/4 plates interposing the liquid crystal cell to not smaller than 1 but smaller than 2 leads to great reduction in cost of the circularly polarizing plate including this λ/4 plate and marked improvement in productivity. Further, adjusting the Nz coefficient of one of the λ/4 plates interposing the liquid crystal cell to not smaller than 1 but smaller than 2 and adjusting the Nz coefficient of the other of the λ/4 plates interposing the liquid crystal cell to not smaller than 2 make it easy to set the average value Nzq of the Nz coefficients of the first and second λ/4 plates within a preferable range. The circularly polarizing plate including a λ/4 plate with a greater Nz coefficient may not be produced by a production technique with high productivity, such as a roll-to-roll technique. Still, this has an influence only on the circularly polarizing plate on the viewing side or the back side, and the degree of such influence is rather smaller than in the case of having an influence on both of the circularly polarizing plates.

The combination of the first λ/4 plate and/or the second λ/4 plate and the Type-III birefringent layer is preferably a stacked article without using an adhesive. Such a stacked article may be produced by, for example, a method of extruding sheets by co-extrusion or the like process and simultaneously stacking the sheets using an adhesive; a method of forming one birefringent layer in a stacked article from a polymer film and then applying the material of the other birefringent layer, such as a liquid crystalline material or a non-liquid crystalline material, on the polymer film to form or transfer and stack the other birefringent layer. For the latter applying or transferring method, the Type-III birefringent layer is produced by a method of applying a non-liquid crystalline material (e.g. polyimide) or a liquid crystalline material (e.g. cholesteric liquid crystal) in many cases. Thus, this method can be suitably used for producing a stacked article of the first λ/4 plate and/or the second λ/4 plate and the Type-III birefringent layer.

With the first liquid crystal display device of the present invention, light incident on the first polarizer in the front direction is converted into linearly polarized light by the first polarizer, and then converted from the linearly polarized light into circularly polarized light by the first λ/4 plate. The circularly polarized light passes through the Type-III birefringent layer and the liquid crystal cell while maintaining the polarization state, and the circularly polarized light is re-converted by the second λ/4 plate which is substantially perpendicular to the first λ/4 plate into linearly polarized light that is the same one as immediately after passing through the first polarizer. The linearly polarized light passes through the type-IV birefringent layer and third Type-I birefringent layer while maintaining the polarization state. Then, the linearly polarized light is shielded by the second polarizer which is substantially perpendicular to the first polarizer, whereby the display device displays a good black screen. In other words, the Type-III birefringent layer, the Type-IV birefringent layer, and the third Type-I birefringent layer do not aim to convert the polarization state of incident light in the front direction.

The above description shows how the display device displays a black screen by tracing the polarization state which changes as the light passes through the respective layers. Intuitively, this can be understood by the following description. In other words, the first liquid crystal display device of the present invention displays a good black screen by crossed-Nicols polarizers in the front direction because: (1) the first and second λ/4 plates disposed between the first and second polarizers are substantially perpendicular to each other and have the same phase difference (λ/4), so that they each cancel the phase difference of the other plate to make them substantially disabled; (2) a third Type-I birefringent layer other than the first and second λ/4 plates disposed between the first and second polarizers has a slow axis substantially perpendicular to the absorption axis of the second polarizer, so that it is made substantially disabled; (3) the Type-III birefringent layer, the Type-IV birefringent layer, and the liquid crystal cell disposed between the first and second polarizers have a phase difference of substantially 0 in the front direction, so that they are made substantially disabled; and (4) the first and second polarizers are substantially perpendicular to each other to be crossed-Nicols polarizers.

With the second liquid crystal display device of the present invention, light incident on the first polarizer in the front direction is converted into linearly polarized light by the first polarizer, and then converted from the linearly polarized light into circularly polarized light by the first λ/4 plate. The circularly polarized light passes through the Type-III birefringent layer and the liquid crystal cell while maintaining the polarization state, and the circularly polarized light is re-converted by the second λ/4 plate which is substantially perpendicular to the first λ/4 plate into linearly polarized light that is the same one as immediately after passing through the first polarizer. The linearly polarized light passes through the third Type-I birefringent layer and the Type-IV birefringent layer while maintaining the polarization state. Then, the linearly polarized light is shielded by the second polarizer which is substantially perpendicular to the first polarizer, whereby the display device displays a good black screen. In other words, the Type-III birefringent layer, the third Type-I birefringent layer, and the Type-IV birefringent layer do not aim to convert the polarization state of incident light in the front direction.

The above description shows how the display device displays a black screen by tracing the polarization state which changes as the light passes through the respective layers. Intuitively, this can be understood by the following description. In other words, the second liquid crystal display device of the present invention displays a good black screen by crossed-Nicols polarizers in the front direction because: (1) the first and second λ/4 plates disposed between the first and second polarizers are substantially perpendicular to each other and have the same phase difference (λ/4), so that they each cancel the phase difference of the other plate to make them substantially disabled; (2) a third Type-I birefringent layer other than the first and second λ/4 plates disposed between the first and second polarizers has a slow axis substantially parallel with the absorption axis of the second polarizer so that it is made substantially disabled; (3) the Type-III birefringent layer, the Type-IV birefringent layer, and the liquid crystal cell disposed between the first and second polarizers have a phase difference of substantially 0 in the front direction, so that they are made substantially disabled; and (4) the first and second polarizers are substantially perpendicular to each other to be crossed-Nicols polarizers.

Assuming that light incident on the first and second liquid crystal display devices of the present invention in oblique directions suffers no change in the polarization state by the Type-III birefringent layer, the third Type-I birefringent layer, and the Type-IV birefringent layer, the light incident on the first polarizer in oblique directions is not shielded by the second polarizer because of the following three reasons, so that the display device fails to display a good black screen. In other words, the Type-III birefringent layer, the third Type-I birefringent layer, and the Type-IV birefringent layer aim to change the polarization state of light incident mainly in oblique directions to perform viewing angle compensation.

As mentioned above, the Type-III birefringent layer, the third Type-I birefringent layer, and the Type-IV birefringent layer in the present invention make it possible to display a good black screen even in oblique directions while maintaining a good black screen in the front direction. This improves the contrast ratio in oblique directions and leads to a liquid crystal display device excellent in viewing angle characteristics.

The following will describe the three reasons why the Type-III birefringent layer, the third Type-I birefringent layer, and the Type-IV birefringent layer change the polarization state of light incident in oblique directions to perform viewing angle compensation. As shown in FIG. 1, here is considered a circularly polarized light VA-mode liquid crystal display device 100 with the simplest structure, including a first polarizer 110 (absorption axis azimuth: 90°), a first λ/4 plate 120 (slow axis azimuth:) 135°, a VA-mode liquid crystal cell 130, a second λ/4 plate 140 (slow axis azimuth: 45°), and a second polarizer 150 (absorption axis azimuth: 0°) stacked in the order set forth, and including no Type-III birefringent layer, third Type-I birefringent layer, nor Type-IV birefringent layer. In FIG. 1, the arrows drawn on the first and second polarizers 110 and 150 represent the azimuths of the absorption axes thereof; the arrows drawn on the first and second λ/4 plates 120 and 140 represent the azimuths of the slow axes thereof; and the ellipsoids drawn on the VA-mode liquid crystal cell 130 represent the shapes of the optical indicatrices.

First, with respect to display of a black screen in the front direction, light incident on the first polarizer 110 in the front direction is converted into linearly polarized light by the first polarizer 110, and then the linearly polarized light is converted into circularly polarized light by the first λ/4 plate 120. The circularly polarized light passes through the liquid crystal cell 130 while maintaining the polarization state. Then, the circularly polarized light is re-converted into linearly polarized light that is the same one as immediately after passing through the first polarizer 110 by the second λ/4 plate 140 which is perpendicular to the first λ/4 plate 120. Next, the linearly polarized light is shielded by the second polarizer 150 which is perpendicular to the first polarizer 110, whereby the display device displays a good black screen. In other words, the liquid crystal display device 100 displays a perfectly black screen in the front direction because: (1) the first and second λ/4 plates 120 and 140 disposed between the first and second polarizers 110 and 150 are perpendicular to each other and have the same phase difference (λ/4), so that they each cancel the phase difference of the other plate to make them disabled; (2) the liquid crystal cell 130 disposed between the first and second polarizers 110 and 150 have a phase difference of 0 in the front direction, so that it is substantially disabled; and (3) the first and second polarizers 110 and 150 are perpendicular to each other to form what is called crossed-Nicols polarizers.

Next, with respect to displaying a black screen in oblique directions, the following viewing-angle-inhibiting factors (1) to (3) make it impossible to display a perfectly black screen. (1) The first and second λ/4 plates 120 and 140 are not perpendicular to each other or have different phase differences, so that they are not made disabled. (2) The liquid crystal cell 130 has a phase difference of not 0, so that it is not disabled. (3) The first and second polarizers 110 and 150 are not perpendicular to each other, so that they do not form crossed-Nicols polarizers.

Referring to FIG. 2, the viewing-angle-inhibiting factors (1) to (3) are more specifically described. As schematically shown in FIG. 2(a), the slow axis 121 of the first λ/4 plate 120 and the slow axis 141 of the second λ/4 plate 140 are perpendicular to each other in the front direction (the normal direction to the substrate surface), whereas the slow axis 121 of the first λ/4 plate 120 and the slow axis 141 of the second λ/4 plate 140 are not perpendicular to each other in an oblique direction in an azimuth of 0°. Thus, they do not cancel the phase difference of the other plate and are not made disabled. As schematically shown in FIG. 2(b), the slow axis 121 of the first λ/4 plate 120 and the slow axis 141 of the second λ/4 plate 140 are perpendicular to each other in the front direction, whereas the slow axis 121 and the slow axis 141 of the first and second λ/4 plates 120 and 140, respectively, have different phase differences although they are perpendicular to each other in an oblique direction in an azimuth of 45°. Thus, they do not cancel the phase difference of the other plate. This is because that the phase difference is determined by birefringence (refractive index difference)× thickness, and effective birefringence is different between the front direction and oblique directions and it depends on the azimuth. For the same reasons, the phase difference of the VA-mode liquid crystal cell 130 which is 0 in the front direction is not 0 in any oblique direction. The effective birefringence is 0 only in the front direction and the phase difference is also 0. As schematically shown in FIG. 2(c), the absorption axis 111 of the first polarizer 110 and the absorption axis 151 of the second polarizer 150 are perpendicular to each other in the front direction, whereas the absorption axis 111 of the first polarizer 110 and the absorption axis 151 of the second polarizer 150 are not perpendicular to each other in an oblique directions in an azimuth of 45°.

As mentioned above, the minimal circularly polarized light VA-mode liquid crystal display device 100 fails to display a perfectly black screen in oblique directions due to the three viewing-angle-inhibiting factors (1) to (3). Conversely, treatment on these inhibiting factors, in other words, optical compensation against these factors leads to displaying a good black screen in oblique directions. In many cases, the above viewing-angle-inhibiting factors (1) and (2) are observed in a composed manner. Thus, the viewing-angle-inhibiting factors (1) and (2) may be optically compensated not by one-by-one optimization but by the whole optimization.

The first circularly polarized light VA-mode liquid crystal display device of the present invention is designed such that the viewing-angle-inhibiting factors (1) to (3) are simultaneously optically compensated on the basis of the design guideline to be specifically mentioned below. Specifically, such optical compensation is achieved by preparing biaxial λ/4 plates (Type-I birefringent layers) satisfying nx>ny≥nz as the first and second λ/4 plates; disposing a Type-I birefringent layer having an in-plane slow axis substantially perpendicular to the absorption axis of the second polarizer and a Type-IV birefringent layer satisfying nx≈ny≤nz between the second λ/4 plate and the second polarizer; and, if necessary, further disposing a birefringent layer (Type-III birefringent layer) satisfying nx≈ny>nz between the first and second λ/4 plates.

The second circularly polarized light VA-mode liquid crystal display device of the present invention is designed such that the viewing-angle-inhibiting factors (1) to (3) are simultaneously optically compensated on the basis of the design guideline to be specifically mentioned below. Specifically, such optical compensation is achieved by preparing biaxial λ/4 plates (Type-I birefringent layers) satisfying nx>ny≥nz as the first and second λ/4 plates; disposing a Type-I birefringent layer having an in-plane slow axis substantially parallel with the absorption axis of the second polarizer and a Type-IV birefringent layer satisfying nx≈ny≤nz between the second λ/4 plate and the second polarizer; and, if necessary, further disposing a birefringent layer (Type-III birefringent layer) satisfying nx≈ny>nz between the first and second λ/4 plates.

The following will describe the design guideline of the birefringent layers in the present invention. The present inventors have performed various studies on easy and effective optical compensation of the aforementioned viewing-angle-inhibiting factors, and have focused on the fact that the necessity of optical compensation differs from one azimuth to another. Then, as shown in the following Table 1, the polarizer requires no optical compensation against the viewing-angle-inhibiting factor (3) in an azimuth of 0°. Thereby, the present inventors have found that optical compensation is required only on the λ/4 plate against the viewing-angle-inhibiting factor (1) and on the liquid crystal cell against the viewing-angle-inhibiting factor (2) in this azimuth.

TABLE 1

| | Necessity of optical compensation | | |
|---|---|---|---|
| Azimuth | (1) λ/4 plate | (2) Liquid crystal cell | (3) Polarizer |
| 0° | Required | Required | Not required |
| 45° | Required | Required | Required |

The present inventors have further arrived at effective simultaneous optical compensation for the viewing-angle-inhibiting factors (1) and (2) in an azimuth of 0° by optimally adjusting the average value Nzq of the Nz coefficients of the first and second λ/4 plates and the phase difference Rlc in the perpendicular direction of the liquid crystal cell utilizing the illustration of the polarization state using a Poincare sphere and computer simulation, and by, if necessary, disposing the Type-III birefringent layer satisfying nx≈ny>nz between the first and second λ/4 plates and optimally adjusting the phase difference R3 in the perpendicular direction thereof. In the present description, the above process of selecting optimal values of the average value Nzq of the Nz coefficients of the first and second λ/4 plates, the phase difference Rlc in the perpendicular direction of the liquid crystal cell, and phase difference R3 in the perpendicular direction of the Type-III birefringent layer for optical compensation in an azimuth of 0° is referred to as the 1st step.

Then, the present inventors have arrived at effective simultaneous optical compensation for the viewing-angle-inhibiting factors (1), (2), and (3) in an azimuth of 45° by disposing a Type-IV birefringent layer satisfying nx≈ny≤nz and a Type-I birefringent layer having an in-plane slow axis substantially perpendicular to the absorption axis of the second polarizer between the second λ/4 plate and the second polarizer after the 1st step in the first liquid crystal display device of the present invention, and by optimally adjusting the Nz coefficient Nz1 and the in-plane phase difference R1. In the present description, the above process of selecting optimal values of the Nz coefficient Nz1 and the in-plane phase difference R1 of the Type-I birefringent layer after the 1st step as mentioned above for optical compensation in an azimuth of 45° is referred to as the 2nd step.

The Type-I birefringent layer added in the 2nd step is disposed such that the in-plane slow axis thereof is substantially perpendicular to the absorption axis of the adjacent second polarizer. Thus, this layer substantially does not change the absorption axis azimuth of the second polarizer, that is, the optical characteristics in the direction in an azimuth of 0°. Since the in-plane phase difference of the Type-IV birefringent layer is 0, this layer substantially does not change the absorption axis azimuth of the second polarizer, that is, the optical characteristics in the direction in an azimuth of 0°.

Then, the present inventors have arrived at effective simultaneous optical compensation for the viewing-angle-inhibiting factors (1), (2), and (3) in an azimuth of 45° by disposing a Type-I birefringent layer having an in-plane slow axis substantially parallel with the absorption axis of the second polarizer and a Type-IV birefringent layer satisfying nx≈ny nz between the second λ/4 plate and the second polarizer after the 1st step in the second liquid crystal display device of the present invention, and by optimally adjusting the Nz coefficient Nz1 and the in-plane phase difference R1. In the present description, the above process of selecting optimal values of the Nz coefficient Nz1 and the in-plane phase difference R1 of the Type-I birefringent layer after the 1st step as mentioned above for optical compensation in an azimuth of 45° is referred to as the 2nd step.

The Type-I birefringent layer added in the 2nd step is disposed such that the in-plane slow axis thereof is substantially parallel with the absorption axis of the adjacent second polarizer. Thus, this layer substantially does not change the absorption axis azimuth of the second polarizer, that is, the optical characteristics in the direction in an azimuth of 0°. Since the in-plane phase difference of the Type-IV birefringent layer is 0, this layer substantially does not change the absorption axis azimuth of the second polarizer, that is, the optical characteristics in the direction in an azimuth of 0°.

As mentioned above, the optical compensation process of the present invention is characterized in that the optimal state achieved in the 1st step is maintained even after the 2nd step. Thus, such capability of completely separately adjusting the 1st step and the 2nd step makes the design of birefringent layers easy.

The specific principle of the optical compensation by the 1st step and the 2nd step can be described as follows in reference to the illustration using the Poincare sphere. The approach utilizing the Poincare sphere is well known as a useful way of tracing the polarization state changed by birefringent layers in such fields as crystal optics (for example, see Hiroshi TAKASAKI, "Kesshou Kougaku", MORIKITA PUBLISHING Co., Ltd., 1975, p. 146-163).

In the Poincare sphere, the upper hemisphere represents right-handed polarized light, the lower hemisphere represents left-handed polarized light, the equator represents linearly polarized light, and the upper and lower poles represent right-handed circularly polarized light and left-handed circularly polarized light, respectively. Two polarization states symmetrical about the center of the sphere have the same absolute value of ellipticity angles and have opposite polarities, and thus constitute a pair of perpendicular polarized light beams.

The effect of a birefringent layer on the Poincare sphere is to convert the point representing the polarization state immediately before the light passes through the birefringent layer into the point obtained by counterclockwise rotating the previous point by an angle of $(2\pi) \times$(phase difference)/(wavelength) (unit: rad) about the slow axis on the Poincare sphere (more precisely, the position of the point representing the slower polarization state between the two eigenmodes of the birefringent layer on the Poincare sphere) (this is also achieved by clockwise rotating the point about the fast axis).

The center of rotation and the angle of rotation when viewing the display in oblique directions depend on the slow axis (or fast axis) and the phase difference in the viewing angle. Although specific description is omitted, these parameters can be calculated by solving the Fresnel's wave-normal equation to determine the vibration direction and the wave number vector in the eigenmode in the birefringent layer. The slow axis when viewing the display in oblique directions depends on the viewing angle and the Nz coefficient, and the phase difference when viewing the display in oblique directions depends on the viewing angle, the Nz coefficient, and the in-plane phase difference R (or the phase difference Rth in the perpendicular direction).

(Principle of Compensation in 1st Step)

First considered is the polarization state when viewing the circularly polarized light VA-mode liquid crystal display device 100 in FIG. 1 in the front direction. In such conditions, light emitted from a backlight (disposed below the first polarizer although not illustrated in FIG. 1) passes through the polarizers, the birefringent layers, and the liquid crystal cell. The polarization states through such passage are illustrated on the S1-S2 plane in the Poincare sphere. This is shown in FIG. 3. Although the points representing the polarization states actually exist on the surface of the Poincare sphere, they are projected on the S1-S2 plane. The symbols "o" illustrate the polarization states and the symbols "x" illustrate the slow (fast) axes of birefringent layers.

The polarization state immediately after the light passes through the first polarizer 110 exists on the point P0 on the Poincare sphere, and corresponds to the point E representing the polarization state that the second polarizer 150 can absorb, in other words, the extinction position (absorption axis azimuth) of the second polarizer 150. Then, as the light passes through the first λ/4 plate 120, the polarization state on the point P0 is rotation-converted by a specific angle about the slow axis of the first λ/4 plate 120 represented by the point Q1 on the Poincare sphere, thereby reaching the point P1. The rotation direction in this case is counterclockwise given that the origin O (the center point of the Poincare sphere) is observed from the point Q1.

Then, the light passes through the VA-mode liquid crystal cell 130. The VA-mode liquid crystal cell 130 has a phase difference of 0 in the front direction, so that the polarization state is not changed. Finally, as the light passes through the second λ/4 plate 140, the polarization state is rotation-converted by a specific angle about the slow axis of the second λ/4 plate 140 represented by the point Q2, thereby reaching the point P2. This point P2 corresponds to the extinction position E of the second polarizer 150. As a result, the liquid crystal display device 100 shown in FIG. 1 can shield the light from the backlight when observed in the front direction, whereby the display device displays a good black screen.

Next considered is the polarization state when viewing the circularly polarized light VA-mode liquid crystal display device 100 in FIG. 1 in the direction inclined from the normal direction by 60° (hereinafter, also referred to as pole of 60°) in an absorption axis azimuth of the second polarizer 150 of 0°. In such conditions, light emitted from a backlight passes through the polarizers, the birefringent layers, and the liquid crystal cell. The polarization states through such passage are illustrated on the S1-S2 plane in the Poincare sphere. This is shown in FIG. 4.

The polarization state immediately after the light passes through the first polarizer 110 exists on the point P0 on the Poincare sphere, and corresponds to the point E representing the polarization state that the second polarizer 150 can absorb, in other words, the extinction position (absorption axis azimuth) of the second polarizer 150. Then, as the light passes through the first λ/4 plate 120, the polarization state on the point P0 is rotation-converted by a specific angle about the slow axis of the first λ/4 plate 120 represented by the point Q1 on the Poincare sphere, thereby reaching the point P1. The rotation direction in this case is counterclockwise given that the origin O is observed from the point Q1.

Then, as the light passes through the VA-mode liquid crystal cell 130, the polarization state is rotation-converted by a specific angle about the slow axis of the liquid crystal cell 130 represented by the point L on the Poincare sphere, thereby reaching the point P2. The rotation direction in this case is counterclockwise given that the origin O is observed from the point L. Finally, as the light passes through the second λ/4 plate 140, the polarization state is rotation-converted by a specific angle about the slow axis of the second λ/4 plate 140 represented by the point Q2, thereby reaching the point P3. This point P3 does not correspond to the extinction position E of the second polarizer 150. As mentioned above, the liquid crystal display device 100 shown in FIG. 1 fails to shield the light from the backlight when observed in an azimuth of 0° and a pole of 60°.

In FIG. 3 and FIG. 4, the positions of the points P1 to P3 depend on the Nz coefficient Nzq1 of the first λ/4 plate 120, the Nz coefficient Nzq2 of the second λ/4 plate 140, and the phase difference Rlc in the perpendicular direction of the liquid crystal cell 130. FIG. 3 and FIG. 4 show as one example a mode satisfying Nzq1=Nzq2=2.0 and Rlc=320 nm. In order to make the conversion of the polarization state easy to understand, the positions of the points are roughly illustrated and are not exactly accurate. In order to make the figures clear, the figures include no arrows for illustrating the loci of the conversion of the points P1 to P3. In the first liquid crystal display device of the present invention, the Rlc of the VA-mode liquid crystal cell 130 is 275 nm or greater. In the second liquid crystal display device of the present invention, the Rlc of the VA-mode liquid crystal cell 130 is typically about 320 nm, and usually adjusted within the range of 270 to 400 nm. In contrast, the Rlc may be greater than 320 nm for the purpose of increasing the transmittance, for example. The Nzq1 and the Nzq2 of the first and second λ/4 plates 120 and 140 are usually adjusted within the range of 1.0 to 2.9. For example, in a mode in which the VA-mode liquid crystal cell has Rlc of about 400 nm and includes no Type-III birefringent layer, two λ/4 plates are suitably used with an average value of the Nz coefficients being adjusted to 2.9.

Next considered is a circularly polarized light VA-mode liquid crystal display device 200 with a Type-III birefringent layer, including a first polarizer (absorption axis azimuth of 90°) 210, a first λ/4 plate (slow axis azimuth of 135°) 220, a Type-III birefringent layer 235, a VA-mode liquid crystal cell 230, a second λ/4 plate (slow axis azimuth of 45°) 240, and a second polarizer (absorption axis azimuth of 0°) 250, stacked in the order set forth, as shown in FIG. 5. In FIG. 5, the arrows illustrated on the first and second polarizers 210 and 250 represent the azimuths of the absorption axes thereof, the arrows illustrated on the first and second λ/4 plates 220 and 240 represent the azimuths of the slow axes thereof, and the ellipsoids illustrated on the VA-mode liquid crystal cell 230 and the Type-III birefringent layer 235 represent the shapes of the optical indicatrices.

First considered is the polarization state when viewing the circularly polarized light VA-mode liquid crystal display device 200 in FIG. 5 in the front direction. In such conditions, the light emitted from a backlight (disposed below the first polarizer 210 although not shown in FIG. 5) passes through the polarizers, the birefringent layers, and the liquid crystal cell. The polarization states through such passage are illustrated on the S1-S2 plane in the Poincare sphere. This is shown in FIG. 6.

The polarization state immediately after the light passes through the first polarizer 210 exists on the point P0 on the Poincare sphere, and corresponds to the point E representing the polarization state that the second polarizer 250 can absorb, in other words, the extinction position (absorption axis azimuth) of the second polarizer 250. Then, as the light passes through the first λ/4 plate 220, the polarization state on the point P0 is rotation-converted by a specific angle about the slow axis of the first λ/4 plate 220 represented by the point Q1 on the Poincare sphere, thereby reaching the point P1. The rotation direction in this case is counterclockwise given that the origin O is observed from the point Q1.

Next, the light passes through the Type-III birefringent layer 235 and the VA-mode liquid crystal cell 230. The Type-III birefringent layer 235 and the VA-mode liquid crystal cell 230 each have a phase difference of 0 in the front direction, so that the polarization state is not changed. Finally, as the light passes through the second λ/4 plate 240, the polarization state is rotation-converted by a specific angle about the slow axis of the second λ/4 plate 240 represented by the point Q2, thereby reaching the point P2. This point P2 corresponds to the extinction position E of the second polarizer 250. As mentioned above, the liquid crystal display device 200 shown in FIG. 5 can shield the light from the backlight when observed in the front direction, whereby the display device displays a good black screen similar to the liquid crystal display device 100 shown in FIG. 1.

Next considered is the polarization state when viewing the circularly polarized light VA-mode liquid crystal display device 200 shown in FIG. 5 in the direction inclined by 60° in an absorption axis azimuth of the second polarizer 250 of 0°. In such conditions, light emitted from a backlight passes through the polarizers, the birefringent layers, and the liquid crystal cell. The polarization states through such passage are illustrated on the S1-S2 plane in the Poincare sphere. This is shown in FIG. 7-1.

The polarization state immediately after the light passes through the first polarizer 210 exists on the point P0 on the Poincare sphere, and corresponds to the point E representing the polarization state that the second polarizer 250 can absorb, in other words, the extinction position (absorption axis azimuth) of the second polarizer 250. Then, as the light passes through the first λ/4 plate 220, the polarization state on the point P0 is rotation-converted by a specific angle about the slow axis of the first λ/4 plate 220 represented by the point Q1 on the Poincare sphere, thereby reaching the point P1. The rotation direction in this case is counterclockwise given that the origin O is observed from the point Q1.

Next, as the light passes through the Type-III birefringent layer 235, the polarization state is rotation-converted by a specific angle about the slow axis of the Type-III birefringent layer 235 represented by the point R3 on the Poincare sphere, thereby reaching the point P2. The rotation direction in this case is counterclockwise given that the origin O is observed from the point R3. Next, as the light passes through the VA-mode liquid crystal cell 230, the polarization state is rotation-converted by a specific angle about the slow axis of the liquid crystal cell 230 represented by the point L on the Poincare sphere, thereby reaching the point P3. The rotation direction in this case is counterclockwise given that the origin O is observed from the point L. Finally, as the light passes through the second λ/4 plate 240, the polarization state is rotation-converted by a specific angle about the slow axis of the second λ/4 plate 240 represented by the point Q2, thereby reaching the point P4. This point P4 corresponds to the extinction position E of the second polarizer 250. As mentioned above, the liquid crystal display device 200 shown in FIG. 5 can shield the light from the backlight when observed in the oblique direction in an azimuth of 0° and a pole of 60° similar to the case of viewing the display device in the front direction.

In FIG. 6 and FIG. 7-1, the positions of the points P1 to P4 depend on the Nz coefficient Nzq1 of the first λ/4 plate 220, the Nz coefficient Nzq2 of the second λ/4 plate 240, the phase difference R3 in the perpendicular direction of the Type-III birefringent layer 235, and the phase difference Rlc in the perpendicular direction of the liquid crystal cell 230. FIG. 6 and FIG. 7-1 show as one example a mode satisfying Nzq1=Nzq2=2.0, R3=−61 nm, and Rlc=320 nm. In order to make the conversion of the polarization state easy to understand, the positions of the points are roughly illustrated and are not exactly accurate. In order to make the figures clear, the figures include no arrows for illustrating the loci of the conversion of the points P1 to P4.

The present inventors have studied to find that the Type-III birefringent layer 235 has an optimal phase difference value R3 in accordance with the Nz coefficient Nzq1 of the first λ/4 plate 220 and the Nz coefficient Nzq2 of the second λ/4 plate 240.

Table 2 and FIG. 8 show the results of computer-simulating the relationship among the Nz coefficient Nzq1 of the first λ/4 plate 220 and the Nz coefficient Nzq2 of the second λ/4 plate 240 and an optimal value of the phase difference R3 in the perpendicular direction of the Type-III birefringent layer 235. In the illustration using the Poincare sphere shown in FIG. 7-1, the conversion of the polarization state from the point P1 to the point P3 is divided into two conversions; that is, the conversion from P1 to P2 by the phase difference R3 in the perpendicular direction of the Type-III birefringent layer 235 and the conversion from P2 to P3 by the phase difference Rlc in the perpendicular direction of the VA-mode liquid crystal cell 230. Here, these two conversions have the same center of rotation and just the rotation directions thereof are opposed to each other. The rotation direction is determined by the symbol of the phase difference in the perpendicular direction, and the rotation angle is determined by the absolute value of the phase difference in the perpendicular direction. Thus, the two conversions may also be considered as direct conversion from P1 to P3 by the "total phase difference R3+Rlc in the perpendicular direction" of the "Type-III birefringent layer 235+VA-mode liquid crystal cell 230". In other words, as long as liquid crystal display devices have the same value of R3+Rlc, they have the same optical characteristics regardless of the phase difference Rlc in the perpendicular direction of the VA-mode liquid crystal cell 230. Thus, Table 2 shows the results of calculating the optimal values of (R3+Rlc) by computer simulation. For easy calculation, the computer simulation is performed on the assumption that the Nz coefficient Nzq1 of the first λ/4 plate 220 and the Nz coefficient Nzq2 of the second λ/4 plate 240 are the same value (Nzq1=Nzq2=Nzq). Still, as will be mentioned later, the present inventors have found the following: even if the Nz coefficient Nzq1 of the first λ/4 plate 220 and the Nz coefficient Nzq2 of the second λ/4 plate 240 are different from each other, the optimal phase difference value R3 of the Type-III birefringent layer 235 can be calculated in accordance with the Nzq, which is the average value Nzq of the Nzq1 and the Nzq2, on the assumption that the Nzq1 and the Nzq2 are each equal to the average value Nzq. Thereby, the present inventors have found that the results shown in Table 2 and FIG. 8 can be applied as they are. As is clear from Table 2 and FIG. 8, for the relationship between the average value Nzq and the optimal value of (Rlc+R3) within the range of 1.0≤Nzq≤2.9, the following formula (A) provides a sufficiently good approximation. The solid line shown in FIG. 8 represents the following formula (A).

$$Rlc+R3=169 \text{ nm} \times Nzq - 81 \text{ nm} \tag{A}$$

In order to provide liquid crystal display having a high contrast ratio within a wide viewing angle range, the sum (R3+Rlc) of the phase difference R3 in the perpendicular direction of the Type-III birefringent layer 235 and the phase difference Rlc in the perpendicular direction of the VA-mode liquid crystal cell 230 displaying a black screen (when no voltage is applied to the liquid crystal layer) is most preferably the optimal value shown in Table 2 and FIG. 8. Still, the sum may slightly deviate from the optimal value as long as the contrast ratio is not greatly deteriorated in oblique viewing angles. In order to sufficiently provide the effects of the present invention, the sum is preferably within the range of the optimal value ±50 nm.

TABLE 2

| Nzq | Rlc + R3 (nm) |
|---|---|
| 1.00 | 88 |
| 1.10 | 105 |
| 1.20 | 122 |
| 1.30 | 140 |
| 1.40 | 157 |
| 1.50 | 174 |
| 1.60 | 191 |
| 1.70 | 208 |
| 2.00 | 259 |
| 2.30 | 309 |
| 2.40 | 325 |
| 2.50 | 342 |
| 2.90 | 406 |

The following will describe the reason why the optimal phase difference value R3 of the Type-III birefringent layer 235, which is calculated on the assumption that the Nz coefficient Nzq1 of the first λ/4 plate 220 and the Nz coefficient Nzq2 of the second λ/4 plate 240 are equal to the average value Nzq therebetween even if the Nzq1 and the Nzq2 are different from each other, allows for shielding light leakage when viewing the display device in the oblique direction in an azimuth of 0° and a pole of 60° and providing excellent viewing angle characteristics.

As mentioned above, FIG. 7-1 shows a mode satisfying Nzq1=Nzq2=2.0, R3=−61 nm, and Rlc=320 nm. FIG. 7-2 shows a mode satisfying Nzq1=3.0, Nzq2=1.0, R3=−61 nm, and Rlc=320 nm; FIG. 7-3 shows a mode satisfying Nzq1=2.5, Nzq2=1.5, R3=−61 nm, and Rlc=320 nm; FIG. 7-4 shows a mode satisfying Nzq1=1.0, Nzq2=3.0, R3=−61 nm, and Rlc=320 nm; and FIG. 7-5 shows a mode satisfying Nzq1=1.5, Nzq2=2.5, R3=−61 nm, and Rlc=320 nm. In either case, the average value Nzq of the Nzq1 and the Nzq2 is 2.0 as in the case of FIG. 7-1. As is clear from the figures, in each mode, the point P4 corresponds to the extinction position E of the second polarizer 250. These liquid crystal display devices can shield the light from the backlight even when viewing the display devices in the oblique direction in an azimuth of 0° and a pole of 60° similar to the case of viewing the display in the front direction.

As is summarized in FIG. 7-6, the slow axis Q1 of the first λ/4 plate 220 approaches the axis S2 when the Nzq1 is smaller than 2.0 and approaches the axis S1 when the Nzq1 is greater than 2.0 based on the position where the Nzq1 is 2.0. Also, the slow axis Q2 of the second λ/4 plate 240 approaches the axis S1 when the Nzq2 is greater than 2.0 and approaches the axis S2 when the Nzq2 is smaller than 2.0 based on the position where the Nzq2 is 2.0. Thus, in the case of decreasing the Nzq1 by ΔNzq from the standard value of Nzq1=Nzq2=Nzq=2.0, an increase of the Nzq2 by ΔNzq allows for appropriately shifting the center of rotation of the conversion P0 to P1 and the center of rotation of the conversion P3 to P4 in the same direction and substantially maintaining the value ∠P1P0P3. As a result, the point P4 is allowed to correspond to the extinction position E of the polarizer 250 in the same manner as in the case of Nzq1=Nzq2=Nzq=2.0. On the other hand, in the case of increasing the Nzq1 by ΔNzq from the standard value of Nzq1=Nzq2=Nzq=2.0, a decrease of the Nzq2 by ΔNzq allows for appropriately shifting the center of rotation of the conversion P0 to P1 and the center of rotation of the conversion P3 to P4 in the same direction. As a result, the point P4 is allowed to correspond to the extinction position E of the polarizer 250 in the same manner as in the case of Nzq1=Nzq2=Nzq=2.0.

Consequently, even though the Nz coefficient Nzq1 of the first λ/4 plate 220 and the Nz coefficient Nzq2 of the second λ/4 plate 240 are different from each other, the optimal phase difference value R3 of the Type-III birefringent layer 235, which is calculated on the assumption that the Nzq1 and the Nzq2 are each equal to the average value Nzq therebetween, makes it possible to shield light leakage when viewing the display device in the oblique direction in an azimuth of 0° and a pole of 60°, thereby achieving excellent viewing angle characteristics. Treating the Nz coefficient Nzq1 and the Nz coefficient Nzq2 as individually separated values causes the design of phase difference conditions to be very complicated. Thus, it is very significant that the optimal phase difference value R3 can be calculated using the average value Nzq.

(Principle of Compensation in 2nd Step)

First considered is the case of viewing the liquid crystal display device 200 shown in FIG. 5 after the 1st step in the direction inclined by 60° in an azimuth (hereinafter, also referred to as an azimuth of 45°) bisecting the absorption axis azimuth of 90° of the first polarizer 210 and the absorption axis azimuth of 0° of the second polarizer 250. As mentioned above, with the liquid crystal display device 200, optimal values of the phase difference Rlc in the perpendicular direction of the liquid crystal cell 230 and of the phase difference R3 in the perpendicular direction of the Type-III birefringent layer 235 are selected in accordance with the Nz coefficient Nzq1 of the first λ/4 plate 220 and the Nz coefficient Nzq2 of the second λ/4 plate 240, resulting in optical compensation in an azimuth of 0° in the 1st step. In such conditions, light emitted from a backlight passes through the polarizers, the birefringent layers, and the liquid crystal cell. The polarization states through such passage are illustrated on the S1-S2 plane in the Poincare sphere. This is shown in FIG. 9.

First, the polarization state immediately after the light passes through the first polarizer 210 exists on the point P0 on the Poincare sphere, and does not correspond to the point E representing the polarization state that the second polarizer 250 can absorb, in other words, the extinction position (absorption axis azimuth) of the second polarizer 250. The first and second polarizers 210 and 250 are not perpendicular to each other in an oblique direction in an azimuth of 45°. This suggests the necessity of optical compensation. Then, as the light passes through the first λ/4 plate 220, the polarization state on the point P0 is rotation-converted by a specific angle about the slow axis of the first λ/4 plate 220 represented by the point Q1 on the Poincare sphere, thereby reaching the point P1. The rotation direction in this case is counterclockwise given that the origin O is observed from the point Q1.

Then, as the light passes through the Type-III birefringent layer 235, the polarization state is rotation-converted by a specific angle about the slow axis of the Type-III birefringent layer 235 represented by the point R3 on the Poincare sphere, thereby reaching the point P2. The rotation direction in this case is counterclockwise given that the origin O is observed from the point R3. Then, as the light passes through the VA-mode liquid crystal cell 230, the polarization state is rotation-converted by a specific angle about the slow axis of the liquid crystal cell 230 represented by the point L on the Poincare sphere, thereby reaching the point P3. The rotation direction in this case is counterclockwise given that the origin O is observed from the point L. Finally, as the light passes through the second λ/4 plate 240, the polarization state is rotation-converted by a specific angle about the slow axis of the second λ/4 plate 240 represented by the point Q2, thereby reaching the point P4. This point P4 does not correspond to the extinction position E of the second polarizer 250. As mentioned above, the liquid crystal display device 200 shown in FIG. 5 fails to shield the light from the backlight when observed in the oblique direction in an azimuth of 45° and a pole of 60°. In other words, the liquid crystal display device 200 just after the 1st step is not optically compensated in an azimuth of 45°.

In FIG. 9, the positions of the points P1 to P4 depend on the Nz coefficient Nzq1 of the first λ/4 plate 220, the Nz coefficient Nzq2 of the second λ/4 plate 240, the phase difference R3 in the perpendicular direction of the Type-III birefringent layer 235, and the phase difference Rlc in the perpendicular direction of the liquid crystal cell 230. FIG. 9 shows as one example a mode satisfying Nzq1=Nzq2=2.0, R3=−61 nm, and Rlc=320 nm. In order to make the conversion of the polarization state easy to understand, the positions of the points are roughly illustrated and are not exactly accurate. In order to make the figure clear, the figure includes no arrows for illustrating the loci of the conversion of the points P1 to P4.

The foregoing description mainly provides the conditions shared by the first liquid crystal display device and the second liquid crystal display device of the present invention. The following will separately describe the conditions different between the first liquid crystal display device and the second liquid crystal display device of the present invention.

First, the first liquid crystal display device is described below. FIG. 10 to FIG. 16 relate to the first liquid crystal display device of the present invention (circularly polarized light VA mode).

FIG. 10 shows a circularly polarized light VA-mode liquid crystal display device 1000 including, stacked in the order set forth, a first polarizer (absorption axis azimuth 90°) 1010, a first λ/4 plate (slow axis azimuth) 135° 1020, a Type-III birefringent layer 1041, a VA-mode liquid crystal cell 1030, a second λ/4 plate (slow axis azimuth of 45°) 1040, a Type-IV birefringent layer 1046, a Type-I birefringent layer (slow axis 90°) 1045, and a second polarizer (absorption axis azimuth of 0°) 1050. The Type-I birefringent layer 1045 and the fourth birefringent layer 1046 are added to the structure shown in FIG. 5 for the purpose of optical compensation in an azimuth of 45°. In FIG. 10, the arrows drawn on the first and second polarizers 1010 and 1050 represent the azimuths of the absorption axes thereof. The arrows drawn on the first and second $\lambda/4$ plates 1020 and 1040 represent the azimuths of the slow axes thereof. The arrow drawn on the Type-I birefringent layer 1045 represents the azimuth of the slow axis thereof. The ellipsoids drawn on the VA-mode liquid crystal cell 1030, the Type-III birefringent layer 1041, and the Type-IV birefringent layer 1046 represent the shapes of the optical indicatrices.

First considered is the polarization state when viewing the circularly polarized light VA-mode liquid crystal display device 1000 shown in FIG. 10 in the front direction. The light emitted from a backlight (disposed below the first polarizer 1010, not shown in FIG. 10) passes through the polarizers, the birefringent layers, and the liquid crystal cell. The polarization states through such passage are illustrated on the S1-S2 plane on the Poincare sphere. This is illustrated in FIG. 11.

First, the polarization state immediately after the light passes through the first polarizer 1010 exists on the point P0 on the Poincare sphere. This corresponds to the point E representing the polarization state that the second polarizer 1050 can absorb, in other words, the extinction position (absorption axis azimuth) of the second polarizer 1050. Next, as the light passes through the first $\lambda/4$ plate 1020, the polarization state on the point P0 is rotation-converted by a specific angle about the slow axis of the first $\lambda/4$ plate 1020 represented by the point Q1 on the Poincare sphere, thereby reaching the point P1. The rotation direction in this case is counterclockwise given that the origin O is observed from the point Q1.

Then, the light passes through the Type-III birefringent layer 1041 and the VA-mode liquid crystal cell 1030. The phase differences of the Type-III birefringent layer 1041 and the VA-mode liquid crystal cell 1030 are zero in the front direction, so that the polarization state is not changed. Then, as the light passes through the second $\lambda/4$ plate 1040, the polarization state is rotation-converted by a specific angle about the slow axis of the second $\lambda/4$ plate 1040 represented by the point Q2, thereby reaching the point P2. This point P2 corresponds to the extinction position E of the second polarizer 1050. Then, the light passes through the Type-IV birefringent layer 1046. The phase difference of the Type-IV birefringent layer 1046 is zero in the front direction, so that the polarization state is not changed. Finally, the light passes through the Type-I birefringent layer 1045. The polarization state on the point P2 is not changed even though it is rotation-converted by a specific angle about the slow axis of the Type-I birefringent layer 1045 represented by the point R2 on the Poincare sphere. This point P2 corresponds to the extinction position E of the second polarizer 1050. As mentioned above, similar to the liquid crystal display device 100 shown in FIG. 1, the liquid crystal display device 1000 shown in FIG. 10 can shield the light from the backlight and display a good black screen when observed in the front direction.

Next considered is the polarization state when viewing the circularly polarized light VA-mode liquid crystal display device 1000 shown in FIG. 10 in the direction inclined by 60° in an azimuth of 45°. In such conditions, the light emitted from a backlight passes through the polarizers, the birefringent layers, and the liquid crystal cell. The polarization states through such passage are illustrated on the S1-S2 plane on the Poincare sphere. This is illustrated in FIG. 12.

First, the polarization state immediately after the light passes through the first polarizer 1010 exists on the point P0 on the Poincare sphere. This does not correspond to the point E representing the polarization state that the second polarizer 1050 can absorb, in other words, the extinction position (absorption axis azimuth) of the second polarizer 1050. Then, as the light passes through the first $\lambda/4$ plate 1020, the polarization state on the point P1 is rotation-converted by a specific angle about the slow axis of the first $\lambda/4$ plate 1020 represented by the point Q1 on the Poincare sphere, thereby reaching the point P1. The rotation direction in this case is counterclockwise given that the origin O is observed from the point Q1.

Then, as the light passes through the Type-III birefringent layer 1041, the polarization state is rotation-converted by a specific angle about the slow axis of the Type-III birefringent layer 1041 represented by the point R3 on the Poincare sphere, thereby reaching the point P2. The rotation direction in this case is counterclockwise given that the origin O is observed from the point R3. Then, as the light passes through the VA-mode liquid crystal cell 1030, the polarization state is rotation-converted by a specific angle about the slow axis of the liquid crystal cell 1030 represented by the point L on the Poincare sphere, thereby reaching the point P3. The rotation direction in this case is counterclockwise given that the origin O is observed from the point L. Then, as the light passes through the second $\lambda/4$ plate 1040, the polarization state is rotation-converted by a specific angle about the slow axis of the second $\lambda/4$ plate 1040 represented by the point Q2, thereby reaching the point P4. The rotation direction in this case is counterclockwise given that the origin O is observed from the point Q2. Then, as the light passes through the Type-IV birefringent layer 1046, the polarization state is rotation-converted by a specific angle about the slow axis of the Type-IV birefringent layer 1046 represented by the point R4 on the Poincare sphere, thereby reaching the point P5. The rotation direction in this case is counterclockwise given that the origin O is observed from the point R4. Here, the point P5 exists on the southern hemisphere of the Poincare sphere (S3<0). Still, in order to make it easy to observe the figure, the point P5 is illustrated in the same manner as the other points (the points exists on the north hemisphere or on the equator) in FIG. 12. Finally, as the light passes through the Type-I birefringent layer 1045, the polarization state is rotation-converted by a specific angle about the slow axis of the Type-I birefringent layer 1045 represented by the point R1 on the Poincare sphere, thereby reaching the point P6. The rotation direction in this case is counterclockwise given that the origin O is observed from the point R1. This point P6 corresponds to the extinction position E of the second polarizer 1050. As mentioned above, similar to the case of viewing the display device in the front direction, the liquid crystal display device 1000 shown in FIG. 10 can shield the light from the backlight even when observed in the oblique direction in an azimuth of 45° and a pole of 60°.

Finally considered is the polarization state when viewing the circularly polarized light VA-mode liquid crystal display device 1000 shown in FIG. 10 in the direction inclined by 60° in an azimuth of 0°. In such conditions, the light emitted from the backlight passes through the polarizers, the birefringent layers, and the liquid crystal cell. The polarization states through such passage are illustrated on the S1-S2 plane on the Poincare sphere. This is illustrated in FIG. 13.

First, the polarization state immediately after the light passes through the first polarizer 1010 exists on the point P0 on the Poincare sphere, and corresponds to the point E representing the polarization state that the second polarizer 1050 can absorb, in other words, the extinction position (absorption axis azimuth) of the second polarizer 1050. Then, as the light passes through the first λ/4 plate 1020, the polarization state on the point P0 is rotation-converted by a specific angle about the slow axis of the first λ/4 plate 1020 represented by the point Q1 on the Poincare sphere, thereby reaching the point P1. The rotation direction in this case is counterclockwise given that the origin O is observed from the point Q1.

Then, as the light passes through the Type-III birefringent layer 1041, the polarization state is rotation-converted by a specific angle about the slow axis of the Type-III birefringent layer 1041 represented by the point R3 on the Poincare sphere, thereby reaching the point P2. The rotation direction in this case is counterclockwise given that the origin O is observed from the point R3. Then, as the light passes through the VA-mode liquid crystal cell 1030, the polarization state is rotation-converted by a specific angle about the slow axis of the liquid crystal cell 1030 represented by the point L on the Poincare sphere, thereby reaching the point P3. The rotation direction in this case is counterclockwise given that the origin O is observed from the point L. Then, as the light passes through the second λ/4 plate 1040, the polarization state is rotation-converted by a specific angle about the slow axis of the second λ/4 plate 1040 represented by the point Q2, thereby reaching the point P4.

Then, the light passes through the Type-IV birefringent layer 1046. The polarization state on the point P4 is not changed even though the polarization state is rotation-converted by a specific angle about the slow axis of the Type-IV birefringent layer 1040 represented by the point R4 on the Poincare sphere. Then, the light passes through the Type-I birefringent layer 1045. The polarization state on the point P4 is not changed even though the polarization state is rotation-converted by a specific angle about the slow axis of the Type-I birefringent layer 1045 represented by the point R1 on the Poincare sphere. This point P4 corresponds to the extinction position E of the second polarizer 1050. As mentioned above, similar to the case of viewing the display device in the front direction, the liquid crystal display device 1000 shown in FIG. 10 can shield the light from the backlight and display a good black screen even when observed in the oblique direction in an azimuth of 0° and a pole of 60°.

As mentioned above, the liquid crystal display device 1000 shown in FIG. 10 after the 2nd step can shield the light from the backlight and display a good black screen in all of the front direction, the oblique directions in an azimuth of 0°, and the oblique directions in an azimuth of 45°.

In FIG. 11, FIG. 12, and FIG. 13, the positions of the points P1 to P6 depend on the Nz coefficient Nzq1 of the first λ/4 plate 1020, the Nz coefficient Nzq2 of the second λ/4 plate 1040, the phase difference R3 in the perpendicular direction of the Type-III birefringent layer 1041, the phase difference Rlc in the perpendicular direction of the liquid crystal cell 1030, the phase difference R4 in the perpendicular direction of the Type-IV birefringent layer 1046, and the Nz coefficient Nz1 and the in-plane phase difference R1 of the Type-I birefringent layer 1045. FIG. 11, FIG. 12, and FIG. 13 show as one example a mode satisfying Nzq1=Nzq2=2.0, R3=−61 nm, Rlc=320 nm, R4=208 nm, Nz1=1.00, and R1=140 nm. In order to make the conversion of the polarization state easy to understand, the positions of the points are roughly illustrated and are not exactly accurate. In order to make the figure clear, the figure includes no arrows for illustrating the loci of the conversion of the points P1 to P6.

The present inventors have studied to clarify that the Type-IV birefringent layer 1046 has an optimal phase difference value R4 in accordance with the Nz coefficient Nzq1 of the first λ/4 plate 1020 and the Nz coefficient Nzq2 of the second λ/4 plate 1040. They have further clarified that this value depends on the Nz coefficient Nz1 of the Type-I birefringent layer 1045. They have furthermore clarified that the Type-I birefringent layer 1045 has an optimal phase difference value R1 in accordance with the Nz coefficient Nz1 of the Type-I birefringent layer 1045.

Table 3 and FIG. 14 to FIG. 16 show the results of computer-simulating the relationship among the Nz coefficient Nzq1 of the first λ/4 plate 1020, the Nz coefficient Nzq2 of the second λ/4 plate 1040 and the Nz coefficient Nz1 of the Type-I birefringent layer 1045, and optimal values of the phase difference R4 in the perpendicular direction of the Type-IV birefringent layer 1046 and the in-plane phase difference value R1 of the Type-I birefringent layer 1045. For easy computer-simulation, the computer simulation is performed on the assumption that the Nz coefficient Nzq1 of the first λ/4 plate 1020 and the Nz coefficient Nzq2 of the second λ/4 plate 1040 are the same value (Nzq1=Nzq2=Nzq). Still, the present inventors have found the following; even if the Nz coefficient Nzq1 of the first λ/4 plate 1020 and the Nz coefficient Nzq2 of the second λ/4 plate 1040 are different from each other, optimal values of the phase difference R4 in the perpendicular direction of the Type-IV birefringent layer 1046 and of the in-plane phase difference value R1 of the Type-I birefringent layer 1045 can be calculated in accordance with the Nzq, which is the average value Nzq of the Nzq1 and the Nzq2, on the assumption that the Nzq1 and the Nzq2 are each equal to the average value Nzq. Thereby, the present inventors have found that the results in Table 3 and FIG. 14 to FIG. 16 can be applied as they are. The reason for this is the same as described with FIG. 7-6, for example, and thus the description thereof is omitted here. As is clear from Table 3 and FIG. 14 to FIG. 16, the relationship between the average value Nzq and the optimal values R4 and R1 are commonly not easy to represent. Still, within the range of 1.0≤Nzq≤2.9, the following formulas (B) and (C) give sufficiently good approximations.

$$R4 = 108.3 \times Nzq + (-10.7 \times Nz1^2 + 100.4 \times Nz1 - 61.5) \quad \text{(B)}$$

$$R1 = 13 \times Nz1^2 - 83 \times Nz1 + 208 \quad \text{(C)}$$

In order to achieve liquid crystal display with a high contrast ratio within a wide viewing angle range, the phase difference R4 in the perpendicular direction of the Type-IV birefringent layer 1046 and the in-plane phase difference value R1 of the Type-I birefringent layer 1045 are most preferably the optimal values shown in Table 3 and FIG. 14 to FIG. 16. Still, they may slightly deviate from the optimal values to the extent that the contrast ratio is not greatly deteriorated in oblique viewing angles. In order to sufficiently achieve the effects of the present invention, the value R4 is preferably the optimal value ±50 nm. The value R1 is preferably the optimal value ±30 nm. Treating the Nz coefficient Nzq1 and the Nz coefficient Nzq2 as individually separated values causes the design of phase conditions to be very complicated. Thus, it is very significant that the optimal values R4 and R1 can be calculated from the average value Nzq.

TABLE 3

| Nzq | Rlc + R3 (nm) | Nz1 = 1.0 | | Nz1 = 2.0 | | Nz1 = 3.0 | |
|---|---|---|---|---|---|---|---|
| | | R1 (nm) | R4 (nm) | R1 (nm) | R4 (nm) | R1 (nm) | R4 (nm) |
| 1.0 | 88 | 138 | 138 | 94 | 206 | 76 | 253 |
| 1.1 | 105 | 138 | 149 | 94 | 217 | 76 | 264 |
| 1.2 | 122 | 138 | 159 | 94 | 227 | 76 | 275 |
| 1.3 | 140 | 138 | 169 | 94 | 237 | 76 | 284 |
| 1.4 | 157 | 138 | 180 | 94 | 247 | 76 | 295 |
| 1.5 | 174 | 138 | 190 | 94 | 258 | 76 | 305 |
| 1.6 | 191 | 138 | 201 | 94 | 269 | 76 | 316 |
| 1.7 | 208 | 138 | 212 | 94 | 279 | 76 | 327 |
| 2.0 | 259 | 138 | 243 | 94 | 311 | 76 | 359 |
| 2.3 | 309 | 138 | 276 | 94 | 344 | 76 | 392 |
| 2.4 | 325 | 138 | 288 | 94 | 356 | 76 | 403 |
| 2.5 | 342 | 138 | 299 | 94 | 366 | 76 | 414 |
| 2.9 | 406 | 138 | 346 | 94 | 413 | 76 | 461 |

The following will describe the first liquid crystal display device of the present invention and representative preferable modes of the first liquid crystal display device of the present invention.

(Addition 1)

A liquid crystal display device including, in the order set forth: a first polarizer; a first Type-I birefringent layer with an in-plane phase difference thereof being adjusted to $\lambda/4$; a liquid crystal cell including a pair of substrates opposed to each other and a liquid crystal layer disposed between the pair of substrates; a second Type-I birefringent layer with an in-plane phase difference thereof being adjusted to $\lambda/4$; a Type-IV birefringent layer; a third Type-I birefringent layer; and a second polarizer, where the Type-I birefringent layer is a birefringent layer satisfying nx>ny≥nz and the Type-IV birefringent layer is a birefringent layer satisfying nx≈ny≤nz, an in-plane slow axis of the first Type-I birefringent layer forming an angle of about 45° with an absorption axis of the first polarizer, an in-plane slow axis of the second Type-I birefringent layer being substantially perpendicular to the in-plane slow axis of the first Type-I birefringent layer, an absorption axis of the second polarizer being substantially perpendicular to the absorption axis of the first polarizer, an in-plane slow axis of the third Type-I birefringent layer being substantially perpendicular to the absorption axis of the second polarizer; the liquid crystal cell satisfying a phase difference Rlc in the perpendicular direction of 275 nm or greater, and the liquid crystal display device displaying a black screen by aligning liquid crystal molecules in the liquid crystal layer in the direction substantially vertical to the substrate surface.

(Addition 2)

The liquid crystal display device according to Addition 1, wherein the second Type-I birefringent layer and the first Type-I birefringent layer have different Nz coefficients.

(Addition 3)

The liquid crystal display device according to Addition 2, wherein one of the first Type-I birefringent layer and the second Type-I birefringent layer has an Nz coefficient of 2 or greater, and the other of the first Type-I birefringent layer and the second Type-I birefringent layer has an Nz coefficient of not smaller than 1 but smaller than 2.

(Addition 4)

The liquid crystal display device according to Addition 2 or 3, wherein one of the first and second Type-I birefringent layers with a greater Nz coefficient is disposed on a back side of the liquid crystal cell.

(Addition 5)

The liquid crystal display device according to any one of Additions 1 to 4, wherein the Type-IV birefringent layer and the third Type-I birefringent layer are disposed on a back side of the liquid crystal cell.

(Addition 6)

The liquid crystal display device according to any one of Additions 1 to 5, further including a surface-treated layer on a viewing side of the second polarizer, wherein the first Type-I birefringent layer has a greater Nz coefficient than the second Type-I birefringent layer.

(Addition 7)

The liquid crystal display device according to any one of Additions 1 to 6, further including at least one Type-III birefringent layer at least between the first Type-I birefringent layer and the liquid crystal cell or between the liquid crystal cell and the second Type-I birefringent layer, where the Type-III birefringent layer is a birefringent layer satisfying nx≈ny nz.

(Addition 8) The liquid crystal display device according to Addition 7, wherein the at least one Type-III birefringent layer is disposed on a back side of the liquid crystal cell.

(Addition 9) The liquid crystal display device according to Addition 7 or 8, satisfying the following formulas (1) to (3):

$$1.0 \leq Nzq \leq 2.9 \tag{1}$$

$$(169 \text{ nm} \times Nzq - 81 \text{ nm}) - 50 \text{ nm} \leq Rlc + R3 \tag{2}$$

$$Rlc + R3 \leq (169 \text{ nm} \times Nzq - 81 \text{ nm}) + 50 \text{ nm} \tag{3}$$

wherein Nzq represents an average value of Nz coefficients of the first and second Type-I birefringent layers; Rlc represents a phase difference in the perpendicular direction of the liquid crystal cell displaying a black screen, and R3 represents the sum of phase differences in the perpendicular direction of the at least one Type-III birefringent layer.

(Addition 10)

The liquid crystal display device according to Addition 9, satisfying the following formulas (4) to (7):

$$108.3 \times Nzq + (-10.7 \times Nz1^2 + 100.4 \times Nz1 - 61.5) - 50 \text{ nm} \leq R4 \tag{4}$$

$$R4 \leq 108.3 \times Nzq + (-10.7 \times Nz1^2 + 100.4 \times Nz1 - 61.5) + 50 \text{ nm} \tag{5}$$

$$13 \times Nz1^2 - 83 \times Nz1 + 208 - 30 \text{ nm} \leq R1 \tag{6}$$

$$R1 \leq 13 \times Nz1^2 - 83 \times Nz1 + 208 + 30 \text{ nm} \tag{7}$$

wherein Nz1 represents an Nz coefficient of the third Type-I birefringent layer; R1 represents an in-plane phase difference value of the third Type-I birefringent layer; and R4 represents a phase difference in the perpendicular direction of the Type-IV birefringent layer.

(Addition 11)

The liquid crystal display device according to any one of Addition 1 to 6, including no Type-III birefringent layer between the first Type-I birefringent layer and the liquid crystal cell nor between the liquid crystal cell and the second Type-I birefringent layer, where the Type-III birefringent layer is a birefringent layer satisfying nx≈ny≥nz.

(Addition 12)

The liquid crystal display device according to Addition 11, satisfying the following formulas (1), (8), and (9):

$$1.0 \leq Nzq \leq 2.9 \tag{1}$$

$$(169 \text{ nm} \times Nzq - 81 \text{ nm}) - 50 \text{ nm} \leq Rlc \tag{8}$$

$$Rlc \leq (169 \text{ nm} \times Nzq - 81 \text{ nm}) + 50 \text{ nm} \tag{9}$$

wherein Nzq represents an average value of the Nz coefficients of the first and second Type-I birefringent layers; and Rlc represents a phase difference in the perpendicular direction of the liquid crystal cell displaying a black screen.
(Addition 13)

The liquid crystal display device according to Addition 12, satisfying the formulas (4) to (7):

$$108.3 \times Nzq + (-10.7 \times Nz1^2 + 100.4 \times Nz1 - 61.5) - 50 \text{ nm} \leq R4 \quad (4)$$

$$R4 \leq 108.3 \times Nzq + (-10.7 \times Nz1^2 + 100.4 \times Nz1 - 61.5) + 50 \text{ nm} \quad (5)$$

$$13 \times Nz1^2 - 83 \times Nz1 + 208 - 30 \text{ nm} \leq R1 \quad (6)$$

$$R1 \leq 13 \times Nz1^2 - 83 \times Nz1 + 208 + 30 \text{ nm} \quad (7)$$

wherein Nz1 represents an Nz coefficient of the third Type-I birefringent layer; R1 represents an in-plane phase difference value of the third Type-I birefringent layer; and R4 represents a phase difference in the perpendicular direction of the Type-IV birefringent layer.

The aforementioned modes may be appropriately combined with each other within the scope which does not deviate from the spirit of the present invention. Any modes achieved by combining two or more preferable modes are also preferable modes of the first liquid crystal display device of the present invention.

Then, the second liquid crystal display device is described below. FIG. 17 to FIG. 23 relate to the second liquid crystal display device of the present invention (circularly polarized light VA mode).

FIG. 17 shows a circularly polarized light VA-mode liquid crystal display device 2000 including, stacked in the order set forth, a first polarizer (absorption axis azimuth of 90°) 2010, a first λ/4 plate (slow axis azimuth of 135°) 2020, a Type-III birefringent layer 2041, a VA-mode liquid crystal cell 2030, a second λ/4 plate (slow axis azimuth of 45°) 2040, a Type-I birefringent layer (slow axis of 0°) 2045, a Type-IV birefringent layer 2046, and a second polarizer (absorption axis azimuth of 0°) 2050. The Type-I birefringent layer 2045 and the fourth birefringent layer 2046 are added to the structure shown in FIG. 5 for the purpose of optical compensation in an azimuth of 45°. In FIG. 17, the arrows drawn on the first and second polarizers 2010 and 2050 represent the azimuths of the absorption axes thereof; the arrows drawn on the first and second λ/4 plates 2020 and 2040 represent the azimuths of the slow axes thereof; the arrow drawn on the Type-I birefringent layer 2045 represents the azimuth of the slow axis thereof; and the ellipsoids drawn on the VA-mode liquid crystal cell 2030, the Type-III birefringent layer 2041, and the Type-IV birefringent layer 2046 represent the shapes of the optical indicatrices.

First considered is the polarization state when viewing the circularly polarized light VA-mode liquid crystal display device 2000 shown in FIG. 17 in the front direction. The light emitted from a backlight (disposed below the first polarizer 2010, not shown in FIG. 17) passes through the polarizers, the birefringent layers, and the liquid crystal cell. The polarization states through such passage are illustrated on the S1-S2 plane on the Poincare sphere. This is illustrated in FIG. 18.

First, the polarization state immediately after the light passes through the first polarizer 2010 exists on the point P0 on the Poincare sphere. This corresponds to the point E representing the polarization state that the second polarizer 2050 can absorb, in other words, the extinction position (absorption axis azimuth) of the second polarizer 2050.

Next, as the light passes through the first λ/4 plate 2020, the polarization state on the point P0 is rotation-converted by a specific angle about the slow axis of the first λ/4 plate 2020 represented by the point Q1 on the Poincare sphere, thereby reaching the point P1. The rotation direction in this case is counterclockwise given that the origin O is observed from the point Q1.

Then, the light passes through the Type-III birefringent layer 2041 and the VA-mode liquid crystal cell 2030. The phase differences of the Type-III birefringent layer 2041 and the VA-mode liquid crystal cell 2030 are zero in the front direction, so that the polarization state is not changed. Then, as the light passes through the second λ/4 plate 2040, the polarization state is rotation-converted by a specific angle about the slow axis of the second λ/4 plate 2040 represented by the point Q2, thereby reaching the point P2. This point P2 corresponds to the extinction position E of the second polarizer 2050. Then, the light passes through the Type-I birefringent layer 2045. The polarization state on the point P2 is not changed even though it is rotation-converted by a specific angle about the slow axis of the Type-I birefringent layer 2045 represented by the point R2 on the Poincare sphere. Finally, the light passes through the Type-IV birefringent layer 2046. The phase difference of the Type-IV birefringent layer 2046 is zero in the front direction, so that the polarization state is not changed. This point P2 corresponds to the extinction position E of the second polarizer 2050. As mentioned above, similar to the liquid crystal display device 100 shown in FIG. 1, the liquid crystal display device 2000 shown in FIG. 17 can shield the light from the backlight and display a good black screen when observed in the front direction.

Here is considered the polarization state when viewing the circularly polarized light VA-mode liquid crystal display device 2000 shown in FIG. 17 in the direction inclined by 60° in an azimuth of 45°. In such conditions, the light emitted from a backlight passes through the polarizers, the birefringent layers, and the liquid crystal cell. The polarization states through such passage are illustrated on the S1-S2 plane on the Poincare sphere. This is illustrated in FIG. 19.

First, the polarization state immediately after the light passes through the first polarizer 2010 exists on the point P0 on the Poincare sphere. This does not correspond to the point E representing the polarization state that the second polarizer 2050 can absorb, in other words, the extinction position (absorption axis azimuth) of the second polarizer 2050. Then, as the light passes through the first λ/4 plate 2020, the polarization state on the point P1 is rotation-converted by a specific angle about the slow axis of the first λ/4 plate 2020 represented by the point Q1 on the Poincare sphere, thereby reaching the point P1. The rotation direction in this case is counterclockwise given that the origin O is observed from the point Q1.

Then, as the light passes through the Type-III birefringent layer 2041, the polarization state is rotation-converted by a specific angle about the slow axis of the Type-III birefringent layer 2041 represented by the point R3 on the Poincare sphere, thereby reaching the point P2. The rotation direction in this case is counterclockwise given that the origin O is observed from the point R3. Then, as the light passes through the VA-mode liquid crystal cell 2030, the polarization state is rotation-converted by a specific angle about the slow axis of the liquid crystal cell 2030 represented by the point L on the Poincare sphere, thereby reaching the point P3. The rotation direction in this case is counterclockwise given that the origin O is observed from the point L. Then, as the light passes through the second λ/4 plate 2040, the polarization state is rotation-converted by a specific angle about the slow axis of the second λ/4 plate 2040 represented by the point Q2, thereby reaching the point P4. The rotation direction in this case is counterclockwise given that the origin O is observed from the point Q2. Then, as the light passes through the Type-I birefringent layer 2045, the polarization state is rotation-converted by a specific angle about the slow axis of the Type-I birefringent layer 2045 represented by the point R1 on the Poincare sphere, thereby reaching the point P5. The rotation direction in this case is counterclockwise given that the origin O is observed from the point R1. The point P5 exists on the southern hemisphere of the Poincare sphere (S3<0). Still, in order to make it easy to observe the figure, the point P5 is illustrated in the same manner as the other points (the points exists on the north hemisphere or on the equator) in FIG. 19. Finally, as the light passes through the Type-IV birefringent layer 2046, the polarization state is rotation-converted by a specific angle about the slow axis of the Type-IV birefringent layer 2046 represented by the point R4 on the Poincare sphere, thereby reaching the point P6. The rotation direction in this case is counterclockwise given that the origin O is observed from the point R4. This point P6 corresponds to the extinction position E of the second polarizer 2050. As mentioned above, similar to the case of viewing the display device in the front direction, the liquid crystal display device 2000 shown in FIG. 17 can shield the light from the backlight even when observed in the oblique direction in an azimuth of 45° and a pole of 60°.

Finally considered is the polarization state when viewing the circularly polarized light VA-mode liquid crystal display device 2000 shown in FIG. 17 in the direction inclined by 60° in an azimuth of 0°. In such conditions, the light emitted from the backlight passes through the polarizers, the birefringent layers, and the liquid crystal cell. The polarization states through such passage are illustrated on the S1-S2 plane on the Poincare sphere. This is illustrated in FIG. 20.

First, the polarization state immediately after the light passes through the first polarizer 2010 exists on the point P0 on the Poincare sphere, and corresponds to the point E representing the polarization state that the second polarizer 2050 can absorb, in other words, the extinction position (absorption axis azimuth) of the second polarizer 2050. Then, as the light passes through the first λ/4 plate 2020, the polarization state on the point P0 is rotation-converted by a specific angle about the slow axis of the first λ/4 plate 2020 represented by the point Q1 on the Poincare sphere, thereby reaching the point P1. The rotation direction in this case is counterclockwise given that the origin O is observed from the point Q1.

Then, as the light passes through the Type-III birefringent layer 2041, the polarization state is rotation-converted by a specific angle about the slow axis of the Type-III birefringent layer 2041 represented by the point R3 on the Poincare sphere, thereby reaching the point P2. The rotation direction in this case is counterclockwise given that the origin O is observed from the point R3. Then, as the light passes through the VA-mode liquid crystal cell 2030, the polarization state is rotation-converted by a specific angle about the slow axis of the liquid crystal cell 2030 represented by the point L on the Poincare sphere, thereby reaching the point P3. The rotation direction in this case is counterclockwise given that the origin O is observed from the point L. Then, as the light passes through the second λ/4 plate 2040, the polarization state is rotation-converted by a specific angle about the slow axis of the second λ/4 plate 2040 represented by the point Q2, thereby reaching the point P4.

Then, the light passes through the Type-I birefringent layer 2045. The polarization state on the point P4 is not changed even though the polarization state is rotation-converted by a specific angle about the slow axis of the Type-I birefringent layer 2045 represented by the point R1 on the Poincare sphere. Then, the light passes through the Type-IV birefringent layer 2046. The polarization state on the point P4 is not changed even though the polarization state is rotation-converted by a specific angle about the slow axis of the Type-IV birefringent layer 2046 represented by the point R4 on the Poincare sphere. This point P4 corresponds to the extinction position E of the second polarizer 2050. As mentioned above, similar to the case of viewing the display device in the front direction, the liquid crystal display device 2000 shown in FIG. 17 can shield the light from the backlight and display a good black screen even when observed in the oblique direction in an azimuth of 0° and a pole of 60°.

As mentioned above, the liquid crystal display device 2000 shown in FIG. 17 after the 2nd step can shield the light from the backlight and display a good black screen even in all of the front direction, the oblique directions in an azimuth of 0°, and the oblique directions in an azimuth of 45°.

In FIG. 18, FIG. 19, and FIG. 20, the positions of the points P1 to P6 depend on the Nz coefficient Nzq1 of the first λ/4 plate 2020, the Nz coefficient Nzq2 of the second λ/4 plate 2040, the phase difference R3 in the perpendicular direction of the Type-III birefringent layer 2041, the phase difference Rlc in the perpendicular direction of the liquid crystal cell 2030, the Nz coefficient Nz1 and the in-plane phase difference R1 of the Type-I birefringent layer 2045, and the phase difference R4 in the perpendicular direction of the Type-IV birefringent layer 2046. FIG. 18, FIG. 19, and FIG. 20 show as one example a mode satisfying Nzq1=Nzq2=2.0, R3=−61 nm, Rlc=320 nm, Nz1=1.00, R1=50 nm, and R4=181 nm. In order to make the conversion of the polarization state easy to understand, the positions of the points are roughly illustrated and are not exactly accurate. In order to make the figure clear, the figure includes no arrows for illustrating the loci of the conversion of the points P1 to P6.

The present inventors have studied to clarify that the Type-I birefringent layer 2045 has an optimal phase difference R1 and the Type-IV birefringent layer 2046 has an optimal phase difference value R4 in accordance with the Nz coefficient Nzq1 of the first λ/4 plate 2020, the Nz coefficient Nzq2 of the second λ/4 plate 2040, and the Nz coefficient Nz1 of the Type-I birefringent layer 2045.

Table 4, FIG. 21, and FIG. 22 show the results of computer-simulating the relationship among the Nz coefficient Nzq1 of the first λ/4 plate 2020, the Nz coefficient Nzq2 of the second λ/4 plate 2040, and the Nz coefficient Nz1 of the Type-I birefringent layer 2045, and the optimal values of the phase difference R4 in the perpendicular direction of the Type-IV birefringent layer 2046 and of the in-plane phase difference value R1 of the Type-I birefringent layer 2045. For easy computer-simulation, the computer simulation is performed on the assumption that the Nz coefficient Nzq1 of the first λ/4 plate 2020 and the Nz coefficient Nzq2 of the second λ/4 plate 2040 are the same value (Nzq1=Nzq2=Nzq). Still, the present inventors have found the following: even if the Nz coefficient Nzq1 of the first λ/4 plate 2020 and the Nz coefficient Nzq2 of the second λ/4 plate 2040 are different from each other, optimal values of the phase difference R4 in the perpendicular direction of the Type-IV birefringent layer 2046 and of the in-plane phase difference value R1 of the Type-I birefringent layer 2045 can be calculated based on the Nzq, which is the average value Nzq of the Nzq1 and the Nzq2, on the assumption that the Nzq1 and the Nzq2 each are equal to the average value Nzq. Thereby, the present inventors have found that the results shown in Table 4, FIG. 21, and FIG. 22 can be applied as they are. The reason for this is the same as described with FIG. 7-6, for example, and thus the description thereof is omitted here. As is clear from Table 4, FIG. 21, and FIG. 22, the relationship among the average value Nzq and Nz1 and the optimal values R4 and R1 are commonly not easy to represent. Still, within the range of $1.0 \leq Nzq \leq 2.9$, the following formulas (B) and (C) give sufficiently good approximations.

$$R4 = (-2.5Nz1^2 + 13.1Nz1 + 4.3)Nzq^2 + (13.4Nz1^2 - 75.2Nz1 + 95.6)Nzq + (-18.6Nz1^2 + 148.1Nz1 - 77.3) \quad (B)$$

$$R1 = (2.1Nz1^2 - 13.8Nz1 + 28.2)Nzq^2 + (-11.3Nz1^2 - 73.6Nz1 - 155.5)Nzq + (14.9Nz1^2 - 98.2Nz1 + 252.2) \quad (C)$$

In order to achieve liquid crystal display with a high contrast ratio within a wide viewing angle range, the phase difference R4 in the perpendicular direction of the Type-IV birefringent layer 2046 and the in-plane phase difference value R1 of the Type-I birefringent layer 2045 are most preferably the optimal values shown in Table 4, FIG. 21, and FIG. 22. Still, they may slightly deviate from the optimal values to the extent that the contrast ratio is not greatly deteriorated in oblique viewing angles. In order to sufficiently achieve the effects of the present invention, the value R4 is preferably the optimal value ±50 nm. The value R1 is preferably the optimal value ±30 nm. Treating the Nz coefficient Nzq1 and the Nz coefficient Nzq2 as individually separated values cause the design of phase difference conditions to be very complicated. Thus, it is very significant that the optimal values R4 and R1 can be calculated from the average value Nzq.

TABLE 4

| Nzq | Rlc + R3 (nm) | Nz1 = 1.0 | | Nz1 = 2.0 | | Nz1 = 3.0 | |
|---|---|---|---|---|---|---|---|
| | | R1 (nm) | R4 (nm) | R1 (nm) | R4 (nm) | R1 (nm) | R4 (nm) |
| 1.0 | 88 | 94 | 102 | 72 | 165 | 62 | 212 |
| 1.2 | 122 | 80 | 114 | 64 | 172 | 57 | 219 |
| 1.4 | 157 | 70 | 128 | 58 | 182 | 52 | 226 |
| 1.6 | 191 | 61 | 144 | 53 | 195 | 49 | 239 |
| 2.0 | 259 | 50 | 181 | 46 | 226 | 43 | 265 |
| 2.5 | 342 | 41 | 231 | 39 | 270 | 39 | 310 |
| 2.9 | 406 | 37 | 276 | 37 | 314 | 36 | 349 |

The following will describe the second liquid crystal display device of the present invention and representative preferable modes of the second liquid crystal display device of the present invention.

(Addition 14)

A liquid crystal display device including, in the order set forth: a first polarizer; a first Type-I birefringent layer with an in-plane phase difference thereof being adjusted to λ/4; a liquid crystal cell including a pair of substrates opposed to each other and a liquid crystal layer disposed between the pair of substrates; a second Type-I birefringent layer with an in-plane phase difference thereof being adjusted to λ/4; a third Type-I birefringent layer; a Type-IV birefringent layer; and a second polarizer, where the Type-I birefringent layer is a birefringent layer satisfying nx>ny≥nz and the Type-IV birefringent layer is a birefringent layer satisfying nx≈ny≤nz, an in-plane slow axis of the first Type-I birefringent layer forming an angle of about 45° with an absorption axis of the first polarizer, an in-plane slow axis of the second Type-I birefringent layer being substantially perpendicular to the in-plane slow axis of the first Type-I birefringent layer, an absorption axis of the second polarizer being substantially perpendicular to the absorption axis of the first polarizer, an in-plane slow axis of the third Type-I birefringent layer being substantially parallel with the absorption axis of the second polarizer, and the liquid crystal display device displaying a black screen by aligning liquid crystal molecules in the liquid crystal layer in the direction substantially vertical to the substrate surface.

(Addition 15)

The liquid crystal display device according to Addition 1, wherein the second Type-I birefringent layer and the first Type-I birefringent layer have different Nz coefficients.

(Addition 16)

The liquid crystal display device according to Addition 15, wherein one of the first Type-I birefringent layer and the second Type-I birefringent layer has an Nz coefficient of 2 or greater, and the other of the first Type-I birefringent layer and the second Type-I birefringent layer has an Nz coefficient of not smaller than 1 but smaller than 2.

(Addition 17) The liquid crystal display device according to Addition 15 or 16, wherein one of the first and second Type-I birefringent layers with a greater Nz coefficient is disposed on a back side of the liquid crystal cell.

(Addition 18)

The liquid crystal display device according to any one of Additions 14 to 17, wherein the third Type-I birefringent layer and the Type-IV birefringent layer are disposed on a back side of the liquid crystal cell.

(Addition 19)

The liquid crystal display device according to any one of Additions 14 to 18, further including a surface-treated layer on a viewing side of the second polarizer, wherein the first Type-I birefringent layer has a greater Nz coefficient than the second Type-I birefringent layer.

(Addition 20)

The liquid crystal display device according to any one of Additions 14 to 19, further including at least one Type-III birefringent layer at least between the first Type-I birefringent layer and the liquid crystal cell or between the liquid crystal cell and the second Type-I birefringent layer, where the Type-III birefringent layer is a birefringent layer satisfying nx≈ny≥nz.

(Addition 21)

The liquid crystal display device according to Addition 20, wherein the at least one Type-III birefringent layer is disposed on a back side of the liquid crystal cell.

(Addition 22)

The liquid crystal display device according to Addition 20 or 21, satisfying the following formulas (1) to (3):

$$1.0 \leq Nzq \leq 2.9 \quad (1)$$

$$(169 \text{ nm} \times Nzq - 81 \text{ nm}) - 50 \text{ nm} \leq Rlc + R3 \quad (2)$$

$$Rlc + R3 \leq (169 \text{ nm} \times Nzq - 81 \text{ nm}) + 50 \text{ nm} \quad (3)$$

wherein Nzq represents an average value of Nz coefficients of the first and second Type-I birefringent layers; Rlc represents a phase difference in the perpendicular direction of the liquid crystal cell displaying a black screen; and R3 represents the sum of phase differences in the perpendicular direction of the at least one Type-III birefringent layer.

(Addition 23)

The liquid crystal display device according to Addition 22, satisfying the following formulas (4) to (7):

$$(-2.5Nz1^2+13.1Nz1+4.3)Nzq^2+(13.4Nz1^2-75.2Nz1+95.6)Nzq+(-18.6Nz1^2+148.1Nz1-77.3)-50 \text{ nm} \leq R4 \quad (4)$$

$$R4 \leq (-2.5Nz1^2+13.1Nz1+4.3)Nzq^2+(13.4Nz1^2-75.2Nz1+95.6)Nzq+(-18.6Nz1^2+148.1Nz1-77.3)+50 \text{ nm} \quad (5)$$

$$(2.1Nz1^2-13.8Nz1+28.2)Nzq^2+(-11.3Nz1^2-73.6Nz1-155.5)Nzq+(14.9Nz1^2-98.2Nz1+252.2)-30 \text{ nm} \leq R1 \quad (6)$$

$$R1 \leq (2.1Nz1^2-13.8Nz1+28.2)Nzq^2+(-11.3Nz1^2-73.6Nz1-155.5)Nzq+(14.9Nz1^2-98.2Nz1+252.2)+30 \text{ nm} \quad (7)$$

wherein Nz1 represents an Nz coefficient of the third Type-I birefringent layer; R1 represents an in-plane phase difference value of the third Type-I birefringent layer; and R4 represents a phase difference in the perpendicular direction of the Type-IV birefringent layer.

(Addition 24)

The liquid crystal display device according to any one of Additions 14 to 19, including no Type-III birefringent layer between the first Type-I birefringent layer and the liquid crystal cell nor between the liquid crystal cell and the second Type-I birefringent layer, where the Type-III birefringent layer is a birefringent layer satisfying nx≈ny≥nz.

(Addition 25)

The liquid crystal display device according to Addition 24, satisfying the following formulas (1), (8), and (9):

$$1.0 \leq Nzq \leq 2.9 \quad (1)$$

$$(169 \text{ nm} \times Nzq - 81 \text{ nm}) - 50 \text{ nm} \leq Rlc \quad (8)$$

$$Rlc \leq (169 \text{ nm} \times Nzq - 81 \text{ nm}) + 50 \text{ nm} \quad (9)$$

wherein Nzq represents an average value of Nz coefficients of the first and second Type-I birefringent layers; and Rlc represents a phase difference in the perpendicular direction of the liquid crystal cell displaying a black screen.

(Addition 26)

The liquid crystal display device according to Addition 25, satisfying the following formulas (4) to (7):

$$(-2.5Nz1^2+13.1Nz1+4.3)Nzq^2+(13.4Nz1^2-75.2Nz1+95.6)Nzq+(-18.6Nz1^2+148.1Nz1-77.3)-50 \text{ nm} \leq R4 \quad (4)$$

$$R4 \leq (-2.5Nz1^2+13.1Nz1+4.3)Nzq^2+(13.4Nz1^2-75.2Nz1+95.6)Nzq+(-18.6Nz1^2+148.1Nz1-77.3)+50 \text{ nm} \quad (5)$$

$$(2.1Nz1^2-13.8Nz1+28.2)Nzq^2+(-11.3Nz1^2-73.6Nz1-155.5)Nzq+(14.9Nz1^2-98.2Nz1+252.2)-30 \text{ nm} \leq R1 \quad (6)$$

$$R1 \leq (2.1Nz1^2-13.8Nz1+28.2)Nzq^2+(-11.3Nz1^2-73.6Nz1-155.5)Nzq+(14.9Nz1^2-98.2Nz1+252.2)+30 \text{ nm} \quad (7)$$

wherein Nz1 represents an Nz coefficient of the third Type-I birefringent layer, R1 represents an in-plane phase difference value of the third Type-I birefringent layer; and R4 represents a phase difference in the perpendicular direction of the Type-IV birefringent layer.

The aforementioned modes may be appropriately combined with each other within the scope which does not deviate from the spirit of the present invention. Any modes achieved by combining two or more preferable modes are also preferable modes of the second liquid crystal display device of the present invention.

Advantageous Effects of Invention

The liquid crystal display device of the present invention can achieve cost reduction, excellent productivity, and a high contrast ratio within a wide viewing angle range. Such a liquid crystal display device of the present invention can suitably be used as display devices for mobile devices such as smartphones and tablet PCs, and outdoor signage displays.

BRIEF DESCRIPTION OF DRAWINGS

FIG. 2(a) shows the slow axis of the first λ/4 plate and the slow axis of the second λ/4 plate perpendicular to each other in the front direction, including a schematic view (upper figure) observed in the front direction and a schematic view (lower figure) observed in an oblique direction in an azimuth of 0°; FIG. 2(b) shows the slow axis of the first λ/4 plate and the slow axis of the second λ/4 plate perpendicular to each other in the front direction, including a schematic view (upper figure) observed in the front direction and a schematic view (lower figure) observed in an oblique direction in an azimuth of 45°; and FIG. 2(c) shows the absorption axis of the first polarizer and the absorption axis of the second polarizer perpendicular to each other in the front direction, including a schematic view (upper figure) observed in the front direction and a schematic view (lower figure) observed in an oblique direction in an azimuth of 45°.

FIG. 7-1 shows a change in the polarization state as light passes through the components of the circularly polarized light VA-mode liquid crystal display device shown in FIG. 5 (a mode satisfying Nzq1=Nzq2=2.0, R3=−61 nm, and Rlc=320 nm) observed in the oblique direction in an azimuth of 0° and a pole of 60°, projected on the S1-S2 plane on the Poincare sphere.

FIG. 7-2 shows a change in the polarization state as light passes through the components of the circularly polarized light VA-mode liquid crystal display device shown in FIG. 5 (a mode satisfying Nzq1=3.0, Nzq2=1.0, R3=−61 nm, and Rlc=320 nm) observed in the oblique direction in an azimuth of 0° and a pole of 60°, projected on the S1-S2 plane on the Poincare sphere.

FIG. 7-3 shows a change in the polarization state as light passes through the components of the circularly polarized light VA-mode liquid crystal display device shown in FIG. 5 (a mode satisfying Nzq1=2.5, Nzq2=1.5, R3=−61 nm, and Rlc=320 nm) observed in the oblique direction in an azimuth of 0° and a pole of 60°, projected on the S1-S2 plane on the Poincare sphere.

FIG. 7-4 shows a change in the polarization state as light passes through the components of the circularly polarized light VA-mode liquid crystal display device shown in FIG. 5 (a mode satisfying Nzq1=1.0, Nzq2=3.0, R3=−61 nm, and Rlc=320 nm) observed in the oblique direction in an azimuth of 0° and a pole of 60°, projected on the S1-S2 plane on the Poincare sphere.

FIG. 7-5 shows a change in the polarization state as light passes through the components of the circularly polarized light VA-mode liquid crystal display device shown in FIG. 5 (a mode satisfying Nzq1=1.5, Nzq2=2.5, R3=−61 nm, and Rlc=320 nm) observed in the oblique direction in an azimuth of 0° and a pole of 60°, projected on the S1-S2 plane on the Poincare sphere.

FIG. 7-6 shows a change in the slow axes of the first and second λ/4 plates in accordance with the Nz coefficients in the circularly polarized light VA-mode liquid crystal display device shown in FIG. 5 observed in the oblique direction in an azimuth of 0° and a pole of 60°, projected on the S1-S2 plane on the Poincare sphere.

DESCRIPTION OF EMBODIMENTS (Birefringent Layer)

Figure 1:
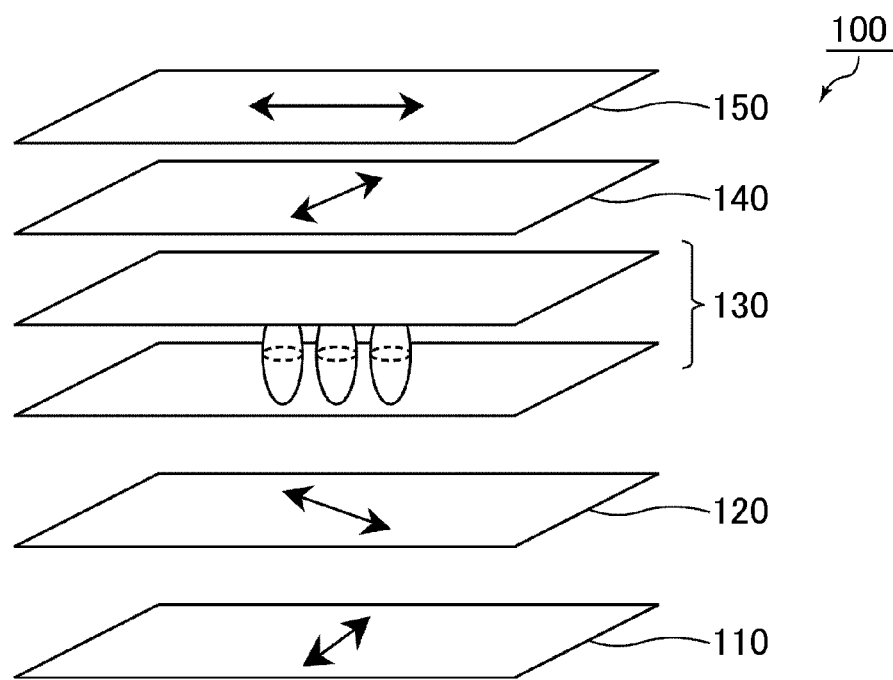
FIG. 1 is an exploded perspective view showing the structure of a circularly polarized light VA-mode liquid crystal display device with the simplest structure.
Figure 2:
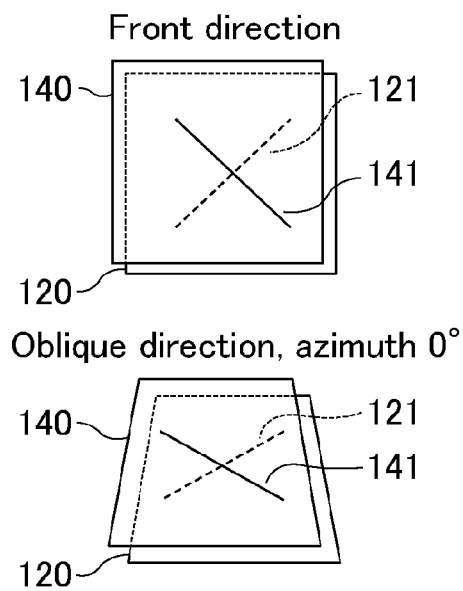
Figure 2:
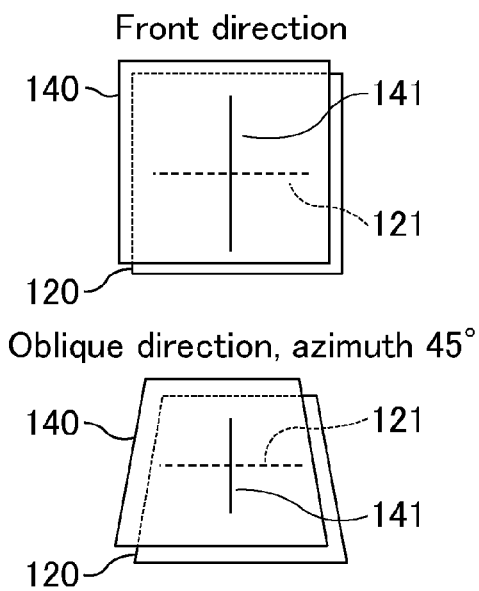
Figure 2:
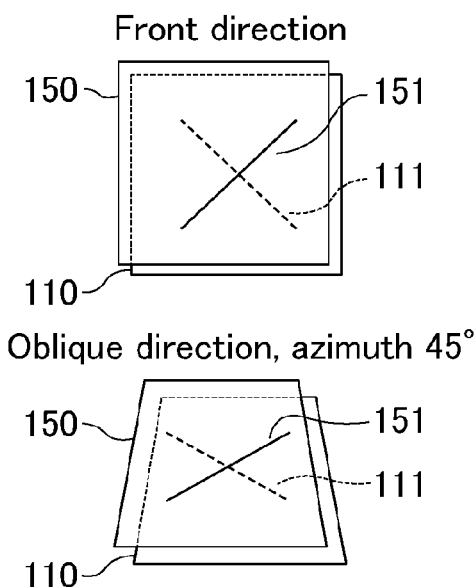
Figure 3:
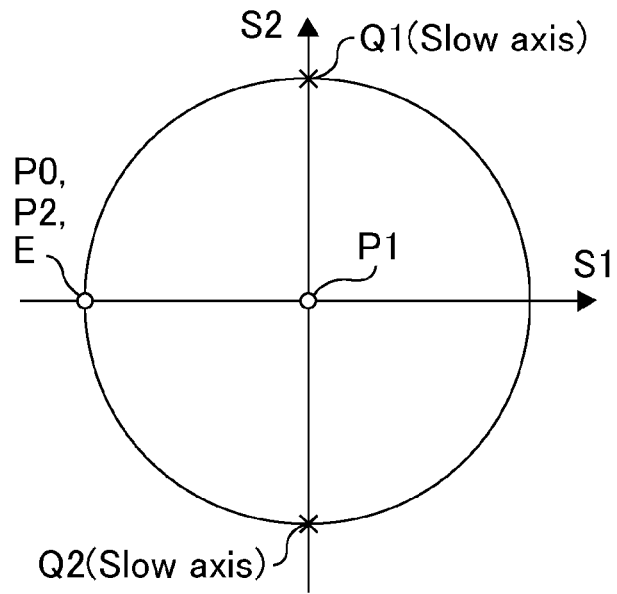
FIG. 3 shows a change in the polarization state as light passes through the components of the circularly polarized light VA-mode liquid crystal display device shown in FIG. 1 observed in the front direction, projected on the S1-S2 plane on the Poincare sphere.
Figure 4:
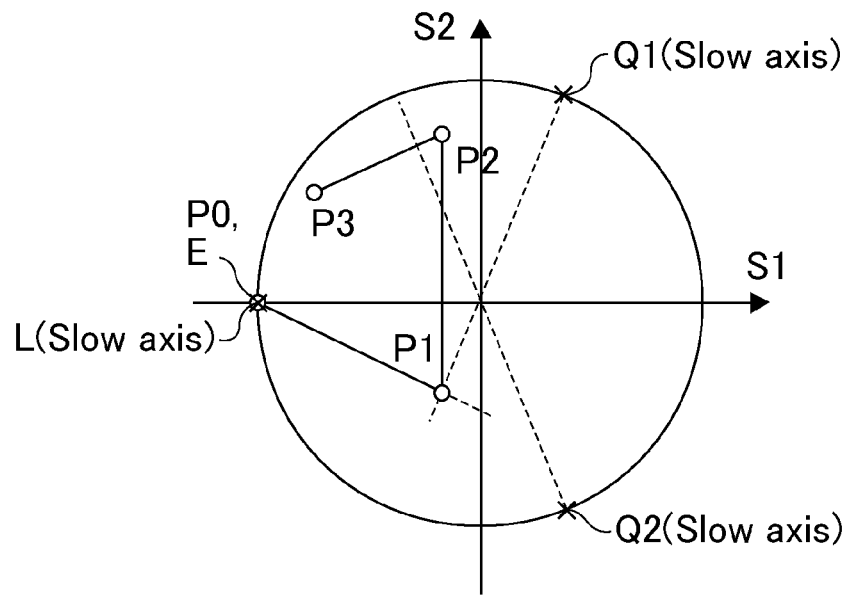
FIG. 4 shows a change in the polarization state as light passes through the components of the circularly polarized light VA-mode liquid crystal display device shown in FIG. 1 observed in the oblique direction in an azimuth of 0° and a pole of 60°, projected on the S1-S2 plane on the Poincare sphere.
Figure 5:
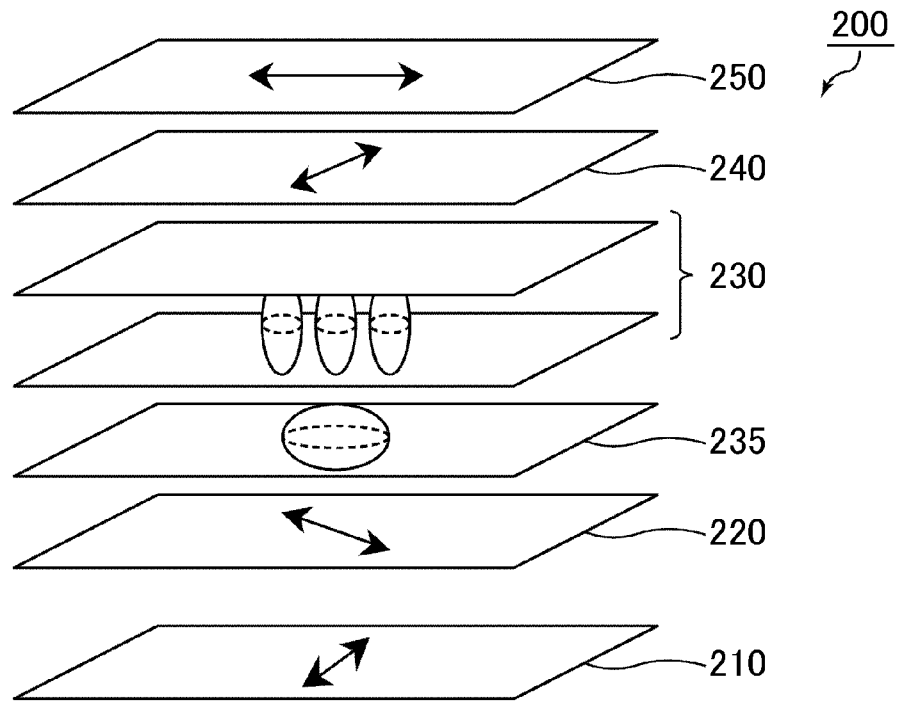
FIG. 5 is an exploded perspective view showing the structure of a circularly polarized light VA-mode liquid crystal display device including a Type-III birefringent layer.
Figure 6:
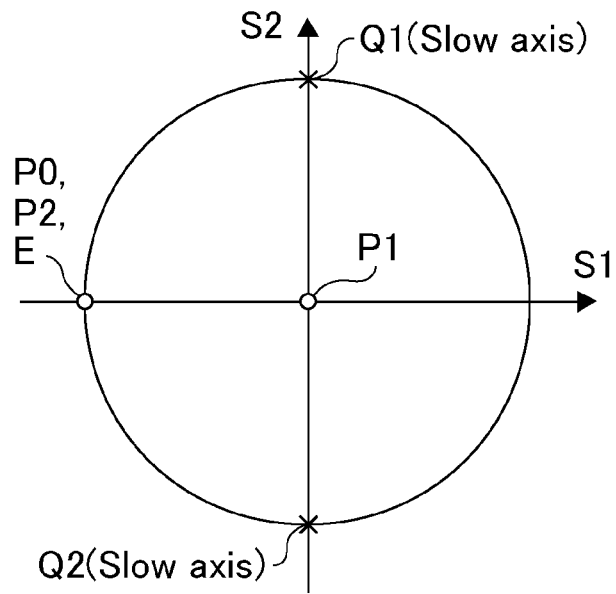
FIG. 6 shows a change in the polarization state as light passes through the components of the circularly polarized light VA-mode liquid crystal display device shown in FIG. 5 (a mode satisfying Nzq1=Nzq2=2.0, R3=−61 nm, and Rlc=320 nm) observed in the front direction, projected on the S1-S2 plane on the Poincare sphere.

The birefringent layers used in the present invention may be formed from any material and may have any optical properties. Examples thereof include those prepared by stretching a polymer film, those prepared by fixing the alignment of a liquid crystalline material, thin plates formed from an inorganic material. The birefringent layers may be formed by any method, and the most productive method can be appropriately selected in accordance with the design conditions. For example, a birefringent layer may be formed from a polymer film by solvent casting or extrusion molding. Multiple birefringent layers may be formed at the same time by co-extrusion molding. The film may not be stretched or may be stretched as long as the resulting layer can exert a desired phase difference. The film may be stretched by any method, and examples thereof include inter-roll tensile stretching, inter-roll compression stretching, tenter transverse-uniaxial stretching, diagonal stretching, and lateral and vertical biaxial stretching, as well as unique stretching in which a film is stretched under the action of shrinking force of a thermo-shrinkable film. A birefringent layer formed from a liquid crystalline material may be prepared by applying a liquid crystalline material to an alignment-treated base film and fixing the alignment. As long as the layer exerts a desired phase difference, the film may be prepared by a method without any special alignment treatment on a base film, a method in which the alignment is fixed, then the material layer is peeled off the base film, and next the pattern is transferred to another film, or the like. Further, the alignment of the liquid crystalline material may not be fixed. Even a birefringent layer formed from a non-liquid crystalline material may be prepared by the same method as the method for a birefringent layer formed from a liquid crystalline material. The first and second λ/4 plates are stacked such that they form a relative angle of about 45° with a polarizer to form a circularly polarizing plate. Thus, diagonal stretching is preferred in which a roll film is stretch-aligned in an oblique direction with respect to the machine direction. Especially, for a λ/4 plate with a smaller Nz coefficient, diagonal stretching is preferred. For a λ/4 plate with a greater Nz coefficient, on the other hand, diagonal stretching is preferred if possible, but another method may be appropriately selected. The following will specifically describe the birefringent layers classified by their types.

(Type-I Birefringent Layer)

The Type-I birefringent layer may appropriately be one prepared by stretching a film containing a material having a positive intrinsic birefringence. Examples of the material having a positive intrinsic birefringence include polycarbonate, polysulfone, polyethersulfone, polyethylene terephthalate, polyethylene, polyvinyl alcohol, norbornene, triacetyl cellulose, and diacetyl cellulose.

(Type-II Birefringent Layer)

The Type-II birefringent layer may be one prepared by stretching a film containing a material having a negative intrinsic birefringence, one prepared by stretching a film containing a material having a positive intrinsic birefringence under the action of shrinking force of a thermo-shrinkable film, or the like. For easy production, a stretched film containing a material having a negative intrinsic birefringence is particularly preferred. Examples of the material having a negative intrinsic birefringence include resin compositions containing acrylic resin and styrenic resin, polystyrene, polyvinyl naphthalene, polyvinyl biphenyl, polyvinyl pyridine, polymethyl methacrylate, polymethyl acrylate, N-substituted maleimide copolymers, polycarbonate including a fluorine skeleton, and triacetyl cellulose (especially with a low degree of acetylation). For good optical characteristics, productivity, and heat resistance, resin compositions containing acrylic resin and styrenic resin are particularly preferred. A method of producing a film containing such a resin composition is disclosed in Patent Literature 8, for example.

(Type-III Birefringent Layer)

The Type-III birefringent layer may appropriately be one prepared by laterally and vertically stretching a film containing a material having a positive intrinsic birefringence, one prepared by applying a liquid crystalline material (e.g. cholesteric (chiral nematic) liquid crystal, discotic liquid crystal), one prepared by applying a non-liquid crystalline material (e.g. polyimide, polyamide), or the like.

(Type-IV Birefringent Layer)

The Type-IV birefringent layer may appropriately be one prepared by laterally and vertically stretching a film containing a material having a negative intrinsic birefringence, one prepared by applying a liquid crystalline material (e.g. rod-like nematic liquid crystal), one prepared by applying a non-liquid crystalline material, or the like.

(Polarizer)

The polarizer may appropriately be one prepared by allowing an anisotropic material (e.g. iodine complex having dichroism) to adsorb and align on a polyvinyl alcohol (PVA) film, for example.

(Liquid Crystal Cell)

The liquid crystal cell may be any one as long as it at least displays a black screen by aligning liquid crystal molecules in the liquid crystal layer vertically to the substrate surface. Examples of display modes for such a liquid crystal cell include VA modes, such as a multi-domain VA (MVA) mode, an ultra violet-induced VA (UV2A) mode, a continuous pinwheel alignment (CPA) mode, a patterned VA (PVA) mode, a biased VA (BVA) mode, a reverse TN (RTN) mode, and an in-plane switching VA (IPS-VA) mode. The driving mode of the liquid crystal cell may be a TFT mode (active matrix mode), as well as a simple matrix mode (passive matrix mode), a plasma address mode, or the like. For example, the liquid crystal cell may have a structure such that a liquid crystal layer is disposed between a pair of substrates each of which includes an electrode and a voltage is applied to between the electrodes to display an image.

(Surface-Treated Layer)

Primary examples of the surface-treated layers include the following three layers. First one is a hard coat layer for preventing scratches, second one is an anti-glare (AG) layer for imparting anti-glare properties, and third one is an anti-reflection film for suppressing surface reflection. Examples of the anti-reflection layer include anti-reflection (AR) layers having a low reflectance, low-reflection (LR) layers having a higher reflectance than AR layers, and moth-eye layers having a very low reflectance. Such surface-treated layers are usually formed on a transparent protection film (e.g. TAC film). Multiple surface-treated layers may be stacked. Examples of such a stacked article include an AGLR layer formed by stacking an AG layer on an LR layer and an AGAR layer formed by stacking an AG layer on an AR layer. A viewing-side circularly polarizing plate is preferably produced by a roll-to-roll technique using a protection film having a surface-treated layer, a polarizer, and one of the first and second λ/4 plates having a smaller Nz coefficient.

(Method of Measuring R, Rth, Nz Coefficient, nx, ny, and nz)

These values were measured using a dual-rotating-retarder-type polarimeter (trade name: Axo-scan, manufactured by Axometrics, Inc.). The in-plane phase difference R was measured in the normal direction of the birefringent layer. For the principal refractive indices nx, ny, and nz, the phase difference in the perpendicular direction Rth, and the Nz coefficient, the phase difference was measured in the normal direction and in oblique directions inclined by −50° to 50° from the normal direction of the birefringent layer, and then the values were calculated by curve fitting using a known optical indicatrix equation. The inclination azimuth is an azimuth perpendicular to the in-plane slow axis. The values nx, ny, nz, Rxz, and Nz depend on the average refractive index (=(nx+ny+nz)/3) provided as the condition for curve fitting calculation, and the calculation was performed with the average refractive index of each birefringent layer being standardized to 1.5. Even for a birefringent layer whose actual average refractive index is not 1.5, the average refractive index was converted into an assumed value of 1.5.

(Method of Measuring Contrast Ratio-Viewing Angle Characteristics of Liquid Crystal Display Device)

These properties were determined using a viewing angle measurement device (trade name: EZContrast 160, manufactured by ELDIM). The light source was a backlight mounted on a liquid crystal television (trade name: LC37-GH1, manufactured by Sharp Corp.). The brightnesses of a white screen and of a black screen in the oblique direction in an azimuth of 45° and a pole of 60° were measured, and the ratio thereof was expressed as CR(45, 60). Also, the brightnesses of a white screen and of a black screen in the oblique direction in an azimuth of 0° and a pole of 60° were measured, and the ratio thereof was expressed as CR(0, 60).

The first liquid crystal display device of the present invention will be described in detail below referring to, but not limited to, Embodiments 1 to 5.

Embodiment 1

Figure 23:
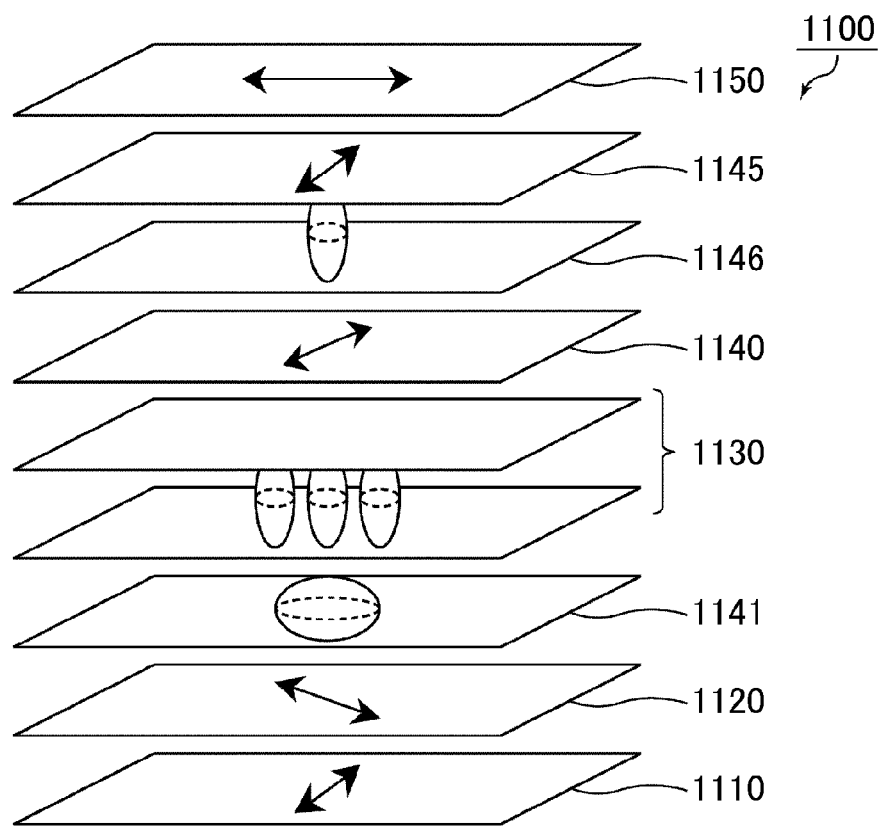
FIG. 23 is an exploded perspective view showing the structure of a circularly polarized light VA-mode liquid crystal display device of Embodiment 1 according to the first liquid crystal display device of the present invention.

As shown in FIG. 23, a liquid crystal display device of Embodiment 1 according to the first liquid crystal display device of the present invention is a circularly polarized light VA-mode liquid crystal display device 1100 including, stacked in the order set forth, a backlight (not shown), a first polarizer 1110, a first λ/4 plate (Type-I birefringent layer) 1120, a Type-III birefringent layer 1141, a VA-mode liquid crystal cell 1130, a second λ/4 plate (Type-I birefringent layer) 1140 having substantially the same Nz coefficient as the first λ/4 plate, a Type-IV birefringent layer 1146, a Type-I birefringent layer 1145, and a second polarizer 1150. Examples in which liquid crystal display devices were actually produced in accordance with the liquid crystal display device of Embodiment 1 correspond to Examples 1 to 13 and Examples 1' to 13'. Example 1' is an example in which the Nz coefficient of the Type-I birefringent layer is different from that in Example 1, and accordingly the in-plane phase difference R of the Type-I birefringent layer and the phase difference Rth in the perpendicular direction of the Type-IV birefringent layer are re-adjusted to appropriate values. The same shall apply to the pair of Example 2 and Example 2', and the following pair of Example n and Example n'.

Embodiment 2

Figure 24:
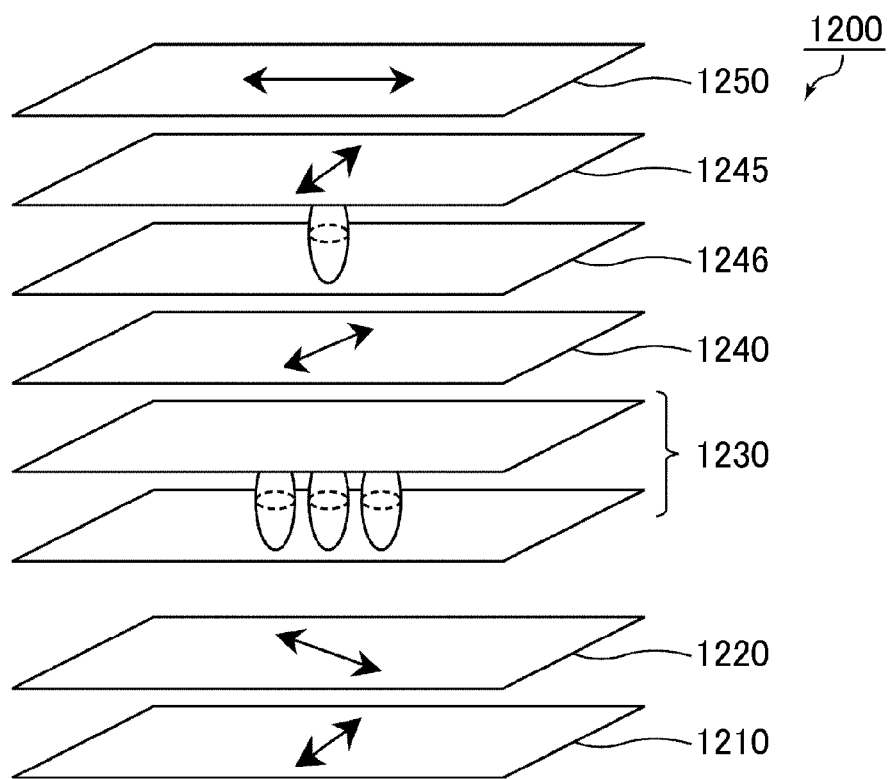
FIG. 24 is an exploded perspective view showing the structure of a circularly polarized light VA-mode liquid crystal display device of Embodiment 2 according to the first liquid crystal display device of the present invention.

As shown in FIG. 24, a liquid crystal display device of Embodiment 2 according to the first liquid crystal display device of the present invention is a circularly polarized light VA-mode liquid crystal display device 1200 including, stacked in the order set forth, a backlight (not shown), a first polarizer 1210, a first λ/4 plate (Type-I birefringent layer) 1220, a VA-mode liquid crystal cell 1230, a second λ/4 plate (Type-I birefringent layer) 1240, a Type-IV birefringent layer 1246, a Type-I birefringent layer 1245, and a second polarizer 1250. In other words, the liquid crystal display device of Embodiment 2 is similar to the liquid crystal display device of Embodiment 1 except that the display device of Embodiment 2 includes no Type-III birefringent layer and that the Nz coefficients of the first and second λ/4 plates are optimally adjusted for appropriate compensation even without a Type-III birefringent layer. Examples in which liquid crystal display devices were actually produced in accordance with the liquid crystal display device of Embodiment 2 correspond to Examples 14 to 18 and Examples 14' to 18'.

Embodiment 3

Figure 25:
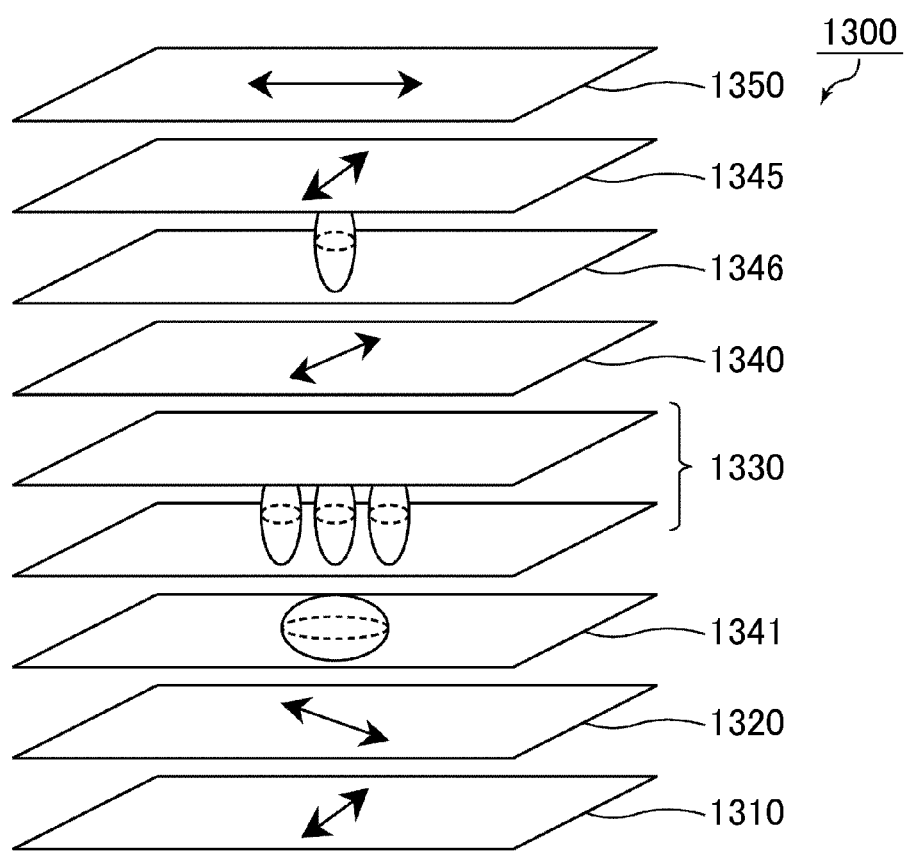
FIG. 25 is an exploded perspective view showing the structure of a circularly polarized light VA-mode liquid crystal display device of Embodiment 3 according to the first liquid crystal display device of the present invention.

As shown in FIG. 25, a liquid crystal display device of Embodiment 3 according to the first liquid crystal display device of the present invention is a circularly polarized light VA-mode liquid crystal display device 1300 including, stacked in the order set forth, a backlight (not shown), a first polarizer 1310, a first λ/4 plate (Type-I birefringent layer) 1320, a Type-III birefringent layer 1341, a VA-mode liquid crystal cell 1330, a second λ/4 plate (Type-I birefringent layer) 1340, a Type-IV birefringent layer 1346, a Type-I birefringent layer 1345, and a second polarizer 1350. The liquid crystal display device of Embodiment 3 is similar to the liquid crystal display device of Embodiment 1 except that the Nz coefficient of the first λ/4 plate and the Nz coefficient of the second λ/4 plate are adjusted to have different values. Examples in which liquid crystal display devices were actually produced in accordance with the liquid crystal display device of Embodiment 3 correspond to Example 19 and Example 19'.

Embodiment 4

Figure 26:
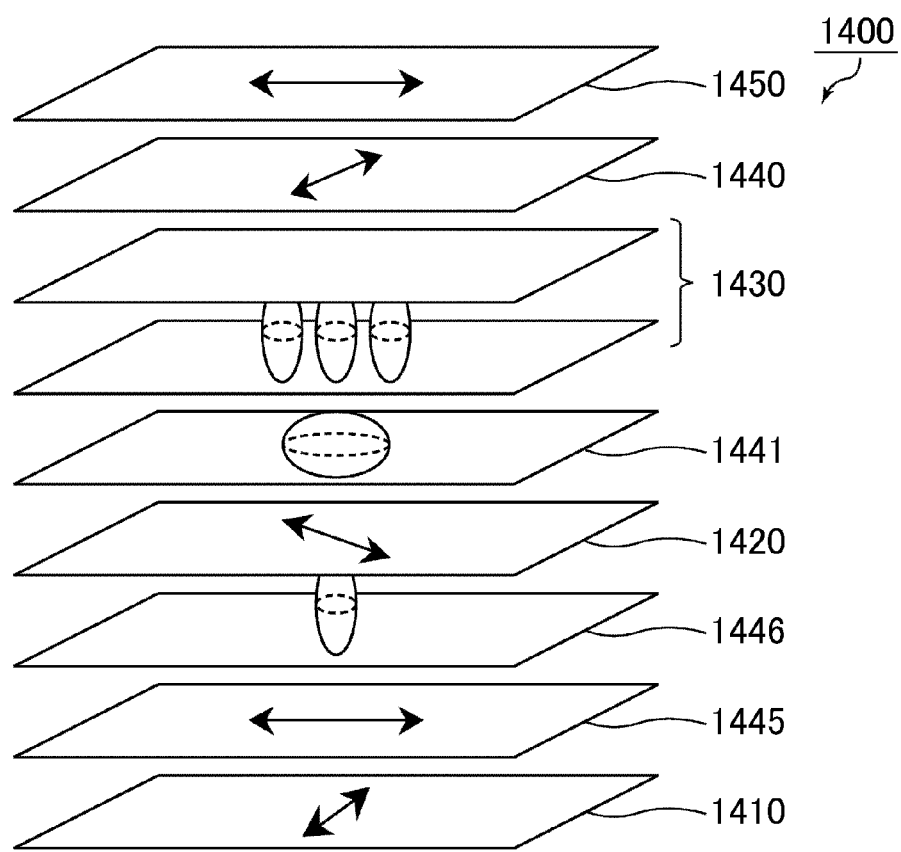
FIG. 26 is an exploded perspective view showing the structure of a circularly polarized light VA-mode liquid crystal display device of Embodiment 4 according to the first liquid crystal display device of the present invention.

As shown in FIG. 26, a liquid crystal display device of Embodiment 4 according to the first liquid crystal display device of the present invention is a circularly polarized light VA-mode liquid crystal display device 1400 including, stacked in the order set forth, a backlight (not shown), a first polarizer 1410, a Type-I birefringent layer 1445, a Type-IV birefringent layer 1446, a first λ/4 plate (Type-I birefringent layer) 1420, a Type-III birefringent layer 1441, a VA-mode liquid crystal cell 1430, a second λ/4 plate (Type-I birefringent layer) 1440, and a second polarizer 1450. The liquid crystal display device of Embodiment 4 is similar to the liquid crystal display device of Embodiment 3 except that the Type-I and Type-IV birefringent layers are disposed not on the viewing side but on the backlight side (back side) of the liquid crystal cell, and accordingly the axis angle of each birefringent layer is adjusted. Examples in which liquid crystal display devices were actually produced in accordance with the liquid crystal display device of Embodiment 4 correspond to Examples 20 and 21 and Examples 20' and 21'.

Embodiment 5

Figure 27:
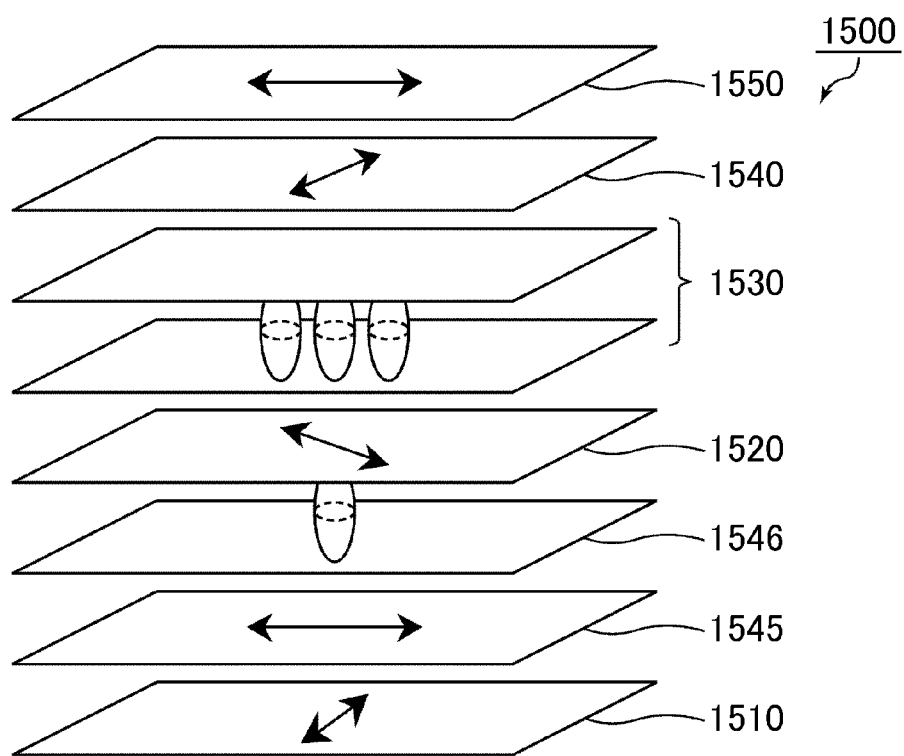
FIG. 27 is an exploded perspective view showing the structure of a circularly polarized light VA-mode liquid crystal display device of Embodiment 5 according to the first liquid crystal display device of the present invention.

As shown in FIG. 27, a liquid crystal display device of Embodiment 5 according to the first liquid crystal display device of the present invention is a circularly polarized light VA-mode liquid crystal display device 1500 including, stacked in the order set forth, a backlight (not shown), a first polarizer 1510, a Type-I birefringent layer 1545, a Type-IV birefringent layer 1546, a first λ/4 plate (Type-I birefringent layer) 1520, a VA-mode liquid crystal cell 1530, a second λ/4 plate (Type-I birefringent layer) 1540, and a second polarizer 1550. The liquid crystal display device of Embodiment 5 is similar to the liquid crystal display device of Embodiment 4 except that the display device of Embodiment 5 includes no Type-III birefringent layer and that the Nz coefficients of the first and second λ/4 plates are optimally adjusted for appropriate compensation even without a Type-III birefringent layer. Examples in which liquid crystal display devices were actually produced in accordance with the liquid crystal display device of Embodiment 5 correspond to Examples 22 to 28 and Examples 22' to 28'.

In accordance with the liquid crystal display devices of Examples 1 to 28, display devices each including a single Type-II birefringent layer instead of the stacked article of the third Type-I birefringent layer and the Type-IV birefringent layer were actually produced (Reference Examples 1 to 28).

Figures 1, 7:
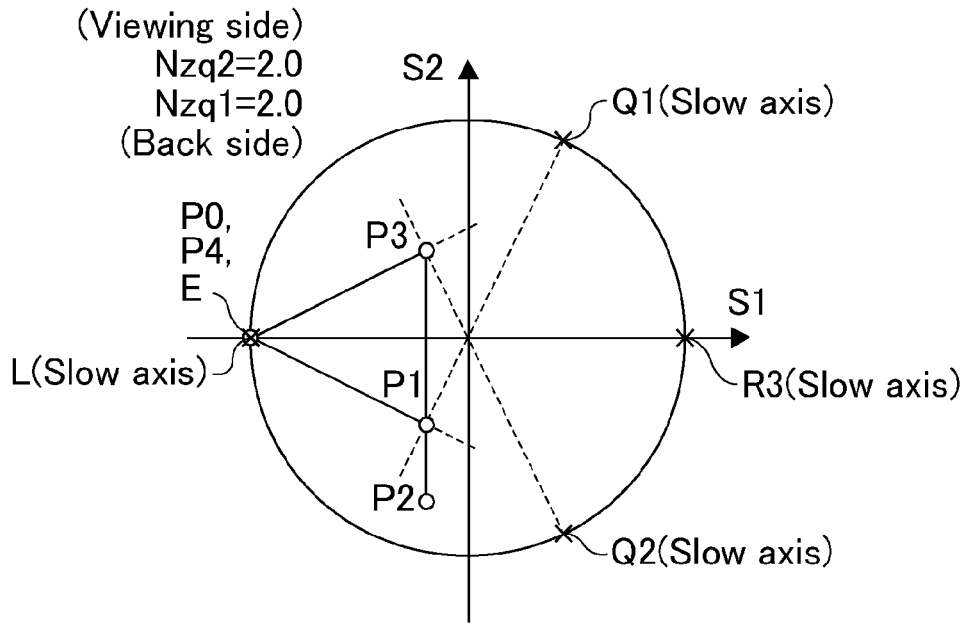
Figures 2, 7:
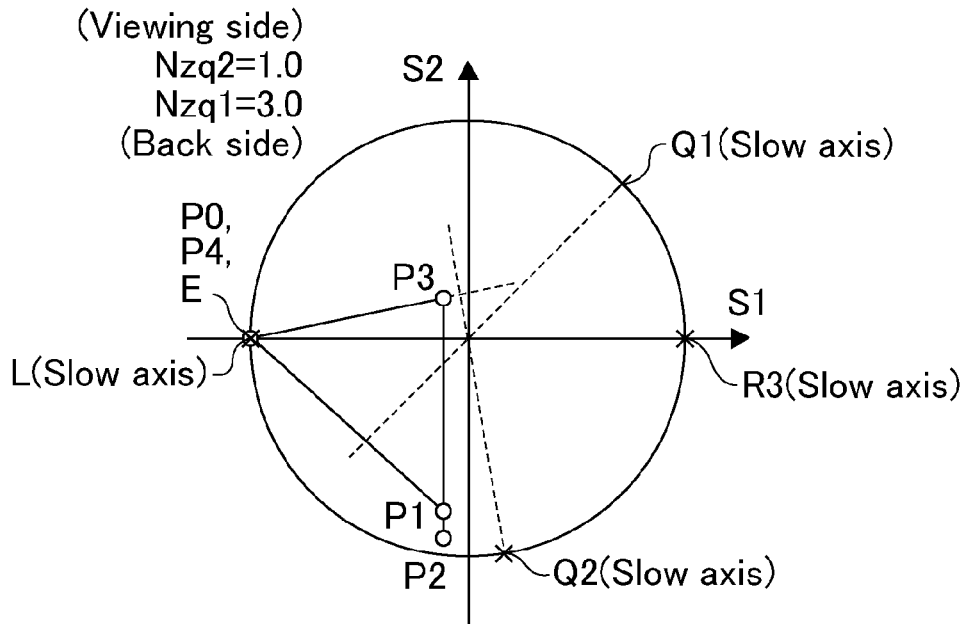
Figures 3, 7:
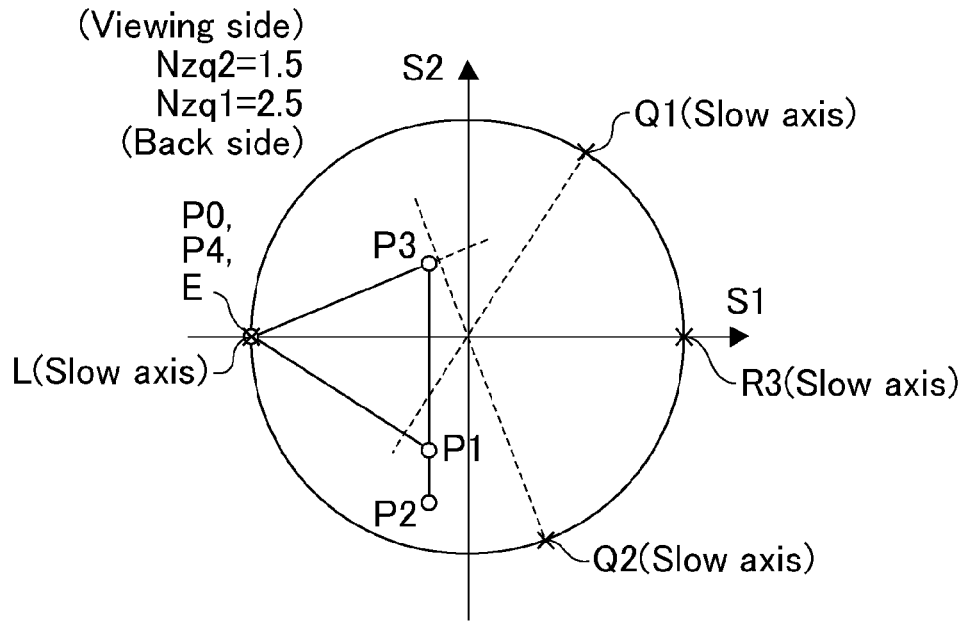
Figures 4, 7:
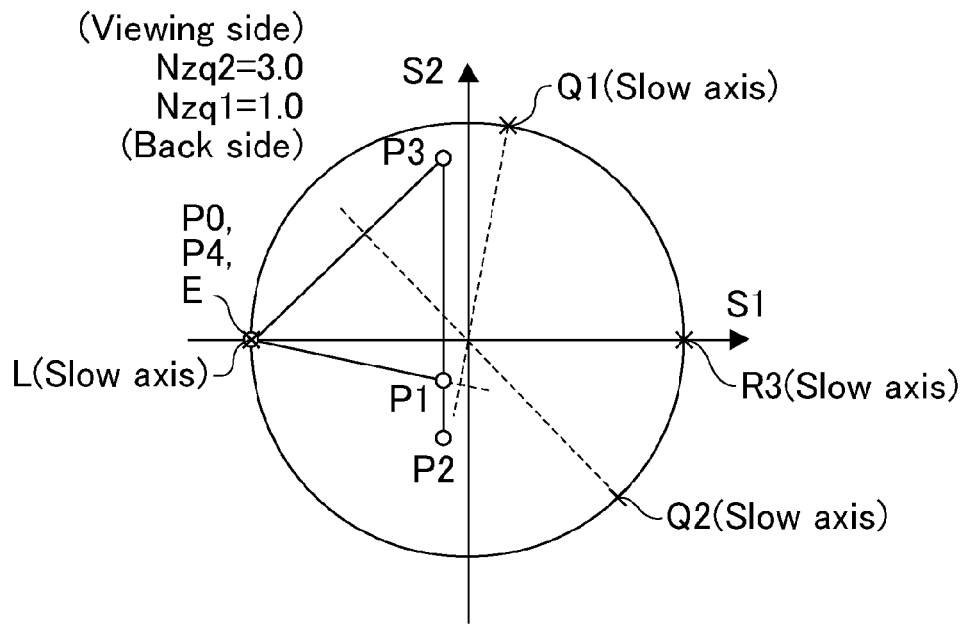
Figures 5, 7:
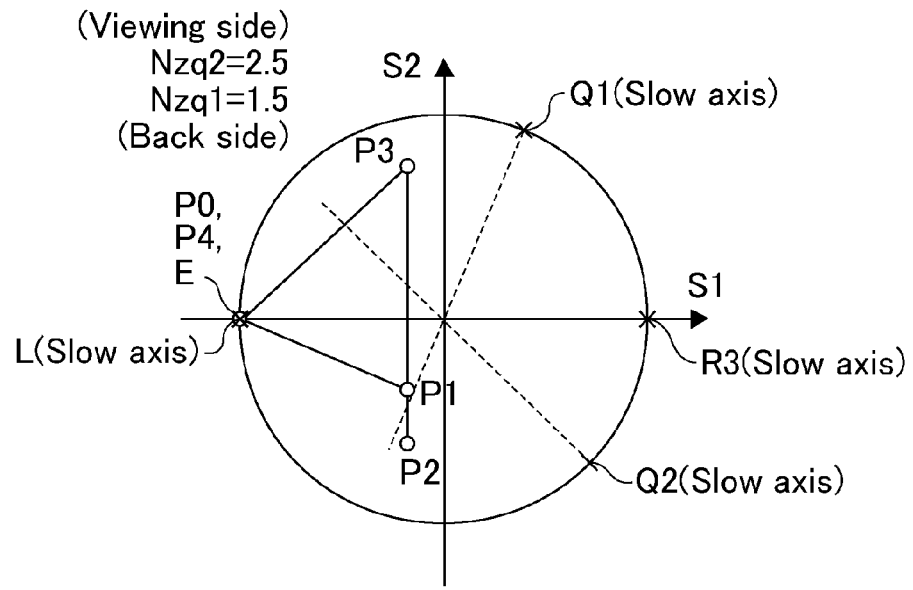
Figures 6, 7:
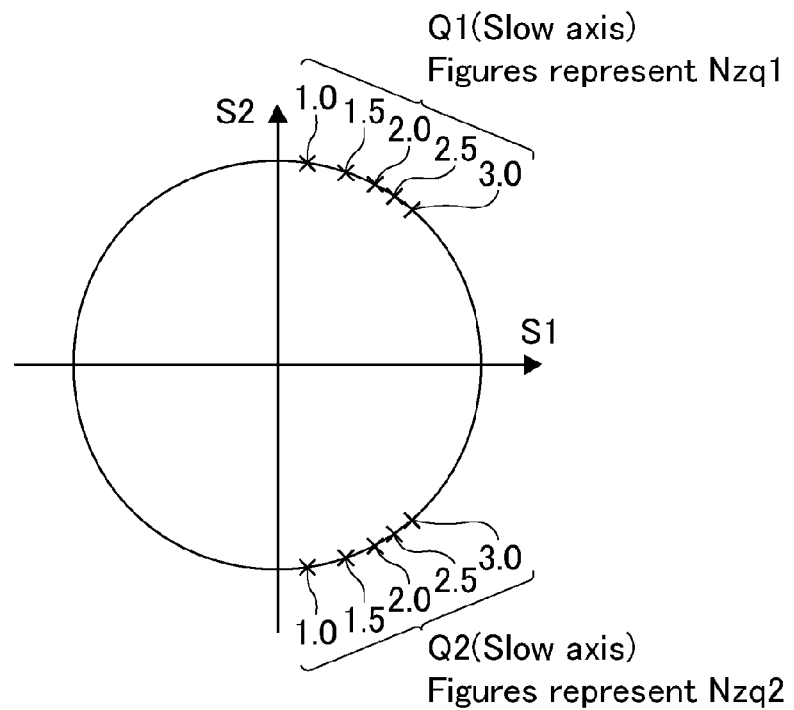
Figure 8:
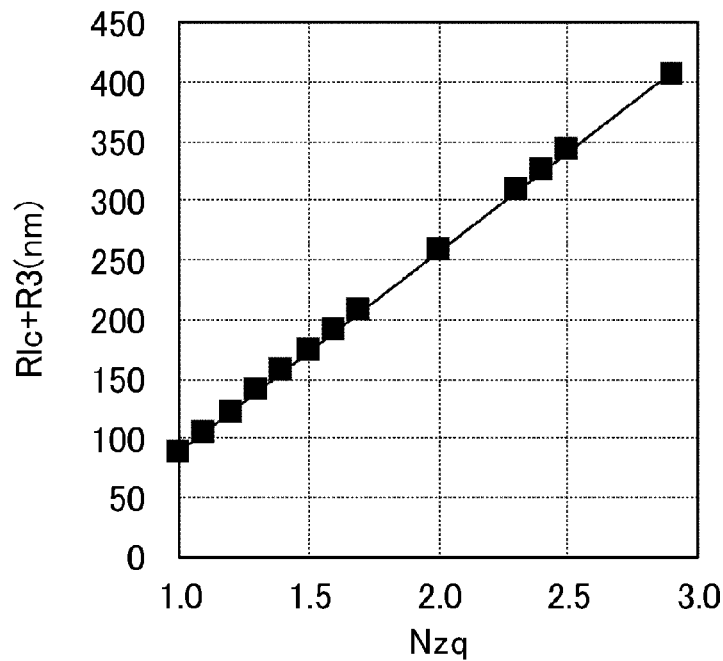
FIG. 8 is a graph showing the relationship between the average value Nzq of the Nz coefficients of the first and second λ/4 plates and the optimal value of the phase difference R3 in the perpendicular direction of the Type-III birefringent layer in the circularly polarized light VA-mode liquid crystal display device shown in FIG. 5.
Figure 9:
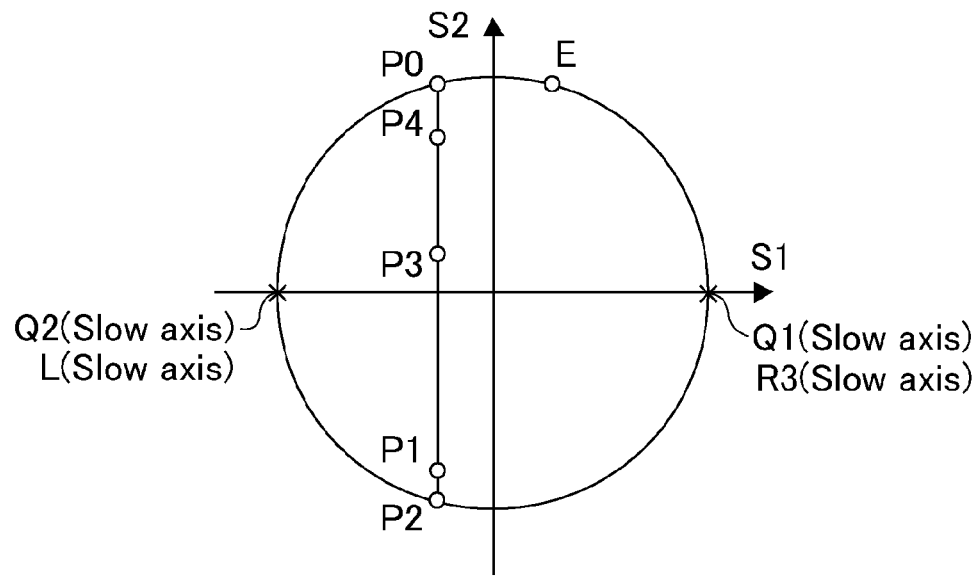
FIG. 9 shows a change in the polarization state as light passes through the components of the circularly polarized light VA-mode liquid crystal display device shown in FIG. 5 observed in the oblique direction in an azimuth of 45° and a pole of 60°, projected on the S1-S2 plane on the Poincare sphere.

Further, a liquid crystal display device disclosed in the Non-Patent Literature 2 (FIG. 7b, Table. 3) was actually produced (Comparative Example 1). The liquid crystal display device in Comparative Example 1 is greatly different from the liquid crystal display devices of Examples 1 to 28 in that the phase difference Rlc of the liquid crystal cell is as small as 260 nm.

Figure 28:
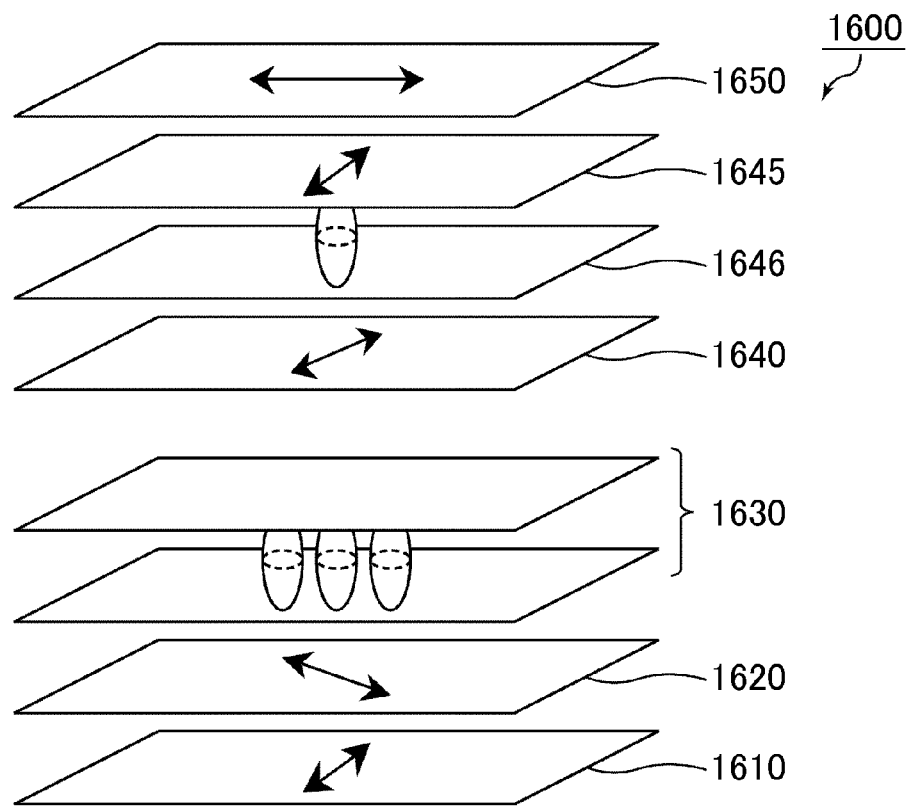
FIG. 28 is an exploded perspective view showing the structure of a circularly polarized light VA-mode liquid crystal display device of Comparative Example 1.

As shown in FIG. 28, the liquid crystal display device of Comparative Example 1 is a circularly polarized light VA-mode liquid crystal display device including, stacked in the order set forth, a backlight (not shown), a first polarizer 1610, a first λ/4 plate (Type-I birefringent layer) 1620, a VA-mode liquid crystal cell 1630, a second λ/4 plate 1640, a Type-IV birefringent layer 1646, a Type-I birefringent layer 1645, and a second polarizer 1650.

Tables 5 to 27 show the materials, axis angles, in-plane phase differences R, phase differences in the perpendicular direction Rth or Rlc, and Nz coefficients of the polarizers, the birefringent layers, and the liquid crystal cells of the respective examples. In the tables, the axes of the respective birefringent layers are defined by the azimuths of the in-plane slow axes, and the axes of the polarizers are defined by the azimuths of the absorption axes. For the Type-II birefringent layers, the in-plane fast axis is important for design. In the tables, still, the axes of the Type-II birefringent layers are defined by the azimuths of the in-plane slow axes similar to the other birefringent layers. The in-plane fast axis of the Type-II birefringent layer is perpendicular to the in-plane slow axis of the Type-II birefringent layer. In the tables, the materials of the respective birefringent layers are expressed by the following abbreviations.

NB: norbornene
ChLC: cholesteric liquid crystal
PI: polyimide
TAC: triacetyl cellulose
A: resin composition containing acrylic resin and styrenic resin In the tables, the average value of the Nz coefficients is defined as an average value of the Nz coefficient of the first λ/4 plate and the Nz coefficient of the second λ/4 plate.

(Evaluation Result 1)

The contrast ratio-viewing angle characteristics of each of the liquid crystal display devices in the examples were determined. Tables 4 to 26 show the respective values CR(0, 60) and CR(45, 60). Tables 5 to 12 show the values of Examples 1 to 28; Tables 13 to 20 show the values of Examples 1' to 28'; Tables 21 to 26 show the values of Reference Examples 1 to 28; and Table 27 shows the values of Comparative Example 1. The values CR(0, 60) and CR(45, 60) of the liquid crystal display devices of Examples 1 to 28 and 1' to 28' were each similar to the values CR(0, 60) and CR(45, 60) of Reference Examples 1 to 28 and Comparative Example 1, and the display devices of Examples 1 to 28 and 1' to 28' had very good contrast ratio-viewing angle characteristics in visual observation similar to those in Reference Examples 1 to 28 and Comparative Example 1. The liquid crystal display devices of Examples 1 to 28 and 1' to 28' had a higher brightness when displaying a white screen than the liquid crystal display device of Comparative Example 1, specifically, 5% or more brighter.

Since the Nz coefficient of the first λ/4 plate and the Nz coefficient of the second λ/4 plate are different from each other in Examples 19 to 28 and Examples 19' to 28' (Embodiments 3, 4, and 5), the productivity of a circularly polarizing plate including the first λ/4 plate with a smaller Nz coefficient is excellent, resulting in cost reduction. In particular, a general-purpose λ/4 plate produced by diagonal stretching can be used as a λ/4 plate with the Nz coefficient being adjusted to about 1.6, and thus the examples including a λ/4 plate with the Nz coefficient being adjusted to about 1.6 lead to a very large merit in production.

The liquid crystal cells of Examples 1 to 13 and 19 to 21 and Examples 1' to 13' and 19' to 21' (Embodiments 1, 3, and 4) had a greater phase difference than those of Examples 14 to 18 and 22 to 28 and Examples 14' to 18' and 22' to 28' (Embodiments 2 and 5), but the phase difference of the liquid crystal cells were compensated using a Type-III birefringent layer. Thus, practically, the liquid crystal display devices in Examples 1 to 13 and 19 to 21 and Examples 1' to 13' and 19' to 21' were optically compensated in a similar manner to that in Examples 14 to 18 and 22 to 28 and Examples 14' to 18' and 22' to 28' (Embodiments 2 and 5). As mentioned above, with respect to the first liquid crystal display device of the present invention, simply adjusting the phase difference of a Type-III birefringent layer leads to correspondence to the phase differences of multiple liquid crystal cells. Accordingly, the structure of polarizing plates on the viewing side, which is likely to include multiple types, requires no change.

As described above, the first liquid crystal display device of the present invention can have various merits on production while securing very excellent viewing angle characteristics, and can secure high brightness when displaying a white screen.

TABLE 5

Embodiment 1

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Example 1 | Second polarizer | | 0 | | | | 1.02 | 36 | 177 |
| | Type-I birefringent layer | NB | 90 | 137 | | 1.01 | | | |
| | Type-IV birefringent layer | RLC | | 0 | 139 | | | | |
| | Second λ/4 plate | NB | 45 | 138 | | 1.02 | | | |
| | VA-mode LC cell | | | | 340 | | | | |
| | Type-III birefringent layer | PI | | 0 | −250 | | | | |
| | First λ/4 plate | NB | 135 | 138 | | 1.02 | | | |
| | First polarizer | | 90 | | | | | | |
| Example 2 | Second polarizer | | 0 | | | | 1.02 | 34 | 178 |
| | Type-I birefringent layer | NB | 90 | 137 | | 1.01 | | | |
| | Type-IV birefringent layer | RLC | | 0 | 139 | | | | |
| | Second λ/4 plate | NB | 45 | 138 | | 1.02 | | | |
| | VA-mode LC cell | | | | 320 | | | | |
| | Type-III birefringent layer | PI | | 0 | −233 | | | | |
| | First λ/4 plate | NB | 135 | 138 | | 1.02 | | | |
| | First polarizer | | 90 | | | | | | |
| Example 3 | Second polarizer | | 0 | | | | 1.10 | 36 | 176 |
| | Type-I birefringent layer | NB | 90 | 137 | | 1.01 | | | |
| | Type-IV birefringent layer | RLC | | 0 | 148 | | | | |
| | Second λ/4 plate | NB | 45 | 138 | | 1.10 | | | |
| | VA-mode LC cell | | | | 340 | | | | |
| | Type-III birefringent layer | PI | | 0 | −233 | | | | |
| | First λ/4 plate | NB | 135 | 138 | | 1.10 | | | |
| | First polarizer | | 90 | | | | | | |
| Example 4 | Second polarizer | | 0 | | | | 1.10 | 37 | 176 |
| | Type-I birefringent layer | NB | 90 | 137 | | 1.01 | | | |
| | Type-IV birefringent layer | RLC | | 0 | 148 | | | | |
| | Second λ/4 plate | NB | 45 | 138 | | 1.10 | | | |
| | VA-mode LC cell | | | | 320 | | | | |
| | Type-III birefringent layer | PI | | 0 | −212 | | | | |
| | First λ/4 plate | NB | 135 | 138 | | 1.10 | | | |
| | First polarizer | | 90 | | | | | | |
| Example 5 | Second polarizer | | 0 | | | | 1.22 | 36 | 176 |
| | Type-I birefringent layer | NB | 90 | 137 | | 1.01 | | | |
| | Type-IV birefringent layer | RLC | | 0 | 161 | | | | |
| | Second λ/4 plate | NB | 45 | 138 | | 1.22 | | | |
| | VA-mode LC cell | | | | 340 | | | | |
| | Type-III birefringent layer | PI | | 0 | −212 | | | | |
| | First λ/4 plate | NB | 135 | 138 | | 1.22 | | | |
| | First polarizer | | 90 | | | | | | |

TABLE 6

Embodiment 1

| | Optical member | Material | Axis angle [°] | Phase difference [nm] R | Rth or Rlc | Nz coefficient | Average value of Nz coefficients | CR (45, 60) | CR (0, 60) |
|---|---|---|---|---|---|---|---|---|---|
| Example 6 | Second polarizer | | 0 | | | | 1.22 | 35 | 175 |
| | Type-I birefringent layer | NB | 90 | 137 | | 1.01 | | | |
| | Type-IV birefringent layer | RLC | | 0 | 161 | | | | |
| | Second λ/4 plate | NB | 45 | 138 | | 1.22 | | | |
| | VA-mode LC cell | | | | 320 | | | | |
| | Type-III birefringent layer | PI | | 0 | −198 | | | | |
| | First λ/4 plate | NB | 135 | 138 | | 1.22 | | | |
| | First polarizer | | 90 | | | | | | |

TABLE 6-continued

| | | Embodiment 1 | | | | | | | |
|---|---|---|---|---|---|---|---|---|---|
| Example 7 | Second polarizer | | 0 | | | | 1.31 | 36 | 175 |
| | Type-I birefringent layer | NB | 90 | 137 | | 1.01 | | | |
| | Type-IV birefringent layer | RLC | 0 | | 171 | | | | |
| | Second λ/4 plate | NB | 45 | 138 | | 1.31 | | | |
| | VA-mode LC cell | | | 340 | | | | | |
| | Type-III birefringent layer | PI | 0 | −198 | | | | | |
| | First λ/4 plate | NB | 135 | 138 | | 1.31 | | | |
| | First polarizer | | 90 | | | | | | |
| Example 8 | Second polarizer | | 0 | | | | 1.31 | 37 | 177 |
| | Type-I birefringent layer | NB | 90 | 137 | | 1.01 | | | |
| | Type-IV birefringent layer | RLC | 0 | | 171 | | | | |
| | Second λ/4 plate | NB | 45 | 138 | | 1.31 | | | |
| | VA-mode LC cell | | | 320 | | | | | |
| | Type-III birefringent layer | PI | 0 | −177 | | | | | |
| | First λ/4 plate | NB | 135 | 138 | | 1.31 | | | |
| | First polarizer | | 90 | | | | | | |
| Example 9 | Second polarizer | | 0 | | | | 1.58 | 65 | 174 |
| | Type-I birefringent layer | NB | 90 | 137 | | 1.01 | | | |
| | Type-IV birefringent layer | RLC | 0 | | 202 | | | | |
| | Second λ/4 plate | NB | 45 | 138 | | 1.58 | | | |
| | VA-mode LC cell | | | 340 | | | | | |
| | Type-III birefringent layer | PI | 1 | −152 | | | | | |
| | First λ/4 plate | NB | 135 | 138 | | 1.58 | | | |
| | First polarizer | | 90 | | | | | | |
| Example 10 | Second polarizer | | 0 | | | | 1.58 | 64 | 178 |
| | Type-I birefringent layer | NB | 90 | 137 | | 1.01 | | | |
| | Type-IV birefringent layer | RLC | 0 | | 202 | | | | |
| | Second λ/4 plate | NB | 45 | 138 | | 1.58 | | | |
| | VA-mode LC cell | | | 320 | | | | | |
| | Type-III birefringent layer | PI | 0 | −127 | | | | | |
| | First λ/4 plate | NB | 135 | 138 | | 1.58 | | | |
| | First polarizer | | 90 | | | | | | |

TABLE 7

| | | Embodiment 1 | | | | | | | |
|---|---|---|---|---|---|---|---|---|---|
| Example 11 | Second polarizer | | 0 | | | | 2.50 | 64 | 173 |
| | Type-I birefringent layer | NB | 90 | 137 | | 1.01 | | | |
| | Type-IV birefringent layer | RLC | 0 | | 300 | | | | |
| | Second λ/4 plate | NB | 45 | 138 | | 2.50 | | | |
| | VA-mode LC cell | | | 400 | | | | | |
| | Type-III birefringent layer | TAC | 2 | −55 | | | | | |
| | First λ/4 plate | NB | 135 | 138 | | 2.50 | | | |
| | First polarizer | | 90 | | | | | | |
| Example 12 | Second polarizer | | 0 | | | | 2.92 | 61 | 176 |
| | Type-I birefringent layer | NB | 90 | 137 | | 1.01 | | | |
| | Type-IV birefringent layer | RLC | 0 | | 344 | | | | |
| | Second λ/4 plate | NB | 45 | 138 | | 2.92 | | | |
| | VA-mode LC cell | | | 462 | | | | | |
| | Type-III birefringent layer | TAC | 2 | −55 | | | | | |
| | First λ/4 plate | NB | 135 | 138 | | 2.92 | | | |
| | First polarizer | | 90 | | | | | | |
| Example 13 | Second polarizer | | 0 | | | | 2.92 | 60 | 175 |
| | Type-I birefringent layer | NB | 90 | 137 | | 1.01 | | | |
| | Type-IV birefringent layer | RLC | 0 | | 344 | | | | |
| | Second λ/4 plate | NB | 45 | 138 | | 2.92 | | | |
| | VA-mode LC cell | | | 433 | | | | | |
| | Type-III birefringent layer | NB | 2 | −22 | | | | | |
| | First λ/4 plate | NB | 135 | 138 | | 2.92 | | | |
| | First polarizer | | 90 | | | | | | |

TABLE 8

| | | | Embodiment 2 | | | | | |
|---|---|---|---|---|---|---|---|---|
| | | | Axis | | | | Average | Evaluation results |
| | | | angle | Phase difference [nm] | | Nz | value of Nz | CR | CR |
| Optical member | | Material | [°] | R | Rth or Rlc | coefficient | coefficients | (45, 60) | (0, 60) |
| Example 14 | Second polarizer | | 0 | | | | 2.08 | 55 | 173 |
| | Type-I birefringent layer | NB | 90 | 137 | | 1.01 | | | |

TABLE 8-continued

Embodiment 2

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| | Type-IV birefringent layer | RLC | | 0 | 254 | | | | |
| | Second λ/4 plate | NB | 45 | 138 | | 2.08 | | | |
| | VA-mode LC cell | | | | 290 | | | | |
| | First λ/4 plate | NB | 135 | 138 | | 2.08 | | | |
| | First polarizer | | 90 | | | | | | |
| Example 15 | Second polarizer | | 0 | | | | 2.31 | 54 | 178 |
| | Type-I birefringent layer | NB | 90 | 137 | | 1.01 | | | |
| | Type-IV birefringent layer | RLC | | 0 | 279 | | | | |
| | Second λ/4 plate | NB | 45 | 138 | | 2.31 | | | |
| | VA-mode LC cell | | | | 310 | | | | |
| | First λ/4 plate | NB | 135 | 138 | | 2.31 | | | |
| | First polarizer | | 90 | | | | | | |
| Example 16 | Second polarizer | | 0 | | | | 2.37 | 55 | 175 |
| | Type-I birefringent layer | NB | 90 | 137 | | 1.01 | | | |
| | Type-IV birefringent layer | RLC | | 0 | 285 | | | | |
| | Second λ/4 plate | NB | 45 | 138 | | 2.37 | | | |
| | VA-mode LC cell | | | | 320 | | | | |
| | First λ/4 plate | NB | 135 | 138 | | 2.37 | | | |
| | First polarizer | | 90 | | | | | | |
| Example 17 | Second polarizer | | 0 | | | | 2.48 | 55 | 175 |
| | Type-I birefringent layer | NB | 90 | 137 | | 1.01 | | | |
| | Type-IV birefringent layer | RLC | | 0 | 298 | | | | |
| | Second λ/4 plate | NB | 45 | 138 | | 2.48 | | | |
| | VA-mode LC cell | | | | 340 | | | | |
| | First λ/4 plate | NB | 135 | 138 | | 2.48 | | | |
| | First polarizer | | 90 | | | | | | |
| Example 18 | Second polarizer | | 0 | | | | 2.91 | 50 | 170 |
| | Type-I birefringent layer | NB | 90 | 137 | | 1.01 | | | |
| | Type-IV birefringent layer | RLC | | 0 | 344 | | | | |
| | Second λ/4 plate | NB | 45 | 138 | | 2.91 | | | |
| | VA-mode LC cell | | | | 400 | | | | |
| | First λ/4 plate | NB | 135 | 138 | | 2.91 | | | |
| | First polarizer | | 90 | | | | | | |

TABLE 9

Embodiment 3

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 19 | Second polarizer | | 0 | | | | 2.05 | 50 | 173 |
| | Type-I birefringent layer | NB | 90 | 137 | | 1.01 | | | |
| | Type-IV birefringent layer | RLC | | 0 | 251 | | | | |
| | Second λ/4 plate | NB | 45 | 138 | | 2.45 | | | |
| | VA-mode LC cell | | | | 400 | | | | |
| | Type-III birefringent layer | NB | 1 | | −88 | | | | |
| | First λ/4 plate | NB | 135 | 138 | | 1.65 | | | |
| | First polarizer | | 90 | | | | | | |

TABLE 10

Embodiment 4

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 20 | Second polarizer | | 0 | | | | 2.05 | 51 | 173 |
| | Second λ/4 plate | NB | 45 | 138 | | 1.65 | | | |
| | VA-mode LC cell | | | | 360 | | | | |
| | Type-III birefringent layer | TAC | 2 | | −52 | | | | |

TABLE 10-continued

Embodiment 4

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 21 | First λ/4 plate | NB | 135 | 138 | | 2.45 | | | |
| | Type-IV birefringent layer | RLC | | 0 | 251 | | | | |
| | Type-I birefringent layer | NB | 0 | 137 | | 1.01 | | | |
| | First polarizer | | 90 | | | | | | |
| | Second polarizer | | 0 | | | | 2.05 | 48 | 173 |
| | Second λ/4 plate | NB | 45 | 138 | | 1.65 | | | |
| | VA-mode LC cell | | | | 400 | | | | |
| | Type-III birefringent layer | NB | | 1 | −88 | | | | |
| | First λ/4 plate | NB | 135 | 138 | | 2.45 | | | |
| | Type-IV birefringent layer | RLC | | 0 | 251 | | | | |
| | Type-I birefringent layer | NB | 0 | 137 | | 1.01 | | | |
| | First polarizer | | 90 | | | | | | |

TABLE 11

Embodiment 5

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 22 | Second polarizer | | 0 | | | | 2.30 | 54 | 176 |
| | Second λ/4 plate | NB | 45 | 138 | | 1.98 | | | |
| | VA-mode LC cell | | | | 310 | | | | |
| | First λ/4 plate | NB | 135 | 138 | | 2.62 | | | |
| | Type-IV birefringent layer | RLC | | 0 | 278 | | | | |
| | Type-I birefringent layer | NB | 0 | 137 | | 1.01 | | | |
| | First polarizer | | 90 | | | | | | |

TABLE 12

Embodiment 5

| | | | | | | | | | |
|---|---|---|---|---|---|---|---|---|---|
| Example 23 | Second polarizer | | 0 | | | | 2.30 | 55 | 176 |
| | Second λ/4 plate | NB | 45 | 138 | | 1.65 | | | |
| | VA-mode LC cell | | | | 310 | | | | |
| | First λ/4 plate | NB | 135 | 138 | | 2.95 | | | |
| | Type-IV birefringent layer | RLC | | 0 | 278 | | | | |
| | Type-I birefringent layer | NB | 0 | 137 | | 1.01 | | | |
| | First polarizer | | 90 | | | | | | |
| Example 24 | Second polarizer | | 0 | | | | 2.31 | 56 | 178 |
| | Second λ/4 plate | NB | 45 | 138 | | 1.38 | | | |
| | VA-mode LC cell | | | | 310 | | | | |
| | First λ/4 plate | NB | 135 | 138 | | 3.29 | | | |
| | Type-IV birefringent layer | RLC | | 0 | 278 | | | | |
| | Type-I birefringent layer | NB | 0 | 137 | | 1.01 | | | |
| | First polarizer | | 90 | | | | | | |
| Example 25 | Second polarizer | | 0 | | | | 2.38 | 54 | 174 |
| | Second λ/4 plate | NB | 45 | 138 | | 1.01 | | | |
| | VA-mode LC cell | | | | 310 | | | | |
| | First λ/4 plate | NB | 135 | 138 | | 3.65 | | | |
| | Type-IV birefringent layer | RLC | | 0 | 287 | | | | |
| | Type-I birefringent layer | NB | 0 | 137 | | 1.01 | | | |
| | First polarizer | | 90 | | | | | | |
| Example 26 | Second polarizer | | 0 | | | | 2.05 | 50 | 175 |
| | Second λ/4 plate | NB | 45 | 138 | | 1.65 | | | |
| | VA-mode LC cell | | | | 310 | | | | |
| | First λ/4 plate | NB | 135 | 138 | | 2.45 | | | |
| | Type-IV birefringent layer | RLC | | 0 | 251 | | | | |
| | Type-I birefringent layer | NB | 0 | 137 | | 1.01 | | | |
| | First polarizer | | 90 | | | | | | |
| Example 27 | Second polarizer | | 0 | | | | 2.02 | 49 | 175 |
| | Second λ/4 plate | NB | 45 | 138 | | 1.38 | | | |
| | VA-mode LC cell | | | | 310 | | | | |
| | First λ/4 plate | NB | 135 | 138 | | 2.66 | | | |

TABLE 12-continued

| | | | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| | Embodiment 5 | | | | | | | | |
| | Type-IV birefringent layer | RLC | | 0 | 251 | | | | |
| | Type-I birefringent layer | NB | 0 | 137 | | 1.01 | | | |
| | First polarizer | | 90 | | | | | | |
| Example 28 | Second polarizer | | 0 | | | | 2.01 | 51 | 177 |
| | Second λ/4 plate | NB | 45 | 138 | | 1.00 | | | |
| | VA-mode LC cell | | | | 310 | | | | |
| | First λ/4 plate | NB | 135 | 138 | | 3.02 | | | |
| | Type-IV birefringent layer | RLC | | 0 | 251 | | | | |
| | Type-I birefringent layer | NB | 0 | 137 | | 1.01 | | | |
| | First polarizer | | 90 | | | | | | |

TABLE 13

| | | | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| | Embodiment 1 | | | | | | | | |
| Example 1' | Second polarizer | | 0 | | | | 1.02 | 35 | 177 |
| | Type-I birefringent layer | NB | 90 | 96 | | 1.98 | | | |
| | Type-IV birefringent layer | RLC | | 0 | 206 | | | | |
| | Second λ/4 plate | NB | 45 | 138 | | 1.02 | | | |
| | VA-mode LC cell | | | | 340 | | | | |
| | Type-III birefringent layer | PI | | 0 | −250 | | | | |
| | First λ/4 plate | NB | 135 | 138 | | 1.02 | | | |
| | First polarizer | | 90 | | | | | | |
| Example 2' | Second polarizer | | 0 | | | | 1.02 | 32 | 176 |
| | Type-I birefringent layer | NB | 90 | 96 | | 1.98 | | | |
| | Type-IV birefringent layer | RLC | | 0 | 206 | | | | |
| | Second λ/4 plate | NB | 45 | 138 | | 1.02 | | | |
| | VA-mode LC cell | | | | 320 | | | | |
| | Type-III birefringent layer | PI | | 0 | −233 | | | | |
| | First λ/4 plate | NB | 135 | 138 | | 1.02 | | | |
| | First polarizer | | 90 | | | | | | |
| Example 3' | Second polarizer | | 0 | | | | 1.10 | 35 | 175 |
| | Type-I birefringent layer | NB | 90 | 96 | | 1.98 | | | |
| | Type-IV birefringent layer | RLC | | 0 | 215 | | | | |
| | Second λ/4 plate | NB | 45 | 138 | | 1.10 | | | |
| | VA-mode LC cell | | | | 340 | | | | |
| | Type-III birefringent layer | PI | | 0 | −233 | | | | |
| | First λ/4 plate | NB | 135 | 138 | | 1.10 | | | |
| | First polarizer | | 90 | | | | | | |
| Example 4' | Second polarizer | | 0 | | | | 1.10 | 37 | 175 |
| | Type-I birefringent layer | NB | 90 | 96 | | 1.98 | | | |
| | Type-IV birefringent layer | RLC | | 0 | 215 | | | | |
| | Second λ/4 plate | NB | 45 | 138 | | 1.10 | | | |
| | VA-mode LC cell | | | | 320 | | | | |
| | Type-III birefringent layer | PI | | 0 | −212 | | | | |
| | First λ/4 plate | NB | 135 | 138 | | 1.10 | | | |
| | First polarizer | | 90 | | | | | | |
| Example 5' | Second polarizer | | 0 | | | | 1.22 | 36 | 177 |
| | Type-I birefringent layer | NB | 90 | 96 | | 1.98 | | | |
| | Type-IV birefringent layer | RLC | | 0 | 227 | | | | |
| | Second λ/4 plate | NB | 45 | 138 | | 1.22 | | | |
| | VA-mode LC cell | | | | 340 | | | | |
| | Type-III birefringent layer | PI | | 0 | −212 | | | | |
| | First λ/4 plate | NB | 135 | 138 | | 1.22 | | | |
| | First polarizer | | 90 | | | | | | |

TABLE 14

| | | | | | | | | | |
|---|---|---|---|---|---|---|---|---|---|
| | Embodiment 1 | | | | | | | | |
| Example 6' | Second polarizer | | 0 | | | | 1.22 | 35 | 175 |
| | Type-I birefringent layer | NB | 90 | 96 | | 1.98 | | | |
| | Type-IV birefringent layer | RLC | | 0 | 227 | | | | |
| | Second λ/4 plate | NB | 45 | 138 | | 1.22 | | | |
| | VA-mode LC cell | | | | 320 | | | | |

TABLE 14-continued

| | | | | | | | | |
|---|---|---|---|---|---|---|---|---|
| | | | Embodiment 1 | | | | | |
| | Type-III birefringent layer | PI | 0 | −198 | | | | |
| | First λ/4 plate | NB | 135 | 138 | | 1.22 | | |
| | First polarizer | | 90 | | | | | |
| Example 7' | Second polarizer | | 0 | | | 1.31 | 36 | 177 |
| | Type-I birefringent layer | NB | 90 | 96 | | 1.98 | | |
| | Type-IV birefringent layer | RLC | | 0 | 237 | | | |
| | Second λ/4 plate | NB | 45 | 138 | | 1.31 | | |
| | VA-mode LC cell | | | | 340 | | | |
| | Type-III birefringent layer | PI | 0 | −198 | | | | |
| | First λ/4 plate | NB | 135 | 138 | | 1.31 | | |
| | First polarizer | | 90 | | | | | |
| Example 8' | Second polarizer | | 0 | | | 1.31 | 36 | 176 |
| | Type-I birefringent layer | NB | 90 | 96 | | 1.98 | | |
| | Type-IV birefringent layer | RLC | | 0 | 237 | | | |
| | Second λ/4 plate | NB | 45 | 138 | | 1.31 | | |
| | VA-mode LC cell | | | | 320 | | | |
| | Type-III birefringent layer | PI | 0 | −177 | | | | |
| | First λ/4 plate | NB | 135 | 138 | | 1.31 | | |
| | First polarizer | | 90 | | | | | |
| Example 9' | Second polarizer | | 0 | | | 1.58 | 65 | 174 |
| | Type-I birefringent layer | NB | 90 | 96 | | 1.98 | | |
| | Type-IV birefringent layer | RLC | | 0 | 266 | | | |
| | Second λ/4 plate | NB | 45 | 138 | | 1.58 | | |
| | VA-mode LC cell | | | | 340 | | | |
| | Type-III birefringent layer | PI | 1 | −152 | | | | |
| | First λ/4 plate | NB | 135 | 138 | | 1.58 | | |
| | First polarizer | | 90 | | | | | |
| Example 10' | Second polarizer | | 0 | | | 1.58 | 65 | 177 |
| | Type-I birefringent layer | NB | 90 | 96 | | 1.98 | | |
| | Type-IV birefringent layer | RLC | | 0 | 266 | | | |
| | Second λ/4 plate | NB | 45 | 138 | | 1.58 | | |
| | VA-mode LC cell | | | | 320 | | | |
| | Type-III birefringent layer | PI | 0 | −127 | | | | |
| | First λ/4 plate | NB | 135 | 138 | | 1.58 | | |
| | First polarizer | | 90 | | | | | |
| Example 11' | Second polarizer | | 0 | | | 2.50 | 65 | 174 |
| | Type-I birefringent layer | NB | 90 | 96 | | 1.98 | | |
| | Type-IV birefringent layer | RLC | | 0 | 366 | | | |
| | Second λ/4 plate | NB | 45 | 138 | | 2.50 | | |
| | VA-mode LC cell | | | | 400 | | | |
| | Type-III birefringent layer | TAC | 2 | −55 | | | | |
| | First λ/4 plate | NB | 135 | 138 | | 2.50 | | |
| | First polarizer | | 90 | | | | | |

TABLE 15

| | | | | | | | | |
|---|---|---|---|---|---|---|---|---|
| | | | Embodiment 1 | | | | | |
| Example 12' | Second polarizer | | 0 | | | 2.92 | 58 | 174 |
| | Type-I birefringent layer | NB | 90 | 96 | | 1.98 | | |
| | Type-IV birefringent layer | RLC | | 0 | 412 | | | |
| | Second λ/4 plate | NB | 45 | 138 | | 2.92 | | |
| | VA-mode LC cell | | | | 462 | | | |
| | Type-III birefringent layer | TAC | 2 | −55 | | | | |
| | First λ/4 plate | NB | 135 | 138 | | 2.92 | | |
| | First polarizer | | 90 | | | | | |
| Example 13' | Second polarizer | | 0 | | | 2.92 | 60 | 174 |
| | Type-I birefringent layer | NB | 90 | 96 | | 1.98 | | |
| | Type-IV birefringent layer | RLC | | 0 | 412 | | | |
| | Second λ/4 plate | NB | 45 | 138 | | 2.92 | | |
| | VA-mode LC cell | | | | 433 | | | |
| | Type-III birefringent layer | NB | 2 | −22 | | | | |
| | First λ/4 plate | NB | 135 | 138 | | 2.92 | | |
| | First polarizer | | 90 | | | | | |

TABLE 16

Embodiment 2

| | | | Axis angle [°] | Phase difference [nm] | | Nz coefficient | Average value of Nz coefficients | Evaluation results | |
|---|---|---|---|---|---|---|---|---|---|
| | Optical member | Material | | R | Rth or Rlc | | | CR (45, 60) | CR (0, 60) |
| Example 14' | Second polarizer | | 0 | | | | 2.08 | 55 | 173 |
| | Type-I birefringent layer | NB | 90 | 96 | | 1.98 | | | |
| | Type-IV birefringent layer | RLC | | 0 | 320 | | | | |
| | Second λ/4 plate | NB | 45 | 138 | | 2.08 | | | |
| | VA-mode LC cell | | | | 290 | | | | |
| | First λ/4 plate | NB | 135 | 138 | | 2.08 | | | |
| | First polarizer | | 90 | | | | | | |
| Example 15' | Second polarizer | | 0 | | | | 2.31 | 54 | 177 |
| | Type-I birefringent layer | NB | 90 | 96 | | 1.98 | | | |
| | Type-IV birefringent layer | RLC | | 0 | 246 | | | | |
| | Second λ/4 plate | NB | 45 | 138 | | 2.31 | | | |
| | VA-mode LC cell | | | | 310 | | | | |
| | First λ/4 plate | NB | 135 | 138 | | 2.31 | | | |
| | First polarizer | | 90 | | | | | | |
| Example 16' | Second polarizer | | 0 | | | | 2.37 | 56 | 175 |
| | Type-I birefringent layer | NB | 90 | 96 | | 1.98 | | | |
| | Type-IV birefringent layer | RLC | | 0 | 352 | | | | |
| | Second λ/4 plate | NB | 45 | 138 | | 2.37 | | | |
| | VA-mode LC cell | | | | 320 | | | | |
| | First λ/4 plate | NB | 135 | 138 | | 2.37 | | | |
| | First polarizer | | 90 | | | | | | |
| Example 17' | Second polarizer | | 0 | | | | 2.48 | 55 | 175 |
| | Type-I birefringent layer | NB | 90 | 96 | | 1.98 | | | |
| | Type-IV birefringent layer | RLC | | 0 | 364 | | | | |
| | Second λ/4 plate | NB | 45 | 138 | | 2.48 | | | |
| | VA-mode LC cell | | | | 340 | | | | |
| | First λ/4 plate | NB | 135 | 138 | | 2.48 | | | |
| | First polarizer | | 90 | | | | | | |
| Example 18' | Second polarizer | | 0 | | | | 2.91 | 51 | 170 |
| | Type-I birefringent layer | NB | 90 | 96 | | 1.98 | | | |
| | Type-IV birefringent layer | RLC | | 0 | 412 | | | | |
| | Second λ/4 plate | NB | 45 | 138 | | 2.91 | | | |
| | VA-mode LC cell | | | | 400 | | | | |
| | First λ/4 plate | NB | 135 | 138 | | 2.91 | | | |
| | First polarizer | | 90 | | | | | | |

TABLE 17

Embodiment 3

| | | | Axis angle [°] | Phase difference [nm] | | Nz coefficient | Average value of Nz coefficients | Evaluation results | |
|---|---|---|---|---|---|---|---|---|---|
| | Optical member | Material | | R | Rth or Rlc | | | CR (45, 60) | CR (0, 60) |
| Example 19' | Second polarizer | | 0 | | | | 2.05 | 50 | 172 |
| | Type-I birefringent layer | NB | 90 | 96 | | 1.98 | | | |
| | Type-IV birefringent layer | RLC | | 0 | 317 | | | | |
| | Second λ/4 plate | NB | 45 | 138 | | 2.45 | | | |
| | VA-mode LC cell | | | | 400 | | | | |
| | Type-III birefringent layer | NB | | 1 | −88 | | | | |
| | First λ/4 plate | NB | 135 | 138 | | 1.65 | | | |
| | First polarizer | | 90 | | | | | | |

TABLE 18

Embodiment 4

| | | | Axis angle [°] | Phase difference [nm] | | Nz coefficient | Average value of Nz coefficients | Evaluation results | |
|---|---|---|---|---|---|---|---|---|---|
| | Optical member | Material | | R | Rth or Rlc | | | CR (45, 60) | CR (0, 60) |
| Example 20' | Second polarizer | | 0 | | | | 2.05 | 49 | 170 |
| | Second λ/4 plate | NB | 45 | 138 | | 1.65 | | | |

TABLE 18-continued

| | | | Axis | Phase difference [nm] | | | Average | Evaluation results | |
| | | | angle | | | Nz | value of Nz | CR | CR |
| | Optical member | Material | [°] | R | Rth or Rlc | coefficient | coefficients | (45, 60) | (0, 60) |
|---|---|---|---|---|---|---|---|---|---|
| | \multicolumn{10}{l}{Embodiment 4} |

| | Optical member | Material | Axis angle [°] | R | Rth or Rlc | Nz coefficient | Average value of Nz coefficients | CR (45, 60) | CR (0, 60) |
|---|---|---|---|---|---|---|---|---|---|
| | VA-mode LC cell | | | | 360 | | | | |
| | Type-III birefringent layer | TAC | | 2 | −52 | | | | |
| | First λ/4 plate | NB | 135 | 138 | | 2.45 | | | |
| | Type-IV birefringent layer | RLC | | 0 | 317 | | | | |
| | Type-I birefringent layer | NB | 0 | 96 | | 1.98 | | | |
| | First polarizer | | 90 | | | | | | |
| Example 21' | Second polarizer | | 0 | | | | 2.05 | 48 | 175 |
| | Second λ/4 plate | NB | 45 | 138 | | 1.65 | | | |
| | VA-mode LC cell | | | | 400 | | | | |
| | Type-III birefringent layer | NB | | 1 | −88 | | | | |
| | First λ/4 plate | NB | 135 | 138 | | 2.45 | | | |
| | Type-IV birefringent layer | RLC | | 0 | 317 | | | | |
| | Type-I birefringent layer | NB | 0 | 96 | | 1.98 | | | |
| | First polarizer | | 90 | | | | | | |

TABLE 19

Embodiment 5

| | Optical member | Material | Axis angle [°] | R | Rth or Rlc | Nz coefficient | Average value of Nz coefficients | CR (45, 60) | CR (0, 60) |
|---|---|---|---|---|---|---|---|---|---|
| Example 22' | Second polarizer | | 0 | | | | 2.30 | 54 | 176 |
| | Second λ/4 plate | NB | 45 | 138 | | 1.98 | | | |
| | VA-mode LC cell | | | | 310 | | | | |
| | First λ/4 plate | NB | 135 | 138 | | 2.62 | | | |
| | Type-IV birefringent layer | RLC | | 0 | 344 | | | | |
| | Type-I birefringent layer | NB | 0 | 96 | | 1.98 | | | |
| | First polarizer | | 90 | | | | | | |

TABLE 20

Embodiment 5

| | Optical member | Material | Axis angle [°] | R | Rth or Rlc | Nz coefficient | Avg Nz | CR (45,60) | CR (0,60) |
|---|---|---|---|---|---|---|---|---|---|
| Example 23' | Second polarizer | | 0 | | | | 2.30 | 55 | 175 |
| | Second λ/4 plate | NB | 45 | 138 | | 1.65 | | | |
| | VA-mode LC cell | | | | 310 | | | | |
| | First λ/4 plate | NB | 135 | 138 | | 2.95 | | | |
| | Type-IV birefringent layer | RLC | | 0 | 344 | | | | |
| | Type-I birefringent layer | NB | 0 | 96 | | 1.98 | | | |
| | First polarizer | | 90 | | | | | | |
| Example 24' | Second polarizer | | 0 | | | | 2.31 | 55 | 176 |
| | Second λ/4 plate | NB | 45 | 138 | | 1.38 | | | |
| | VA-mode LC cell | | | | 310 | | | | |
| | First λ/4 plate | NB | 135 | 138 | | 3.29 | | | |
| | Type-IV birefringent layer | RLC | | 0 | 344 | | | | |
| | Type-I birefringent layer | NB | 0 | 96 | | 1.98 | | | |
| | First polarizer | | 90 | | | | | | |
| Example 25' | Second polarizer | | 0 | | | | 2.38 | 53 | 173 |
| | Second λ/4 plate | NB | 45 | 138 | | 1.01 | | | |
| | VA-mode LC cell | | | | 310 | | | | |
| | First λ/4 plate | NB | 135 | 138 | | 3.65 | | | |
| | Type-IV birefringent layer | RLC | | 0 | 353 | | | | |
| | Type-I birefringent layer | NB | 0 | 96 | | 1.98 | | | |
| | First polarizer | | 90 | | | | | | |
| Example 26' | Second polarizer | | 0 | | | | 2.05 | 50 | 176 |
| | Second λ/4 plate | NB | 45 | 138 | | 1.65 | | | |
| | VA-mode LC cell | | | | 310 | | | | |
| | First λ/4 plate | NB | 135 | 138 | | 2.45 | | | |
| | Type-IV birefringent layer | RLC | | 0 | 317 | | | | |
| | Type-I birefringent layer | NB | 0 | 96 | | 1.98 | | | |
| | First polarizer | | 90 | | | | | | |
| Example 27' | Second polarizer | | 0 | | | | 2.02 | 48 | 173 |
| | Second λ/4 plate | NB | 45 | 138 | | 1.38 | | | |

TABLE 20-continued

| | | Embodiment 5 | | | | | | | |
|---|---|---|---|---|---|---|---|---|---|
| | VA-mode LC cell | | | | 310 | | | | |
| | First λ/4 plate | NB | 135 | 138 | | 2.66 | | | |
| | Type-IV birefringent layer | RLC | | 0 | 317 | | | | |
| | Type-I birefringent layer | NB | 0 | 96 | | 1.98 | | | |
| | First polarizer | | 90 | | | | | | |
| Example 28' | Second polarizer | | 0 | | | | 2.01 | 49 | 176 |
| | Second λ/4 plate | NB | 45 | 138 | | 1.00 | | | |
| | VA-mode LC cell | | | | 310 | | | | |
| | First λ/4 plate | NB | 135 | 138 | | 3.02 | | | |
| | Type-IV birefringent layer | RLC | | 0 | 317 | | | | |
| | Type-I birefringent layer | NB | 0 | 96 | | 1.98 | | | |
| | First polarizer | | 90 | | | | | | |

TABLE 21

| | | | Axis angle [°] | Phase difference [nm] | | Nz coefficient | Average value of Nz coefficients | Evaluation results | |
|---|---|---|---|---|---|---|---|---|---|
| | Optical member | Material | | R | Rth or Rlc | | | CR (45, 60) | CR (0, 60) |
| Reference Example 1 | Second polarizer | | 0 | | | | | 1.02 | 35 | 178 |
| | Type-II birefringent layer | A | 0 | 138 | | −0.01 | | | |
| | Second λ/4 plate | NB | 45 | 138 | | 1.02 | | | |
| | VA-mode LC cell | | | | 340 | | | | |
| | Type-III birefringent layer | PI | 0 | | −250 | | | | |
| | First λ/4 plate | NB | 135 | 138 | | 1.02 | | | |
| | First polarizer | | 90 | | | | | | |
| Reference Example 2 | Second polarizer | | 0 | | | | | 1.02 | 34 | 178 |
| | Type-II birefringent layer | A | 0 | 138 | | −0.01 | | | |
| | Second λ/4 plate | NB | 45 | 138 | | 1.02 | | | |
| | VA-mode LC cell | | | | 320 | | | | |
| | Type-III birefringent layer | PI | 0 | | −233 | | | | |
| | First λ/4 plate | NB | 135 | 138 | | 1.02 | | | |
| | First polarizer | | 90 | | | | | | |
| Reference Example 3 | Second polarizer | | 0 | | | | | 1.10 | 37 | 178 |
| | Type-II birefringent layer | A | 0 | 138 | | −0.01 | | | |
| | Second λ/4 plate | NB | 45 | 138 | | 1.10 | | | |
| | VA-mode LC cell | | | | 340 | | | | |
| | Type-III birefringent layer | PI | 0 | | −233 | | | | |
| | First λ/4 plate | NB | 135 | 138 | | 1.10 | | | |
| | First polarizer | | 90 | | | | | | |
| Reference Example 4 | Second polarizer | | 0 | | | | | 1.10 | 37 | 176 |
| | Type-II birefringent layer | A | 0 | 138 | | −0.01 | | | |
| | Second λ/4 plate | NB | 45 | 138 | | 1.10 | | | |
| | VA-mode LC cell | | | | 320 | | | | |
| | Type-III birefringent layer | PI | 0 | | −212 | | | | |
| | First λ/4 plate | NB | 135 | 138 | | 1.10 | | | |
| | First polarizer | | 90 | | | | | | |
| Reference Example 5 | Second polarizer | | 0 | | | | | 1.22 | 38 | 177 |
| | Type-II birefringent layer | A | 0 | 138 | | −0.01 | | | |
| | Second λ/4 plate | NB | 45 | 138 | | 1.22 | | | |
| | VA-mode LC cell | | | | 340 | | | | |
| | Type-III birefringent layer | PI | 0 | | −212 | | | | |
| | First λ/4 plate | NB | 135 | 138 | | 1.22 | | | |
| | First polarizer | | 90 | | | | | | |
| Reference Example 6 | Second polarizer | | 0 | | | | | 1.22 | 36 | 177 |
| | Type-II birefringent layer | A | 0 | 138 | | −0.01 | | | |
| | Second λ/4 plate | NB | 45 | 138 | | 1.22 | | | |
| | VA-mode LC cell | | | | 320 | | | | |
| | Type-III birefringent layer | PI | 0 | | −198 | | | | |
| | First λ/4 plate | NB | 135 | 138 | | 1.22 | | | |
| | First polarizer | | 90 | | | | | | |

TABLE 22

| Reference Example 7 | Second polarizer | | 0 | | | | 1.31 | 37 | 177 |
|---|---|---|---|---|---|---|---|---|---|
| | Type-II birefringent layer | A | 0 | 138 | | −0.01 | | | |
| | Second λ/4 plate | NB | 45 | 138 | | 1.31 | | | |
| | VA-mode LC cell | | | | 340 | | | | |
| | Type-III birefringent layer | PI | 0 | | −198 | | | | |
| | First λ/4 plate | NB | 135 | 138 | | 1.31 | | | |
| | First polarizer | | 90 | | | | | | |

TABLE 22-continued

| | Optical member | Material | Axis angle [°] | Phase difference [nm] R | Phase difference [nm] Rth or Rlc | Nz coefficient | Average value of Nz coefficients | CR (45, 60) | CR (0, 60) |
|---|---|---|---|---|---|---|---|---|---|
| Reference Example 8 | Second polarizer | | 0 | | | | 1.31 | 37 | 178 |
| | Type-II birefringent layer | A | 0 | 138 | | −0.01 | | | |
| | Second λ/4 plate | NB | 45 | 138 | | 1.31 | | | |
| | VA-mode LC cell | | | | 320 | | | | |
| | Type-III birefringent layer | PI | 0 | | −177 | | | | |
| | First λ/4 plate | NB | 135 | 138 | | 1.31 | | | |
| | First polarizer | | 90 | | | | | | |
| Reference Example 9 | Second polarizer | | 0 | | | | 1.58 | 66 | 175 |
| | Type-II birefringent layer | A | 0 | 121 | | −0.32 | | | |
| | Second λ/4 plate | NB | 45 | 138 | | 1.58 | | | |
| | VA-mode LC cell | | | | 340 | | | | |
| | Type-III birefringent layer | PI | 1 | | −152 | | | | |
| | First λ/4 plate | NB | 135 | 138 | | 1.58 | | | |
| | First polarizer | | 90 | | | | | | |
| Reference Example 10 | Second polarizer | | 0 | | | | 1.58 | 65 | 178 |
| | Type-II birefringent layer | A | 0 | 121 | | −0.32 | | | |
| | Second λ/4 plate | NB | 45 | 138 | | 1.58 | | | |
| | VA-mode LC cell | | | | 320 | | | | |
| | Type-III birefringent layer | PI | 0 | | −127 | | | | |
| | First λ/4 plate | NB | 135 | 138 | | 1.58 | | | |
| | First polarizer | | 90 | | | | | | |
| Reference Example 11 | Second polarizer | | 0 | | | | 2.50 | 65 | 174 |
| | Type-II birefringent layer | A | 0 | 75 | | −2.13 | | | |
| | Second λ/4 plate | NB | 45 | 138 | | 2.50 | | | |
| | VA-mode LC cell | | | | 400 | | | | |
| | Type-III birefringent layer | TAC | 2 | | −55 | | | | |
| | First λ/4 plate | NB | 135 | 138 | | 2.50 | | | |
| | First polarizer | | 90 | | | | | | |
| Reference Example 12 | Second polarizer | | 0 | | | | 2.92 | 60 | 176 |
| | Type-II birefringent layer | A | 0 | 70 | | −3.21 | | | |
| | Second λ/4 plate | NB | 45 | 138 | | 2.92 | | | |
| | VA-mode LC cell | | | | 462 | | | | |
| | Type-III birefringent layer | TAC | 2 | | −55 | | | | |
| | First λ/4 plate | NB | 135 | 138 | | 2.92 | | | |
| | First polarizer | | 90 | | | | | | |
| Reference Example 13 | Second polarizer | | 0 | | | | 2.92 | 62 | 176 |
| | Type-II birefringent layer | A | 0 | 70 | | −3.21 | | | |
| | Second λ/4 plate | NB | 45 | 138 | | 2.92 | | | |
| | VA-mode LC cell | | | | 433 | | | | |
| | Type-III birefringent layer | NB | 2 | | −22 | | | | |
| | First λ/4 plate | NB | 135 | 138 | | 2.92 | | | |
| | First polarizer | | 90 | | | | | | |

TABLE 23

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Reference Example 14 | Second polarizer | | 0 | | | | 2.08 | 58 | 175 |
| | Type-II birefringent layer | A | 0 | 85 | | −1.21 | | | |
| | Second λ/4 plate | NB | 45 | 138 | | 2.08 | | | |
| | VA-mode LC cell | | | | 290 | | | | |
| | First λ/4 plate | NB | 135 | 138 | | 2.08 | | | |
| | First polarizer | | 90 | | | | | | |
| Reference Example 15 | Second polarizer | | 0 | | | | 2.31 | 55 | 178 |
| | Type-II birefringent layer | A | 0 | 78 | | −1.58 | | | |
| | Second λ/4 plate | NB | 45 | 138 | | 2.31 | | | |
| | VA-mode LC cell | | | | 310 | | | | |
| | First λ/4 plate | NB | 135 | 138 | | 2.31 | | | |
| | First polarizer | | 90 | | | | | | |
| Reference Example 16 | Second polarizer | | 0 | | | | 2.37 | 56 | 175 |
| | Type-II birefringent layer | A | 0 | 74 | | −1.87 | | | |
| | Second λ/4 plate | NB | 45 | 138 | | 2.37 | | | |
| | VA-mode LC cell | | | | 320 | | | | |
| | First λ/4 plate | NB | 135 | 138 | | 2.37 | | | |
| | First polarizer | | 90 | | | | | | |
| Reference Example 17 | Second polarizer | | 0 | | | | 2.48 | 55 | 175 |
| | Type-II birefringent layer | A | 0 | 70 | | −2.10 | | | |
| | Second λ/4 plate | NB | 45 | 138 | | 2.48 | | | |
| | VA-mode LC cell | | | | 340 | | | | |
| | First λ/4 plate | NB | 135 | 138 | | 2.48 | | | |
| | First polarizer | | 90 | | | | | | |

TABLE 23-continued

| | | | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Optical member | Material | | | | | | | | |
| Reference Example 18 | Second polarizer | | 0 | | | | 2.91 | 52 | 172 |
| | Type-II birefringent layer | A | 0 | 68 | | −3.02 | | | |
| | Second λ/4 plate | NB | 45 | 138 | | 2.91 | | | |
| | VA-mode LC cell | | | | 400 | | | | |
| | First λ/4 plate | NB | 135 | 138 | | 2.91 | | | |
| | First polarizer | | 90 | | | | | | |

TABLE 24

| | | | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Optical member | Material | | | | | | | | |
| Reference Example 19 | Second polarizer | | 0 | | | | 2.05 | 51 | 175 |
| | Type-II birefringent layer | A | 0 | 105 | | −0.45 | | | |
| | Second λ/4 plate | NB | 45 | 138 | | 2.45 | | | |
| | VA-mode LC cell | | | | 400 | | | | |
| | Type-III birefringent layer | NB | | 1 | −88 | | | | |
| | First λ/4 plate | NB | 135 | 138 | | 1.65 | | | |
| | First polarizer | | 90 | | | | | | |

TABLE 25

| | | | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Optical member | Material | | | | | | | | |
| Reference Example 20 | Second polarizer | | 0 | | | | 2.05 | 50 | 174 |
| | Second λ/4 plate | NB | 45 | 138 | | 1.65 | | | |
| | VA-mode LC cell | | | | 360 | | | | |
| | Type-III birefringent layer | TAC | | 2 | −52 | | | | |
| | First λ/4 plate | NB | 135 | 138 | | 2.45 | | | |
| | Type-II birefringent layer | A | 90 | 105 | | −0.45 | | | |
| | First polarizer | | 90 | | | | | | |
| Reference Example 21 | Second polarizer | | 0 | | | | 2.05 | 51 | 175 |
| | Second λ/4 plate | NB | 45 | 138 | | 1.65 | | | |
| | VA-mode LC cell | | | | 400 | | | | |
| | Type-III birefringent layer | NB | | 1 | −88 | | | | |
| | First λ/4 plate | NB | 135 | 138 | | 2.45 | | | |
| | Type-II birefringent layer | A | 90 | 105 | | −0.45 | | | |
| | First polarizer | | 90 | | | | | | |

TABLE 26

| | | | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Optical member | Material | | | | | | | | |
| Reference Example 22 | Second polarizer | | 0 | | | | 2.30 | 56 | 177 |
| | Second λ/4 plate | NB | 45 | 138 | | 1.98 | | | |
| | VA-mode LC cell | | | | 310 | | | | |
| | First λ/4 plate | NB | 135 | 138 | | 2.62 | | | |
| | Type-II birefringent layer | A | 90 | 78 | | −1.58 | | | |
| | First polarizer | | 90 | | | | | | |
| Reference Example 23 | Second polarizer | | 0 | | | | 2.30 | 56 | 177 |
| | Second λ/4 plate | NB | 45 | 138 | | 1.65 | | | |
| | VA-mode LC cell | | | | 310 | | | | |
| | First λ/4 plate | NB | 135 | 138 | | 2.95 | | | |
| | Type-II birefringent layer | A | 90 | 78 | | −1.58 | | | |
| | First polarizer | | 90 | | | | | | |

TABLE 26-continued

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Reference Example 24 | Second polarizer | | 0 | | | | 2.31 | 55 | 177 |
| | Second λ/4 plate | NB | 45 | 138 | | 1.38 | | | |
| | VA-mode LC cell | | | | 310 | | | | |
| | First λ/4 plate | NB | 135 | 138 | | 3.29 | | | |
| | Type-II birefringent layer | A | 90 | 78 | | −1.58 | | | |
| | First polarizer | | 90 | | | | | | |
| Reference Example 25 | Second polarizer | | 0 | | | | 2.38 | 55 | 175 |
| | Second λ/4 plate | NB | 45 | 138 | | 1.01 | | | |
| | VA-mode LC cell | | | | 310 | | | | |
| | First λ/4 plate | NB | 135 | 138 | | 3.65 | | | |
| | Type-II birefringent layer | A | 90 | 78 | | −1.58 | | | |
| | First polarizer | | 90 | | | | | | |
| Reference Example 26 | Second polarizer | | 0 | | | | 2.05 | 52 | 176 |
| | Second λ/4 plate | NB | 45 | 138 | | 1.65 | | | |
| | VA-mode LC cell | | | | 310 | | | | |
| | First λ/4 plate | NB | 135 | 138 | | 2.45 | | | |
| | Type-II birefringent layer | A | 90 | 105 | | −0.45 | | | |
| | First polarizer | | 90 | | | | | | |
| Reference Example 27 | Second polarizer | | 0 | | | | 2.02 | 52 | 177 |
| | Second λ/4 plate | NB | 45 | 138 | | 1.38 | | | |
| | VA-mode LC cell | | | | 310 | | | | |
| | First λ/4 plate | NB | 135 | 138 | | 2.66 | | | |
| | Type-II birefringent layer | A | 90 | 105 | | −0.45 | | | |
| | First polarizer | | 90 | | | | | | |
| Reference Example 28 | Second polarizer | | 0 | | | | 2.01 | 50 | 176 |
| | Second λ/4 plate | NB | 45 | 138 | | 1.00 | | | |
| | VA-mode LC cell | | | | 310 | | | | |
| | First λ/4 plate | NB | 135 | 138 | | 3.02 | | | |
| | Type-II birefringent layer | A | 90 | 105 | | −0.45 | | | |
| | First polarizer | | 90 | | | | | | |

TABLE 27

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Comparative Example 1 SID2010 | Second polarizer | | 0 | | | | 1.85 | 58 | 175 |
| | Type-I birefringent layer | NB | 90 | 110 | | 1.40 | | | |
| | Type-IV birefringent layer | RLC | | 0 | 300 | | | | |
| | Second λ/4 plate | NB | 45 | 140 | | 2.10 | | | |
| | VA-mode LC cell | | | | 260 | | | | |
| | First λ/4 plate | NB | 135 | 140 | | 1.60 | | | |
| | First polarizer | | 90 | | | | | | |

The second liquid crystal display device of the present invention will be described in detail below referring to, but not limited to, Embodiments 6 to 10.

Embodiment 6

Figure 29:
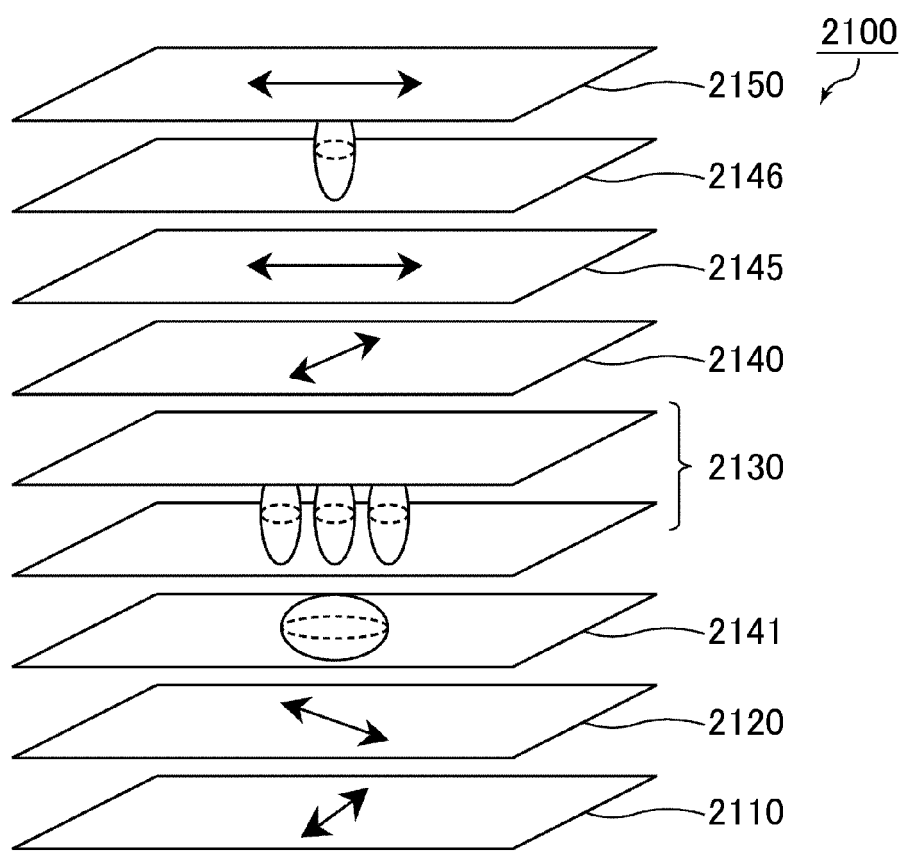
FIG. 29 is an exploded perspective view showing the structure of a circularly polarized light VA-mode liquid crystal display device of Embodiment 6 according to the second liquid crystal display device of the present invention.

As shown in FIG. 29, a liquid crystal display device of Embodiment 6 according to the second liquid crystal display device of the present invention is a circularly polarized light VA-mode liquid crystal display device 2100 including, stacked in the order set forth, a backlight (not shown), a first polarizer 2110, a first λ/4 plate (Type-I birefringent layer) 2120, a Type-III birefringent layer 2141, a VA-mode liquid crystal cell 2130, a second λ/4 plate (Type-I birefringent layer) 2140 having substantially the same Nz coefficient as the first λ/4 plate, a Type-I birefringent layer 2145, a Type-IV birefringent layer 2146, and a second polarizer 2150. Examples in which liquid crystal display devices were actually produced in accordance with the liquid crystal display device of Embodiment 6 correspond to Examples 29 to 41 and Examples 29' to 41'. Example 29' is an example in which the Nz coefficient of the Type-I birefringent layer is different from that in Example 29, and accordingly the in-plane phase difference R of the Type-I birefringent layer and the phase difference Rth in the perpendicular direction of the Type-IV birefringent layer are re-adjusted to appropriate values. The same shall apply to the pair of Example 30 and Example 30', and the following pair of Example n and Example n'.

Embodiment 7

Figure 30:
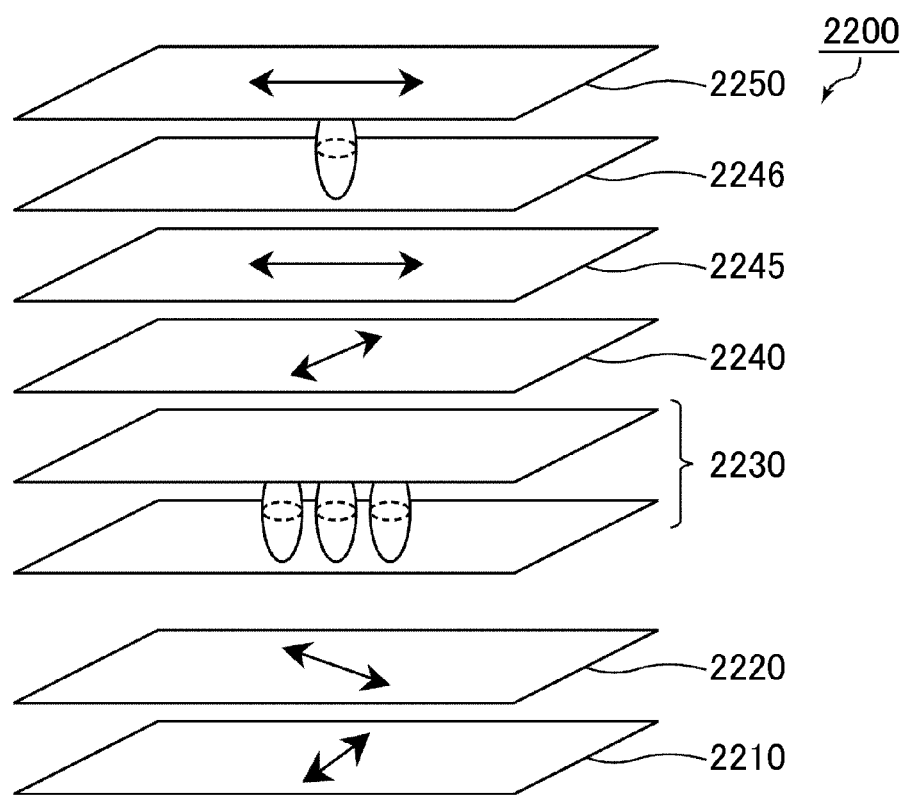
FIG. 30 is an exploded perspective view showing the structure of a circularly polarized light VA-mode liquid crystal display device of Embodiment 7 according to the second liquid crystal display device of the present invention.

As shown in FIG. 30, a liquid crystal display device of Embodiment 7 according to the second liquid crystal display device of the present invention is a circularly polarized light VA-mode liquid crystal display device 2200 including, stacked in the order set forth, a backlight (not shown), a first polarizer 2210, a first λ/4 plate (Type-I birefringent layer) 2220, a VA-mode liquid crystal cell 2230, a second λ/4 plate (Type-I birefringent layer) 2240, a Type-I birefringent layer 2245, a Type-IV birefringent layer 2246, and a second polarizer 2250. In other words, the liquid crystal display device of Embodiment 7 is similar to the liquid crystal display device of Embodiment 6 except that the display device of Embodiment 7 includes no Type-III birefringent layer and that the Nz coefficients of the first and second λ/4 plates are optimally adjusted for appropriate compensation even without a Type-III birefringent layer. Examples in which liquid crystal display devices were actually produced in accordance with the liquid crystal display device of Embodiment 7 correspond to Examples 42 to 46 and Examples 42' to 46'.

Embodiment 8

Figure 31:
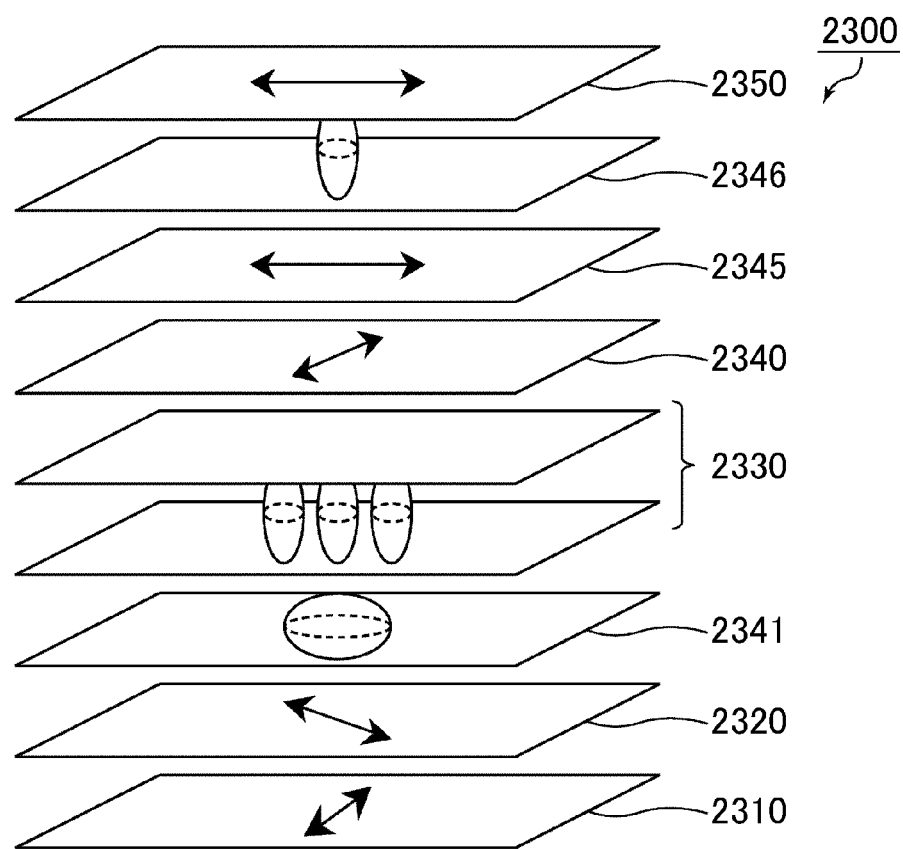
FIG. 31 is an exploded perspective view showing the structure of a circularly polarized light VA-mode liquid crystal display device of Embodiment 8 according to the second liquid crystal display device of the present invention.

As shown in FIG. 31, a liquid crystal display device of Embodiment 8 according to the second liquid crystal display device of the present invention is a circularly polarized light VA-mode liquid crystal display device 2300 including, stacked in the order set forth, a backlight (not shown), a first polarizer 2310, a first λ/4 plate (Type-I birefringent layer) 2320, a Type-III birefringent layer 2341, a VA-mode liquid crystal cell 2330, a second λ/4 plate (Type-I birefringent layer) 2340, a Type-I birefringent layer 2345, a Type-IV birefringent layer 2346, and a second polarizer 2350. The liquid crystal display device of Embodiment 8 is similar to the liquid crystal display device of Embodiment 6 except that the Nz coefficient of the first λ/4 plate and the Nz coefficient of the second λ/4 plate are adjusted to have different values. Examples in which liquid crystal display devices were actually produced in accordance with the liquid crystal display device of Embodiment 8 correspond to Example 47 and Example 47'.

Embodiment 9

Figure 32:
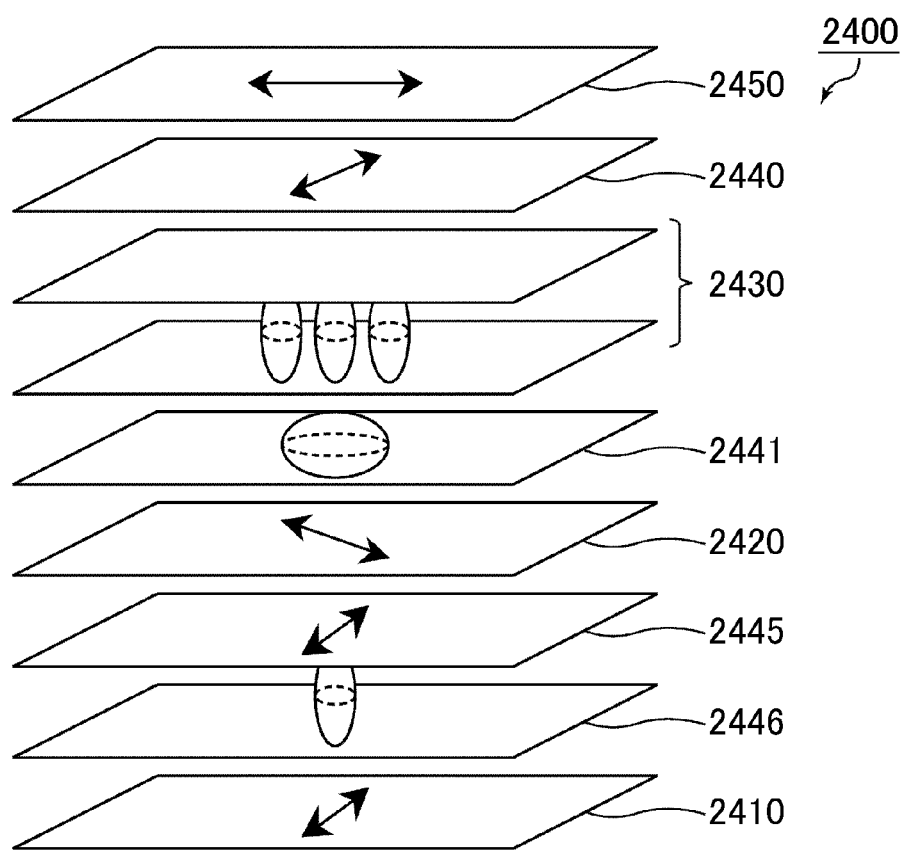
FIG. 32 is an exploded perspective view showing the structure of a circularly polarized light VA-mode liquid crystal display device of Embodiment 9 according to the second liquid crystal display device of the present invention.

As shown in FIG. 32, a liquid crystal display device of Embodiment 9 according to the second liquid crystal display device of the present invention is a circularly polarized light VA-mode liquid crystal display device 2400 including, stacked in the order set forth, a backlight (not shown), a first polarizer 2410, a Type-IV birefringent layer 2446, a Type-I birefringent layer 2445, a first λ/4 plate (Type-I birefringent layer) 2420, a Type-III birefringent layer 2441, a VA-mode liquid crystal cell 2430, a second λ/4 plate (Type-I birefringent layer) 2440, and a second polarizer 2450. The liquid crystal display device of Embodiment 9 is similar to the liquid crystal display device of Embodiment 8 except that the Type-I and Type-IV birefringent layers are disposed not on the viewing side but on the backlight side (back side) of the liquid crystal display cell, and accordingly the axis angle of each birefringent layer is adjusted. Examples in which liquid crystal display devices were actually produced in accordance with the liquid crystal display device of Embodiment 9 correspond to Examples 48 and 49 and Examples 48' and 49'.

Embodiment 10

Figure 33:
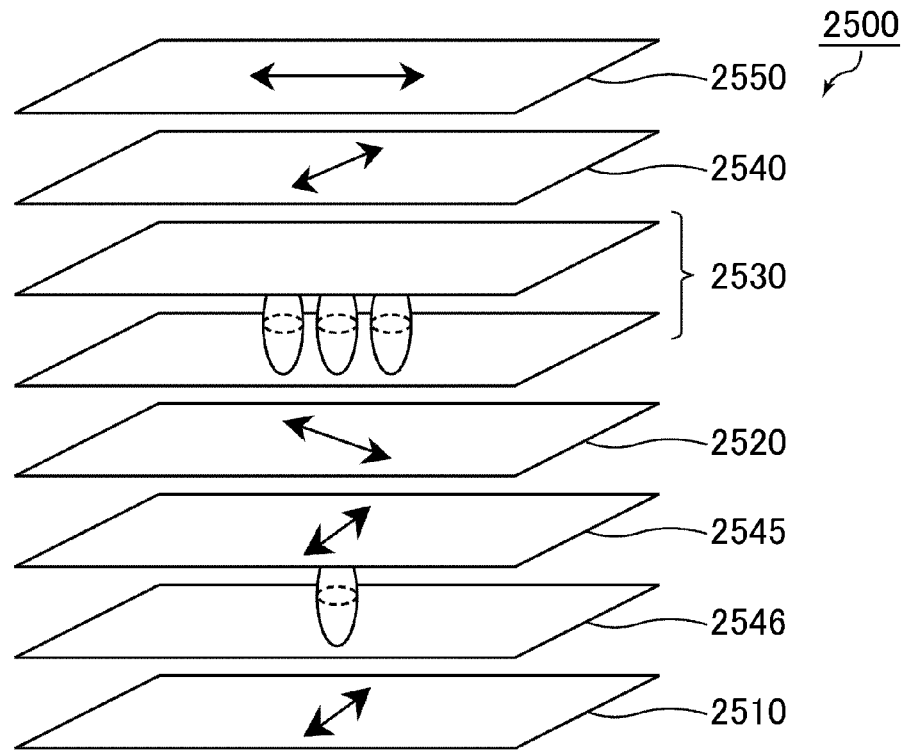
FIG. 33 is an exploded perspective view showing the structure of a circularly polarized light VA-mode liquid crystal display device of Embodiment 10 according to the second liquid crystal display device of the present invention.

As shown in FIG. 33, a liquid crystal display device of Embodiment 10 according to the second liquid crystal display device of the present invention is a circularly polarized light VA-mode liquid crystal display device 2500 including, stacked in the order set forth, a backlight (not shown), a first polarizer 2510, a Type-IV birefringent layer 2546, a Type-I birefringent layer 2545, a first λ/4 plate (Type-I birefringent layer) 2520, a VA-mode liquid crystal cell 2530, a second λ/4 plate (Type-I birefringent layer) 2540, and a second polarizer 2550. The liquid crystal display device of Embodiment 10 is similar to the liquid crystal display device of Embodiment 9 except that the display device of Embodiment 10 includes no Type-III birefringent layer and that the Nz coefficients of the first and second λ/4 plates are optimally adjusted for appropriate compensation even without a Type-III birefringent layer. Examples in which liquid crystal display devices were actually produced in accordance with the liquid crystal display device of Embodiment 10 correspond to Examples 50 to 56 and Examples 50' to 56'.

In accordance with the liquid crystal display devices of Examples 29 to 56, display devices each including a single Type-II birefringent layer instead of the stacked article of the third Type-I birefringent layer and the Type-IV birefringent layer were actually produced (Reference Examples 29 to 56).

Further, a liquid crystal display device using a conventional polarizing plate without viewing angle compensation was actually produced (Comparative Example 2).

Figure 34:
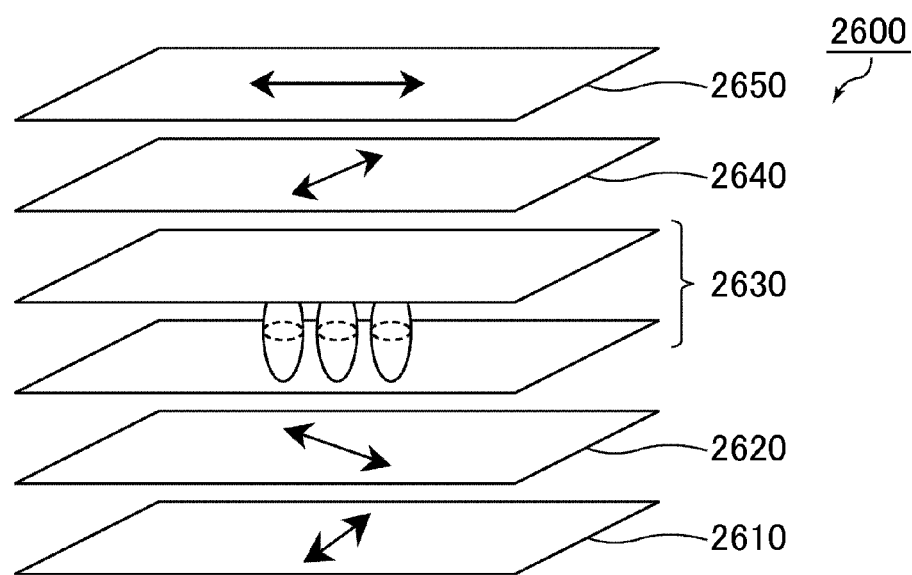
FIG. 34 is an exploded perspective view showing the structure of a circularly polarized light VA-mode liquid crystal display device of Comparative Example 2.

As shown in FIG. 34, the liquid crystal display device of Comparative Example 2 is a circularly polarized light VA-mode liquid crystal display device including, stacked in the order set forth, a backlight (not shown), a first polarizer 2610, a first λ/4 plate (Type-I birefringent layer) 2620, a VA-mode liquid crystal cell 2630, a second λ/4 plate 2640, and a second polarizer 2650.

Tables 28 to 46 show the materials, axis angles, in-plane phase differences R, phase differences in the perpendicular direction Rth or Rlc, and Nz coefficients of the polarizers, the birefringent layers, and the liquid crystal cells of the respective examples. In the tables, the axes of the respective birefringent layers are defined by the azimuths of the in-plane slow axes, and the axes of the polarizers are defined by the azimuths of the absorption axes. For the Type-II birefringent layers, the in-plane fast axis is important for design. In the tables, the axes of the Type-II birefringent layers are defined by the azimuths of the in-plane slow axes similar to the other birefringent layers. The in-plane fast axis of the Type-II birefringent layer is perpendicular to the in-plane slow axis of the Type-II birefringent layer. In the tables, still, the materials of the respective birefringent layers are expressed by the following abbreviations.

NB: norbornene
ChLC: cholesteric liquid crystal
PI: polyimide
TAC: triacetyl cellulose
A: resin composition containing acrylic resin and styrenic resin In the tables, the average value of the Nz coefficients is defined as an average value of the Nz coefficient of the first λ/4 plate and the Nz coefficient of the second λ/4 plate.

(Evaluation Result 2)

The contrast ratio-viewing angle characteristics of each of the liquid crystal display device in the examples were determined. Tables 28 to 46 show the respective values CR(0, 60) and CR(45, 60). Tables 28 to 33 show the values of Examples 29 to 56; Tables 34 to 39 show the values of Examples 29' to 56'; Tables 40 to 45 show the values of Reference Examples 29 to 56; and Table 46 shows the values of Comparative Example 2. The values CR(0, 60) and CR(45, 60) of the liquid crystal display devices of Examples 29 to 56 and 29' to 56' were each much higher than the values CR(0, 60) and CR(45, 60) of Comparative Example 2 and are equal to or higher than the values CR(0, 60) and CR(45, 60) of Reference Examples 29 to 56. Further, the liquid crystal display devices of these examples had very good contrast ratio-viewing angle characteristics in visual observation.

Since the Nz coefficient of the first λ/4 plate and the Nz coefficient of the second λ/4 plate are different from each other in Examples 47 to 56 and Examples 47' to 56' (Embodiments 8, 9, and 10), the productivity of a circularly polarizing plate including the first λ/4 plate with a smaller Nz coefficient is excellent, resulting in cost reduction. In particular, a general-purpose λ/4 plate produced by diagonal stretching can be used as a λ/4 plate with the Nz coefficient being adjusted to about 1.6, and thus the examples including a λ/4 plate with the Nz coefficient being adjusted to about 1.6 lead to a very large merit in production.

The liquid crystal cells of Examples 29 to 41 and 47 to 49 and Example 29' to 41' and 47' to 49' (Embodiments 6, 8, and 9) had a greater phase difference than those of Examples 42 to 46, 50 to 56, Examples 42' to 46', and 50' to 56' (Embodiments 7 and 10), but the phase difference of the liquid crystal cells were compensated using a Type-III birefringent layer. Thus, practically, the liquid crystal display devices in Examples 29 to 41 and 47 to 49 and Example 29' to 41' and 47' to 49' were optically compensated in a similar manner to that in Examples 42 to 46, 50 to 56, Examples 42' to 46', and 50' to 56' (Embodiments 7 and 10). As mentioned above, with respect to the second liquid crystal display device of the present invention, simply adjusting the phase difference of a Type-III birefringent layer leads to correspondence to the phase differences of multiple liquid crystal cells. Accordingly, the structure of polarizing plates on the viewing side, which is likely to include multiple types, requires no change.

As described above, the second liquid crystal display device of the present invention can have various merits on production while securing very excellent viewing angle characteristics, and can secure high brightness when displaying a white screen.

TABLE 28

Embodiment 6

| | | | Axis angle [°] | Phase difference [nm] | | Nz coefficient | Average value of Nz coefficients | Evaluation results CR (45, 60) | CR (0, 60) |
|---|---|---|---|---|---|---|---|---|---|
| | Optical member | Material | | R | Rth or Rlc | | | | |
| Example 29 | Second polarizer | | 0 | | | | 1.02 | 33 | 176 |
| | Type-IV birefringent layer | RLC | | 0 | 102 | | | | |
| | Type-I birefringent layer | NB | 0 | 92 | | 1.01 | | | |
| | Second λ/4 plate | NB | 45 | 138 | | 1.02 | | | |
| | VA-mode LC cell | | | | 340 | | | | |
| | Type-III birefringent layer | PI | | 0 | −250 | | | | |
| | First λ/4 plate | NB | 135 | 138 | | 1.02 | | | |
| | First polarizer | | 90 | | | | | | |
| Example 30 | Second polarizer | | 0 | | | | 1.02 | 33 | 177 |
| | Type-IV birefringent layer | RLC | | 0 | 102 | | | | |
| | Type-I birefringent layer | NB | 0 | 92 | | 1.01 | | | |
| | Second λ/4 plate | NB | 45 | 138 | | 1.02 | | | |
| | VA-mode LC cell | | | | 320 | | | | |
| | Type-III birefringent layer | PI | | 0 | −233 | | | | |
| | First λ/4 plate | NB | 135 | 138 | | 1.02 | | | |
| | First polarizer | | 90 | | | | | | |
| Example 31 | Second polarizer | | 0 | | | | 1.10 | 36 | 176 |
| | Type-IV birefringent layer | RLC | | 0 | 108 | | | | |
| | Type-I birefringent layer | NB | 0 | 86 | | 1.01 | | | |
| | Second λ/4 plate | NB | 45 | 138 | | 1.10 | | | |
| | VA-mode LC cell | | | | 340 | | | | |
| | Type-III birefringent layer | PI | | 0 | −233 | | | | |
| | First λ/4 plate | NB | 135 | 138 | | 1.10 | | | |
| | First polarizer | | 90 | | | | | | |
| Example 32 | Second polarizer | | 0 | | | | 1.10 | 37 | 175 |
| | Type-IV birefringent layer | RLC | | 0 | 108 | | | | |
| | Type-I birefringent layer | NB | 0 | 86 | | 1.01 | | | |
| | Second λ/4 plate | NB | 45 | 138 | | 1.10 | | | |
| | VA-mode LC cell | | | | 320 | | | | |
| | Type-III birefringent layer | PI | | 0 | −212 | | | | |
| | First λ/4 plate | NB | 135 | 138 | | 1.10 | | | |
| | First polarizer | | 90 | | | | | | |
| Example 33 | Second polarizer | | 0 | | | | 1.22 | 36 | 176 |
| | Type-IV birefringent layer | RLC | | 0 | 116 | | | | |
| | Type-I birefringent layer | NB | 0 | 80 | | 1.01 | | | |
| | Second λ/4 plate | NB | 45 | 138 | | 1.22 | | | |
| | VA-mode LC cell | | | | 340 | | | | |
| | Type-III birefringent layer | PI | | 0 | −212 | | | | |
| | First λ/4 plate | NB | 135 | 138 | | 1.22 | | | |
| | First polarizer | | 90 | | | | | | |
| Example 34 | Second polarizer | | 0 | | | | 1.22 | 35 | 175 |
| | Type-IV birefringent layer | RLC | | 0 | 116 | | | | |
| | Type-I birefringent layer | NB | 0 | 80 | | 1.01 | | | |
| | Second λ/4 plate | NB | 45 | 138 | | 1.22 | | | |
| | VA-mode LC cell | | | | 320 | | | | |
| | Type-III birefringent layer | PI | | 0 | −198 | | | | |
| | First λ/4 plate | NB | 135 | 138 | | 1.22 | | | |
| | First polarizer | | 90 | | | | | | |
| Example 35 | Second polarizer | | 0 | | | | 1.31 | 35 | 174 |
| | Type-IV birefringent layer | RLC | | 0 | 123 | | | | |
| | Type-I birefringent layer | NB | 0 | 75 | | 1.01 | | | |
| | Second λ/4 plate | NB | 45 | 138 | | 1.31 | | | |
| | VA-mode LC cell | | | | 340 | | | | |

TABLE 28-continued

| | | | Axis angle [°] | Phase difference [nm] | | Nz coefficient | Average value of Nz coefficients | Evaluation results | |
|---|---|---|---|---|---|---|---|---|---|
| | Optical member | Material | | R | Rth or Rlc | | | CR (45, 60) | CR (0, 60) |
| | Type-III birefringent layer | PI | | 0 | −198 | | | | |
| | First λ/4 plate | NB | 135 | 138 | | 1.31 | | | |
| | First polarizer | | 90 | | | | | | |

Embodiment 6

TABLE 29

Embodiment 6

| | | | | | | | | | |
|---|---|---|---|---|---|---|---|---|---|
| Example 36 | Second polarizer | | 0 | | | | 1.31 | 35 | 176 |
| | Type-IV birefringent layer | RLC | | 0 | 123 | | | | |
| | Type-I birefringent layer | NB | 0 | 75 | | 1.01 | | | |
| | Second λ/4 plate | NB | 45 | 138 | | 1.31 | | | |
| | VA-mode LC cell | | | | 320 | | | | |
| | Type-III birefringent layer | PI | | 0 | −177 | | | | |
| | First λ/4 plate | NB | 135 | 138 | | 1.31 | | | |
| | First polarizer | | 90 | | | | | | |
| Example 37 | Second polarizer | | 0 | | | | 1.58 | 64 | 172 |
| | Type-IV birefringent layer | RLC | | 0 | 124 | | | | |
| | Type-I birefringent layer | NB | 0 | 64 | | 1.01 | | | |
| | Second λ/4 plate | NB | 45 | 138 | | 1.58 | | | |
| | VA-mode LC cell | | | | 340 | | | | |
| | Type-III birefringent layer | PI | | 1 | −152 | | | | |
| | First λ/4 plate | NB | 135 | 138 | | 1.58 | | | |
| | First polarizer | | 90 | | | | | | |
| Example 38 | Second polarizer | | 0 | | | | 1.58 | 64 | 170 |
| | Type-IV birefringent layer | RLC | | 0 | 124 | | | | |
| | Type-I birefringent layer | NB | 0 | 64 | | 1.01 | | | |
| | Second λ/4 plate | NB | 45 | 138 | | 1.58 | | | |
| | VA-mode LC cell | | | | 320 | | | | |
| | Type-III birefringent layer | PI | | 0 | −127 | | | | |
| | First λ/4 plate | NB | 135 | 138 | | 1.58 | | | |
| | First polarizer | | 90 | | | | | | |
| Example 39 | Second polarizer | | 0 | | | | 2.50 | 62 | 170 |
| | Type-IV birefringent layer | RLC | | 0 | 231 | | | | |
| | Type-I birefringent layer | NB | 0 | 40 | | 1.01 | | | |
| | Second λ/4 plate | NB | 45 | 138 | | 2.50 | | | |
| | VA-mode LC cell | | | | 400 | | | | |
| | Type-III birefringent layer | TAC | | 2 | −55 | | | | |
| | First λ/4 plate | NB | 135 | 138 | | 2.50 | | | |
| | First polarizer | | 90 | | | | | | |
| Example 40 | Second polarizer | | 0 | | | | 2.92 | 61 | 172 |
| | Type-IV birefringent layer | RLC | | 0 | 278 | | | | |
| | Type-I birefringent layer | NB | 0 | 37 | | 1.01 | | | |
| | Second λ/4 plate | NB | 45 | 138 | | 2.92 | | | |
| | VA-mode LC cell | | | | 462 | | | | |
| | Type-III birefringent layer | TAC | | 2 | −55 | | | | |
| | First λ/4 plate | NB | 135 | 138 | | 2.92 | | | |
| | First polarizer | | 90 | | | | | | |
| Example 41 | Second polarizer | | 0 | | | | 2.92 | 60 | 170 |
| | Type-IV birefringent layer | RLC | | 0 | 278 | | | | |
| | Type-I birefringent layer | NB | 0 | 37 | | 1.01 | | | |
| | Second λ/4 plate | NB | 45 | 138 | | 2.92 | | | |
| | VA-mode LC cell | | | | 433 | | | | |
| | Type-III birefringent layer | NB | | 2 | −22 | | | | |
| | First λ/4 plate | NB | 135 | 138 | | 2.92 | | | |
| | First polarizer | | 90 | | | | | | |

TABLE 30

Embodiment 7

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 42 | Second polarizer | | 0 | | | | 2.08 | 54 | 172 |
| | Type-IV birefringent layer | RLC | | 0 | 186 | | | | |
| | Type-I birefringent layer | NB | 0 | 45 | | 1.01 | | | |
| | Second λ/4 plate | NB | 45 | 138 | | 2.08 | | | |
| | VA-mode LC cell | | | | 290 | | | | |
| | First λ/4 plate | NB | 135 | 138 | | 2.08 | | | |
| | First polarizer | | 90 | | | | | | |
| Example 43 | Second polarizer | | 0 | | | | 2.31 | 54 | 177 |
| | Type-IV birefringent layer | RLC | | 0 | 211 | | | | |
| | Type-I birefringent layer | NB | 0 | 42 | | 1.01 | | | |
| | Second λ/4 plate | NB | 45 | 138 | | 2.31 | | | |
| | VA-mode LC cell | | | | 310 | | | | |
| | First λ/4 plate | NB | 135 | 138 | | 2.31 | | | |
| | First polarizer | | 90 | | | | | | |
| Example 44 | Second polarizer | | 0 | | | | 2.37 | 55 | 172 |
| | Type-IV birefringent layer | RLC | | 0 | 216 | | | | |
| | Type-I birefringent layer | NB | 0 | 42 | | 1.01 | | | |
| | Second λ/4 plate | NB | 45 | 138 | | 2.37 | | | |
| | VA-mode LC cell | | | | 320 | | | | |
| | First λ/4 plate | NB | 135 | 138 | | 2.37 | | | |
| | First polarizer | | 90 | | | | | | |
| Example 45 | Second polarizer | | 0 | | | | 2.48 | 55 | 172 |
| | Type-IV birefringent layer | RLC | | 0 | 228 | | | | |
| | Type-I birefringent layer | NB | 0 | 40 | | 1.01 | | | |
| | Second λ/4 plate | NB | 45 | 138 | | 2.48 | | | |
| | VA-mode LC cell | | | | 340 | | | | |
| | First λ/4 plate | NB | 135 | 138 | | 2.48 | | | |
| | First polarizer | | 90 | | | | | | |
| Example 46 | Second polarizer | | 0 | | | | 2.91 | 53 | 171 |
| | Type-IV birefringent layer | RLC | | 0 | 278 | | | | |
| | Type-I birefringent layer | NB | 0 | 37 | | 1.01 | | | |
| | Second λ/4 plate | NB | 45 | 138 | | 2.91 | | | |
| | VA-mode LC cell | | | | 400 | | | | |
| | First λ/4 plate | NB | 135 | 138 | | 2.91 | | | |
| | First polarizer | | 90 | | | | | | |

TABLE 31

Embodiment 8

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 47 | Second polarizer | | 0 | | | | 2.05 | 51 | 170 |
| | Type-IV birefringent layer | RLC | | 0 | 186 | | | | |
| | Type-I birefringent layer | NB | 0 | 45 | | 1.01 | | | |
| | Second λ/4 plate | NB | 45 | 138 | | 2.45 | | | |
| | VA-mode LC cell | | | | 400 | | | | |
| | Type-III birefringent layer | NB | | 1 | −88 | | | | |
| | First λ/4 plate | NB | 135 | 138 | | 1.65 | | | |
| | First polarizer | | 90 | | | | | | |

TABLE 32

Embodiment 9

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 48 | Second polarizer | | 0 | | | | 2.05 | 52 | 172 |
| | Second λ/4 plate | NB | 45 | 138 | | 1.65 | | | |

TABLE 32-continued

Embodiment 9

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 49 | VA-mode LC cell | | | | 360 | | | | |
| | Type-III birefringent layer | TAC | 2 | | −52 | | | | |
| | First λ/4 plate | NB | 135 | 138 | | 2.45 | | | |
| | Type-I birefringent layer | NB | 90 | 45 | | 1.01 | | | |
| | Type-IV birefringent layer | RLC | | 0 | 186 | | | | |
| | First polarizer | | 90 | | | | | | |
| | Second polarizer | | 0 | | | | 2.05 | 51 | 172 |
| | Second λ/4 plate | NB | 45 | 138 | | 1.65 | | | |
| | VA-mode LC cell | | | | 400 | | | | |
| | Type-III birefringent layer | NB | 1 | | −88 | | | | |
| | First λ/4 plate | NB | 135 | 138 | | 2.45 | | | |
| | Type-I birefringent layer | NB | 90 | 45 | | 1.01 | | | |
| | Type-IV birefringent layer | RLC | | 0 | 186 | | | | |
| | First polarizer | | 90 | | | | | | |

TABLE 33

Embodiment 10

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 50 | Second polarizer | | 0 | | | | 2.30 | 50 | 172 |
| | Second λ/4 plate | NB | 45 | 138 | | 1.98 | | | |
| | VA-mode LC cell | | | | 310 | | | | |
| | First λ/4 plate | NB | 135 | 138 | | 2.62 | | | |
| | Type-I birefringent layer | NB | 9 | 42 | | 1.01 | | | |
| | Type-IV birefringent layer | RLC | | 0 | 211 | | | | |
| | First polarizer | | 90 | | | | | | |
| Example 51 | Second polarizer | | 0 | | | | 2.30 | 52 | 173 |
| | Second λ/4 plate | NB | 45 | 138 | | 1.65 | | | |
| | VA-mode LC cell | | | | 310 | | | | |
| | First λ/4 plate | NB | 135 | 138 | | 2.95 | | | |
| | Type-I birefringent layer | NB | 9 | 42 | | 1.01 | | | |
| | Type-IV birefringent layer | RLC | | 0 | 211 | | | | |
| | First polarizer | | 90 | | | | | | |
| Example 52 | Second polarizer | | 0 | | | | 2.31 | 54 | 177 |
| | Second λ/4 plate | NB | 45 | 138 | | 1.38 | | | |
| | VA-mode LC cell | | | | 310 | | | | |
| | First λ/4 plate | NB | 135 | 138 | | 3.29 | | | |
| | Type-I birefringent layer | NB | 9 | 42 | | 1.01 | | | |
| | Type-IV birefringent layer | RLC | | 0 | 211 | | | | |
| | First polarizer | | 90 | | | | | | |
| Example 53 | Second polarizer | | 0 | | | | 2.38 | 53 | 174 |
| | Second λ/4 plate | NB | 45 | 138 | | 1.01 | | | |
| | VA-mode LC cell | | | | 310 | | | | |
| | First λ/4 plate | NB | 135 | 138 | | 3.65 | | | |
| | Type-I birefringent layer | NB | 9 | 42 | | 1.01 | | | |
| | Type-IV birefringent layer | RLC | | 0 | 215 | | | | |
| | First polarizer | | 90 | | | | | | |
| Example 54 | Second polarizer | | 0 | | | | 2.05 | 53 | 175 |
| | Second λ/4 plate | NB | 45 | 138 | | 1.65 | | | |
| | VA-mode LC cell | | | | 310 | | | | |
| | First λ/4 plate | NB | 135 | 138 | | 2.45 | | | |
| | Type-I birefringent layer | NB | 90 | 45 | | 1.01 | | | |
| | Type-IV birefringent layer | RLC | | 0 | 186 | | | | |
| | First polarizer | | 90 | | | | | | |
| Example 55 | Second polarizer | | 0 | | | | 2.02 | 53 | 175 |
| | Second λ/4 plate | NB | 45 | 138 | | 1.38 | | | |
| | VA-mode LC cell | | | | 310 | | | | |
| | First λ/4 plate | NB | 135 | 138 | | 2.66 | | | |
| | Type-I birefringent layer | NB | 90 | 45 | | 1.01 | | | |
| | Type-IV birefringent layer | RLC | | 0 | 186 | | | | |
| | First polarizer | | 90 | | | | | | |
| Example 56 | Second polarizer | | 0 | | | | 2.01 | 49 | 177 |
| | Second λ/4 plate | NB | 45 | 138 | | 1.00 | | | |

TABLE 33-continued

Embodiment 10

| Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|
| VA-mode LC cell |  |  |  | 310 |  |  |  |  |
| First λ/4 plate | NB | 135 | 138 |  | 3.02 |  |  |  |
| Type-I birefringent layer | NB | 90 | 45 |  | 1.01 |  |  |  |
| Type-IV birefringent layer | RLC |  | 0 | 186 |  |  |  |  |
| First polarizer |  | 90 |  |  |  |  |  |  |

TABLE 34

Embodiment 6

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 29' | Second polarizer |  | 0 |  |  |  | 1.02 | 34 | 176 |
|  | Type-IV birefringent layer | RLC |  | 0 | 164 |  |  |  |  |
|  | Type-I birefringent layer | NB | 0 | 71 |  | 1.98 |  |  |  |
|  | Second λ/4 plate | NB | 45 | 138 |  | 1.02 |  |  |  |
|  | VA-mode LC cell |  |  |  | 340 |  |  |  |  |
|  | Type-III birefringent layer | PI |  | 0 | −250 |  |  |  |  |
|  | First λ/4 plate | NB | 135 | 138 |  | 1.02 |  |  |  |
|  | First polarizer |  | 90 |  |  |  |  |  |  |
| Example 30' | Second polarizer |  | 0 |  |  |  | 1.02 | 30 | 170 |
|  | Type-IV birefringent layer | RLC |  | 0 | 164 |  |  |  |  |
|  | Type-I birefringent layer | NB | 0 | 71 |  | 1.98 |  |  |  |
|  | Second λ/4 plate | NB | 45 | 138 |  | 1.02 |  |  |  |
|  | VA-mode LC cell |  |  |  | 320 |  |  |  |  |
|  | Type-III birefringent layer | PI |  | 0 | −233 |  |  |  |  |
|  | First λ/4 plate | NB | 135 | 138 |  | 1.02 |  |  |  |
|  | First polarizer |  | 90 |  |  |  |  |  |  |
| Example 31' | Second polarizer |  | 0 |  |  |  | 1.10 | 33 | 177 |
|  | Type-IV birefringent layer | RLC |  | 0 | 176 |  |  |  |  |
|  | Type-I birefringent layer | NB | 0 | 68 |  | 1.98 |  |  |  |
|  | Second λ/4 plate | NB | 45 | 138 |  | 1.10 |  |  |  |
|  | VA-mode LC cell |  |  |  | 340 |  |  |  |  |
|  | Type-III birefringent layer | PI |  | 0 | −233 |  |  |  |  |
|  | First λ/4 plate | NB | 135 | 138 |  | 1.10 |  |  |  |
|  | First polarizer |  | 90 |  |  |  |  |  |  |
| Example 32' | Second polarizer |  | 0 |  |  |  | 1.10 | 34 | 175 |
|  | Type-IV birefringent layer | RLC |  | 0 | 176 |  |  |  |  |
|  | Type-I birefringent layer | NB | 0 | 68 |  | 1.98 |  |  |  |
|  | Second λ/4 plate | NB | 45 | 138 |  | 1.10 |  |  |  |
|  | VA-mode LC cell |  |  |  | 320 |  |  |  |  |
|  | Type-III birefringent layer | PI |  | 0 | −212 |  |  |  |  |
|  | First λ/4 plate | NB | 135 | 138 |  | 1.10 |  |  |  |
|  | First polarizer |  | 90 |  |  |  |  |  |  |
| Example 33' | Second polarizer |  | 0 |  |  |  | 1.22 | 35 | 176 |
|  | Type-IV birefringent layer | RLC |  | 0 | 176 |  |  |  |  |
|  | Type-I birefringent layer | NB | 0 | 64 |  | 1.98 |  |  |  |
|  | Second λ/4 plate | NB | 45 | 138 |  | 1.22 |  |  |  |
|  | VA-mode LC cell |  |  |  | 340 |  |  |  |  |
|  | Type-III birefringent layer | PI |  | 0 | −212 |  |  |  |  |
|  | First λ/4 plate | NB | 135 | 138 |  | 1.22 |  |  |  |
|  | First polarizer |  | 90 |  |  |  |  |  |  |
| Example 34' | Second polarizer |  | 0 |  |  |  | 1.22 | 35 | 175 |
|  | Type-IV birefringent layer | RLC |  | 0 | 176 |  |  |  |  |
|  | Type-I birefringent layer | NB | 0 | 64 |  | 1.98 |  |  |  |
|  | Second λ/4 plate | NB | 45 | 138 |  | 1.22 |  |  |  |
|  | VA-mode LC cell |  |  |  | 320 |  |  |  |  |
|  | Type-III birefringent layer | PI |  | 0 | −198 |  |  |  |  |
|  | First λ/4 plate | NB | 135 | 138 |  | 1.22 |  |  |  |
|  | First polarizer |  | 90 |  |  |  |  |  |  |
| Example 35' | Second polarizer |  | 0 |  |  |  | 1.31 | 33 | 175 |
|  | Type-IV birefringent layer | RLC |  | 0 | 176 |  |  |  |  |
|  | Type-I birefringent layer | NB | 0 | 61 |  | 1.98 |  |  |  |
|  | Second λ/4 plate | NB | 45 | 138 |  | 1.31 |  |  |  |
|  | VA-mode LC cell |  |  |  | 340 |  |  |  |  |

TABLE 34-continued

Embodiment 6

| Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|
| Type-III birefringent layer | PI | | 0 | −198 | | | | |
| First λ/4 plate | NB | 135 | 138 | | 1.31 | | | |
| First polarizer | | 90 | | | | | | |

TABLE 35

Embodiment 6

| | Optical member | Material | Axis angle [°] | R | Rth or Rlc | Nz coefficient | Avg Nz | CR(45,60) | CR(0,60) |
|---|---|---|---|---|---|---|---|---|---|
| Example 36' | Second polarizer | | 0 | | | | 1.31 | 35 | 172 |
| | Type-IV birefringent layer | RLC | | 0 | 176 | | | | |
| | Type-I birefringent layer | NB | 0 | 61 | | 1.98 | | | |
| | Second λ/4 plate | NB | 45 | 138 | | 1.31 | | | |
| | VA-mode LC cell | | | | 320 | | | | |
| | Type-III birefringent layer | PI | | 0 | −177 | | | | |
| | First λ/4 plate | NB | 135 | 138 | | 1.31 | | | |
| | First polarizer | | 90 | | | | | | |
| Example 37' | Second polarizer | | 0 | | | | 1.58 | 35 | 172 |
| | Type-IV birefringent layer | RLC | | 0 | 193 | | | | |
| | Type-I birefringent layer | NB | 0 | 53 | | 1.98 | | | |
| | Second λ/4 plate | NB | 45 | 138 | | 1.58 | | | |
| | VA-mode LC cell | | | | 340 | | | | |
| | Type-III birefringent layer | PI | | 1 | −152 | | | | |
| | First λ/4 plate | NB | 135 | 138 | | 1.58 | | | |
| | First polarizer | | 90 | | | | | | |
| Example 38' | Second polarizer | | 0 | | | | 1.58 | 33 | 172 |
| | Type-IV birefringent layer | RLC | | 0 | 193 | | | | |
| | Type-I birefringent layer | NB | 0 | 53 | | 1.98 | | | |
| | Second λ/4 plate | NB | 45 | 138 | | 1.58 | | | |
| | VA-mode LC cell | | | | 320 | | | | |
| | Type-III birefringent layer | PI | | 0 | −127 | | | | |
| | First λ/4 plate | NB | 135 | 138 | | 1.58 | | | |
| | First polarizer | | 90 | | | | | | |
| Example 39' | Second polarizer | | 0 | | | | 2.50 | 66 | 172 |
| | Type-IV birefringent layer | RLC | | 0 | 269 | | | | |
| | Type-I birefringent layer | NB | 0 | 38 | | 1.98 | | | |
| | Second λ/4 plate | NB | 45 | 138 | | 2.50 | | | |
| | VA-mode LC cell | | | | 400 | | | | |
| | Type-III birefringent layer | TAC | | 2 | −55 | | | | |
| | First λ/4 plate | NB | 135 | 138 | | 2.50 | | | |
| | First polarizer | | 90 | | | | | | |
| Example 40' | Second polarizer | | 0 | | | | 2.92 | 62 | 172 |
| | Type-IV birefringent layer | RLC | | 0 | 269 | | | | |
| | Type-I birefringent layer | NB | 0 | 38 | | 1.98 | | | |
| | Second λ/4 plate | NB | 45 | 138 | | 2.92 | | | |
| | VA-mode LC cell | | | | 462 | | | | |
| | Type-III birefringent layer | TAC | | 2 | −55 | | | | |
| | First λ/4 plate | NB | 135 | 138 | | 2.92 | | | |
| | First polarizer | | 90 | | | | | | |
| Example 41' | Second polarizer | | 0 | | | | 2.92 | 61 | 173 |
| | Type-IV birefringent layer | RLC | | 0 | 314 | | | | |
| | Type-I birefringent layer | NB | 0 | 37 | | 1.98 | | | |
| | Second λ/4 plate | NB | 45 | 138 | | 2.92 | | | |
| | VA-mode LC cell | | | | 433 | | | | |
| | Type-III birefringent layer | NB | | 2 | −22 | | | | |
| | First λ/4 plate | NB | 135 | 138 | | 2.92 | | | |
| | First polarizer | | 90 | | | | | | |

TABLE 36

Embodiment 7

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Example 42' | Second polarizer | | 0 | | | | 2.08 | 60 | 172 |
| | Type-IV birefringent layer | RLC | | 0 | 230 | | | | |
| | Type-I birefringent layer | NB | 0 | 45 | | 1.98 | | | |
| | Second λ/4 plate | NB | 45 | 138 | | 2.08 | | | |
| | VA-mode LC cell | | | | 290 | | | | |
| | First λ/4 plate | NB | 135 | 138 | | 2.08 | | | |
| | First polarizer | | 90 | | | | | | |
| Example 43' | Second polarizer | | 0 | | | | 2.31 | 59 | 172 |
| | Type-IV birefringent layer | RLC | | 0 | 250 | | | | |
| | Type-I birefringent layer | NB | 0 | 40 | | 1.98 | | | |
| | Second λ/4 plate | NB | 45 | 138 | | 2.31 | | | |
| | VA-mode LC cell | | | | 310 | | | | |
| | First λ/4 plate | NB | 135 | 138 | | 2.31 | | | |
| | First polarizer | | 90 | | | | | | |
| Example 44' | Second polarizer | | 0 | | | | 2.37 | 58 | 171 |
| | Type-IV birefringent layer | RLC | | 0 | 256 | | | | |
| | Type-I birefringent layer | NB | 0 | 40 | | 1.98 | | | |
| | Second λ/4 plate | NB | 45 | 138 | | 2.37 | | | |
| | VA-mode LC cell | | | | 320 | | | | |
| | First λ/4 plate | NB | 135 | 138 | | 2.37 | | | |
| | First polarizer | | 90 | | | | | | |
| Example 45' | Second polarizer | | 0 | | | | 2.48 | 57 | 170 |
| | Type-IV birefringent layer | RLC | | 0 | 267 | | | | |
| | Type-I birefringent layer | NB | 0 | 40 | | 1.98 | | | |
| | Second λ/4 plate | NB | 45 | 138 | | 2.48 | | | |
| | VA-mode LC cell | | | | 340 | | | | |
| | First λ/4 plate | NB | 135 | 138 | | 2.48 | | | |
| | First polarizer | | 90 | | | | | | |
| Example 46' | Second polarizer | | 0 | | | | 2.91 | 50 | 172 |
| | Type-IV birefringent layer | RLC | | 0 | 314 | | | | |
| | Type-I birefringent layer | NB | 0 | 37 | | 1.98 | | | |
| | Second λ/4 plate | NB | 45 | 138 | | 2.91 | | | |
| | VA-mode LC cell | | | | 400 | | | | |
| | First λ/4 plate | NB | 135 | 138 | | 2.91 | | | |
| | First polarizer | | 90 | | | | | | |

TABLE 37

Embodiment 8

| | Optical member | Material | Axis angle [°] | R | Rth or Rlc | Nz coefficient | Avg Nz | CR (45,60) | CR (0,60) |
|---|---|---|---|---|---|---|---|---|---|
| Example 47' | Second polarizer | | 0 | | | | 2.05 | 52 | 173 |
| | Type-IV birefringent layer | RLC | | 0 | 230 | | | | |
| | Type-I birefringent layer | NB | 0 | 45 | | 1.98 | | | |
| | Second λ/4 plate | NB | 45 | 138 | | 2.45 | | | |
| | VA-mode LC cell | | | | 400 | | | | |
| | Type-III birefringent layer | NB | | 1 | −88 | | | | |
| | First λ/4 plate | NB | 135 | 138 | | 1.65 | | | |
| | First polarizer | | 90 | | | | | | |

TABLE 38

Embodiment 9

| | Optical member | Material | Axis angle [°] | R | Rth or Rlc | Nz coefficient | Avg Nz | CR (45,60) | CR (0,60) |
|---|---|---|---|---|---|---|---|---|---|
| Example 48' | Second polarizer | | 0 | | | | 2.05 | 52 | 173 |
| | Second λ/4 plate | NB | 45 | 138 | | 1.65 | | | |
| | VA-mode LC cell | | | | 360 | | | | |
| | Type-III birefringent layer | TAC | | 2 | −52 | | | | |
| | First λ/4 plate | NB | 135 | 138 | | 2.45 | | | |
| | Type-I birefringent layer | NB | 90 | 45 | | 1.98 | | | |
| | Type-IV birefringent layer | RLC | | 0 | 230 | | | | |
| | First polarizer | | 90 | | | | | | |
| Example 49' | Second polarizer | | 0 | | | | 2.05 | 50 | 172 |
| | Second λ/4 plate | NB | 45 | 138 | | 1.65 | | | |
| | VA-mode LC cell | | | | 400 | | | | |
| | Type-III birefringent layer | NB | | 1 | −88 | | | | |
| | First λ/4 plate | NB | 135 | 138 | | 2.45 | | | |
| | Type-I birefringent layer | NB | 90 | 45 | | 1.98 | | | |

TABLE 38-continued

Embodiment 9

| | | | | |
|---|---|---|---|---|
| Type-IV birefringent layer | RLC | 0 | 230 | |
| First polarizer | | 90 | | |

TABLE 39

Embodiment 10

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Example 50' | Second polarizer | | 0 | | | | 2.30 | 52 | 173 |
| | Second λ/4 plate | NB | 45 | 138 | | 1.98 | | | |
| | VA-mode LC cell | | | | 310 | | | | |
| | First λ/4 plate | NB | 135 | 138 | | 2.62 | | | |
| | Type-I birefringent layer | NB | 90 | 40 | | 1.98 | | | |
| | Type-IV birefringent layer | RLC | | 0 | 250 | | | | |
| | First polarizer | | 90 | | | | | | |
| Example 51' | Second polarizer | | 0 | | | | 2.30 | 55 | 175 |
| | Second λ/4 plate | NB | 45 | 138 | | 1.65 | | | |
| | VA-mode LC cell | | | | 310 | | | | |
| | First λ/4 plate | NB | 135 | 138 | | 2.95 | | | |
| | Type-I birefringent layer | NB | 90 | 40 | | 1.98 | | | |
| | Type-IV birefringent layer | RLC | | 0 | 250 | | | | |
| | First polarizer | | 90 | | | | | | |
| Example 52' | Second polarizer | | 0 | | | | 2.31 | 53 | 174 |
| | Second λ/4 plate | NB | 45 | 138 | | 1.38 | | | |
| | VA-mode LC cell | | | | 310 | | | | |
| | First λ/4 plate | NB | 135 | 138 | | 3.29 | | | |
| | Type-I birefringent layer | NB | 90 | 40 | | 1.98 | | | |
| | Type-IV birefringent layer | RLC | | 0 | 250 | | | | |
| | First polarizer | | 90 | | | | | | |
| Example 53' | Second polarizer | | 0 | | | | 2.38 | 53 | 174 |
| | Second λ/4 plate | NB | 45 | 138 | | 1.01 | | | |
| | VA-mode LC cell | | | | 310 | | | | |
| | First λ/4 plate | NB | 135 | 138 | | 3.65 | | | |
| | Type-I birefringent layer | NB | 90 | 40 | | 1.98 | | | |
| | Type-IV birefringent layer | RLC | | 0 | 256 | | | | |
| | First polarizer | | 90 | | | | | | |
| Example 54' | Second polarizer | | 0 | | | | 2.05 | 52 | 175 |
| | Second λ/4 plate | NB | 45 | 138 | | 1.65 | | | |
| | VA-mode LC cell | | | | 310 | | | | |
| | First λ/4 plate | NB | 135 | 138 | | 2.45 | | | |
| | Type-I birefringent layer | NB | 90 | 45 | | 1.98 | | | |
| | Type-IV birefringent layer | RLC | | 0 | 230 | | | | |
| | First polarizer | | 90 | | | | | | |
| Example 55' | Second polarizer | | 0 | | | | 2.02 | 51 | 172 |
| | Second λ/4 plate | NB | 45 | 138 | | 1.38 | | | |
| | VA-mode LC cell | | | | 310 | | | | |
| | First λ/4 plate | NB | 135 | 138 | | 2.66 | | | |
| | Type-I birefringent layer | NB | 90 | 45 | | 1.98 | | | |
| | Type-IV birefringent layer | RLC | | 0 | 230 | | | | |
| | First polarizer | | 90 | | | | | | |
| Example 56' | Second polarizer | | 0 | | | | 2.01 | 53 | 173 |
| | Second λ/4 plate | NB | 45 | 138 | | 1.00 | | | |
| | VA-mode LC cell | | | | 310 | | | | |
| | First λ/4 plate | NB | 135 | 138 | | 3.02 | | | |
| | Type-I birefringent layer | NB | 90 | 45 | | 1.98 | | | |
| | Type-IV birefringent layer | RLC | | 0 | 230 | | | | |
| | First polarizer | | 90 | | | | | | |

TABLE 40

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Reference Example 29 | Second polarizer | | 0 | | | | 1.02 | 35 | 178 |
| | Type-II birefringent layer | A | 0 | 138 | | −0.01 | | | |

TABLE 40-continued

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| | Second λ/4 plate | NB | 45 | 138 | | 1.02 | | | |
| | VA-mode LC cell | | | | 340 | | | | |
| | Type-III birefringent layer | PI | | 0 | −250 | | | | |
| | First λ/4 plate | NB | 135 | 138 | | 1.02 | | | |
| | First polarizer | | 90 | | | | | | |
| Reference Example 30 | Second polarizer | | 0 | | | | 1.02 | 34 | 178 |
| | Type-II birefringent layer | A | 0 | 138 | | −0.01 | | | |
| | Second λ/4 plate | NB | 45 | 138 | | 1.02 | | | |
| | VA-mode LC cell | | | | 320 | | | | |
| | Type-III birefringent layer | PI | | 0 | −233 | | | | |
| | First λ/4 plate | NB | 135 | 138 | | 1.02 | | | |
| | First polarizer | | 90 | | | | | | |
| Reference Example 31 | Second polarizer | | 0 | | | | 1.10 | 37 | 178 |
| | Type-II birefringent layer | A | 0 | 138 | | −0.01 | | | |
| | Second λ/4 plate | NB | 45 | 138 | | 1.10 | | | |
| | VA-mode LC cell | | | | 340 | | | | |
| | Type-III birefringent layer | PI | | 0 | −233 | | | | |
| | First λ/4 plate | NB | 135 | 138 | | 1.10 | | | |
| | First polarizer | | 90 | | | | | | |
| Reference Example 32 | Second polarizer | | 0 | | | | 1.10 | 37 | 176 |
| | Type-II birefringent layer | A | 0 | 138 | | −0.01 | | | |
| | Second λ/4 plate | NB | 45 | 138 | | 1.10 | | | |
| | VA-mode LC cell | | | | 320 | | | | |
| | Type-III birefringent layer | PI | | 0 | −212 | | | | |
| | First λ/4 plate | NB | 135 | 138 | | 1.10 | | | |
| | First polarizer | | 90 | | | | | | |
| Reference Example 33 | Second polarizer | | 0 | | | | 1.22 | 38 | 177 |
| | Type-II birefringent layer | A | 0 | 138 | | −0.01 | | | |
| | Second λ/4 plate | NB | 45 | 138 | | 1.22 | | | |
| | VA-mode LC cell | | | | 340 | | | | |
| | Type-III birefringent layer | PI | | 0 | −212 | | | | |
| | First λ/4 plate | NB | 135 | 138 | | 1.22 | | | |
| | First polarizer | | 90 | | | | | | |
| Reference Example 34 | Second polarizer | | 0 | | | | 1.22 | 36 | 177 |
| | Type-II birefringent layer | A | 0 | 138 | | −0.01 | | | |
| | Second λ/4 plate | NB | 45 | 138 | | 1.22 | | | |
| | VA-mode LC cell | | | | 320 | | | | |
| | Type-III birefringent layer | PI | | 0 | −198 | | | | |
| | First λ/4 plate | NB | 135 | 138 | | 1.22 | | | |
| | First polarizer | | 90 | | | | | | |
| Reference Example 35 | Second polarizer | | 0 | | | | 1.31 | 37 | 177 |
| | Type-II birefringent layer | A | 0 | 138 | | −0.01 | | | |
| | Second λ/4 plate | NB | 45 | 138 | | 1.31 | | | |
| | VA-mode LC cell | | | | 340 | | | | |
| | Type-III birefringent layer | PI | | 0 | −198 | | | | |
| | First λ/4 plate | NB | 135 | 138 | | 1.31 | | | |
| | First polarizer | | 90 | | | | | | |
| Reference Example 36 | Second polarizer | | 0 | | | | 1.31 | 37 | 178 |
| | Type-II birefringent layer | A | 0 | 138 | | −0.01 | | | |
| | Second λ/4 plate | NB | 45 | 138 | | 1.31 | | | |
| | VA-mode LC cell | | | | 320 | | | | |
| | Type-III birefringent layer | PI | | 0 | −177 | | | | |
| | First λ/4 plate | NB | 135 | 138 | | 1.31 | | | |
| | First polarizer | | 90 | | | | | | |

TABLE 41

| | Optical member | Material | Axis angle [°] | Phase difference [nm] R | Phase difference [nm] Rth or Rlc | Nz coefficient | Average value of Nz coefficients | CR (45, 60) | CR (0, 60) |
|---|---|---|---|---|---|---|---|---|---|
| Reference Example 37 | Second polarizer | | 0 | | | | 1.58 | 66 | 175 |
| | Type-II birefringent layer | A | 0 | 121 | | −0.32 | | | |
| | Second λ/4 plate | NB | 45 | 138 | | 1.58 | | | |
| | VA-mode LC cell | | | | 340 | | | | |
| | Type-III birefringent layer | PI | | 1 | −152 | | | | |
| | First λ/4 plate | NB | 135 | 138 | | 1.58 | | | |
| | First polarizer | | 90 | | | | | | |
| Reference Example 38 | Second polarizer | | 0 | | | | 1.58 | 65 | 178 |
| | Type-II birefringent layer | A | 0 | 121 | | −0.32 | | | |
| | Second λ/4 plate | NB | 45 | 138 | | 1.58 | | | |
| | VA-mode LC cell | | | | 320 | | | | |
| | Type-III birefringent layer | PI | | 0 | −127 | | | | |
| | First λ/4 plate | NB | 135 | 138 | | 1.58 | | | |
| | First polarizer | | 90 | | | | | | |

TABLE 41-continued

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Reference Example 39 | Second polarizer | | 0 | | | | 2.50 | 65 | 174 |
| | Type-II birefringent layer | A | 0 | 75 | −2.13 | | | | |
| | Second λ/4 plate | NB | 45 | 138 | | 2.50 | | | |
| | VA-mode LC cell | | | | 400 | | | | |
| | Type-III birefringent layer | TAC | 2 | | −55 | | | | |
| | First λ/4 plate | NB | 135 | 138 | | 2.50 | | | |
| | First polarizer | | 90 | | | | | | |
| Reference Example 40 | Second polarizer | | 0 | | | | 2.92 | 60 | 176 |
| | Type-II birefringent layer | A | 0 | 70 | −3.21 | | | | |
| | Second λ/4 plate | NB | 45 | 138 | | 2.92 | | | |
| | VA-mode LC cell | | | | 462 | | | | |
| | Type-III birefringent layer | TAC | 2 | | −55 | | | | |
| | First λ/4 plate | NB | 135 | 138 | | 2.92 | | | |
| | First polarizer | | 90 | | | | | | |
| Reference Example 41 | Second polarizer | | 0 | | | | 2.92 | 62 | 176 |
| | Type-II birefringent layer | A | 0 | 70 | −3.21 | | | | |
| | Second λ/4 plate | NB | 45 | 138 | | 2.92 | | | |
| | VA-mode LC cell | | | | 433 | | | | |
| | Type-III birefringent layer | NB | 2 | | −22 | | | | |
| | First λ/4 plate | NB | 135 | 138 | | 2.92 | | | |
| | First polarizer | | 90 | | | | | | |

TABLE 42

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Reference Example 42 | Second polarizer | | 0 | | | | 2.08 | 58 | 175 |
| | Type-II birefringent layer | A | 0 | 85 | | −1.21 | | | |
| | Second λ/4 plate | NB | 45 | 138 | | 2.08 | | | |
| | VA-mode LC cell | | | | 290 | | | | |
| | First λ/4 plate | NB | 135 | 138 | | 2.08 | | | |
| | First polarizer | | 90 | | | | | | |
| Reference Example 43 | Second polarizer | | 0 | | | | 2.31 | 55 | 178 |
| | Type-II birefringent layer | A | 0 | 78 | | −1.58 | | | |
| | Second λ/4 plate | NB | 45 | 138 | | 2.31 | | | |
| | VA-mode LC cell | | | | 310 | | | | |
| | First λ/4 plate | NB | 135 | 138 | | 2.31 | | | |
| | First polarizer | | 90 | | | | | | |
| Reference Example 44 | Second polarizer | | 0 | | | | 2.37 | 56 | 175 |
| | Type-II birefringent layer | A | 0 | 74 | | −1.87 | | | |
| | Second λ/4 plate | NB | 45 | 138 | | 2.37 | | | |
| | VA-mode LC cell | | | | 320 | | | | |
| | First λ/4 plate | NB | 135 | 138 | | 2.37 | | | |
| | First polarizer | | 90 | | | | | | |
| Reference Example 45 | Second polarizer | | 0 | | | | 2.48 | 55 | 175 |
| | Type-II birefringent layer | A | 0 | 70 | | −2.10 | | | |
| | Second λ/4 plate | NB | 45 | 138 | | 2.48 | | | |
| | VA-mode LC cell | | | | 340 | | | | |
| | First λ/4 plate | NB | 135 | 138 | | 2.48 | | | |
| | First polarizer | | 90 | | | | | | |
| Reference Example 46 | Second polarizer | | 0 | | | | 2.91 | 52 | 172 |
| | Type-II birefringent layer | A | 0 | 68 | | −3.02 | | | |
| | Second λ/4 plate | NB | 45 | 138 | | 2.91 | | | |
| | VA-mode LC cell | | | | 400 | | | | |
| | First λ/4 plate | NB | 135 | 138 | | 2.91 | | | |
| | First polarizer | | 90 | | | | | | |

TABLE 43

| | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Reference Example 47 | Second polarizer | | 0 | | | | 2.05 | 51 | 175 |
| | Type-II birefringent layer | A | 0 | 105 | | −0.45 | | | |
| | Second λ/4 plate | NB | 45 | 138 | | 2.45 | | | |
| | VA-mode LC cell | | | | 400 | | | | |

TABLE 43-continued

| Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|
| Type-III birefringent layer | NB | | 1 | −88 | | | | |
| First λ/4 plate | NB | 135 | 138 | | 1.65 | | | |
| First polarizer | | 90 | | | | | | |

TABLE 44

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Reference Example 48 | Second polarizer | | 0 | | | | 2.05 | 50 | 174 |
| | Second λ/4 plate | NB | 45 | 138 | | 1.65 | | | |
| | VA-mode LC cell | | | | 360 | | | | |
| | Type-III birefringent layer | TAC | | 2 | −52 | | | | |
| | First λ/4 plate | NB | 135 | 138 | | 2.45 | | | |
| | Type-II birefringent layer | A | 90 | 105 | | −0.45 | | | |
| | First polarizer | | 90 | | | | | | |
| Reference Example 49 | Second polarizer | | 0 | | | | 2.05 | 51 | 175 |
| | Second λ/4 plate | NB | 45 | 138 | | 1.65 | | | |
| | VA-mode LC cell | | | | 400 | | | | |
| | Type-III birefringent layer | NB | | 1 | −88 | | | | |
| | First λ/4 plate | NB | 135 | 138 | | 2.45 | | | |
| | Type-II birefringent layer | A | 90 | 105 | | −0.45 | | | |
| | First polarizer | | 90 | | | | | | |

TABLE 45

| | Optical member | Material | Axis angle [°] | Phase difference [nm] R | Rth or Rlc | Nz coefficient | Average value of Nz coefficients | Evaluation results CR (45, 60) | CR (0, 60) |
|---|---|---|---|---|---|---|---|---|---|
| Reference Example 50 | Second polarizer | | 0 | | | | 2.30 | 56 | 177 |
| | Second λ/4 plate | NB | 45 | 138 | | 1.98 | | | |
| | VA-mode LC cell | | | | 310 | | | | |
| | First λ/4 plate | NB | 135 | 138 | | 2.62 | | | |
| | Type-II birefringent layer | A | 90 | 78 | | −1.58 | | | |
| | First polarizer | | 90 | | | | | | |
| Reference Example 51 | Second polarizer | | 0 | | | | 2.30 | 56 | 177 |
| | Second λ/4 plate | NB | 45 | 138 | | 1.65 | | | |
| | VA-mode LC cell | | | | 310 | | | | |
| | First λ/4 plate | NB | 135 | 138 | | 2.95 | | | |
| | Type-II birefringent layer | A | 90 | 78 | | −1.58 | | | |
| | First polarizer | | 90 | | | | | | |
| Reference Example 52 | Second polarizer | | 0 | | | | 2.31 | 55 | 177 |
| | Second λ/4 plate | NB | 45 | 138 | | 1.38 | | | |
| | VA-mode LC cell | | | | 310 | | | | |
| | First λ/4 plate | NB | 135 | 138 | | 3.29 | | | |
| | Type-II birefringent layer | A | 90 | 78 | | −1.58 | | | |
| | First polarizer | | 90 | | | | | | |
| Reference Example 53 | Second polarizer | | 0 | | | | 2.38 | 55 | 175 |
| | Second λ/4 plate | NB | 45 | 138 | | 1.01 | | | |
| | VA-mode LC cell | | | | 310 | | | | |
| | First λ/4 plate | NB | 135 | 138 | | 3.65 | | | |
| | Type-II birefringent layer | A | 90 | 78 | | −1.58 | | | |
| | First polarizer | | 90 | | | | | | |
| Reference Example 54 | Second polarizer | | 0 | | | | 2.05 | 52 | 176 |
| | Second λ/4 plate | NB | 45 | 138 | | 1.65 | | | |
| | VA-mode LC cell | | | | 310 | | | | |
| | First λ/4 plate | NB | 135 | 138 | | 2.45 | | | |
| | Type-II birefringent layer | A | 90 | 105 | | −0.45 | | | |
| | First polarizer | | 90 | | | | | | |
| Reference Example 55 | Second polarizer | | 0 | | | | 2.02 | 52 | 177 |
| | Second λ/4 plate | NB | 45 | 138 | | 1.38 | | | |
| | VA-mode LC cell | | | | 310 | | | | |
| | First λ/4 plate | NB | 135 | 138 | | 2.66 | | | |

TABLE 45-continued

|  | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Reference Example 56 | Type-II birefringent layer | A | 90 | 105 | | −0.45 | 2.01 | 50 | 176 |
| | First polarizer | | 90 | | | | | | |
| | Second polarizer | | 0 | | | | | | |
| | Second λ/4 plate | NB | 45 | 138 | | 1.00 | | | |
| | VA-mode LC cell | | | | 310 | | | | |
| | First λ/4 plate | NB | 135 | 138 | | 3.02 | | | |
| | Type-II birefringent layer | A | 90 | 105 | | −0.45 | | | |
| | First polarizer | | 90 | | | | | | |

TABLE 46

|  | Optical member | Material | Axis angle [°] | Phase difference [nm] R | Phase difference [nm] Rth or Rlc | Nz coefficient | Average value of Nz coefficients | Evaluation results CR (45, 60) | Evaluation results CR (0, 60) |
|---|---|---|---|---|---|---|---|---|---|
| Comparative Example 2 | Second polarizer | | −20 | | | | 1.58 | 5 | 40 |
| | Second λ/4 plate | NB | 25 | 138 | | 1.58 | | | |
| | VA-mode LC cell | | | | 320 | | | | |
| | First λ/4 plate | NB | 115 | 138 | | 1.58 | | | |
| | First polarizer | | 70 | | | | | | |

The liquid crystal display devices of the embodiments each include a circularly polarizing plate including a combination of a linearly polarizing plate (polarizer) and a λ/4 plate on both sides of the liquid crystal cell, and thus they display an image in a circularly polarized light VA mode. The circularly polarized light VA mode provides not only the effect of improving the transmittance but also the effect of preventing reflection, and thus is effective for improving the contrast ratio. The effect of preventing reflection by the circularly polarized light VA mode is such that the circularly polarizing plate prevents the light incident in a liquid crystal display device from the surrounding thereof and reflected in the liquid crystal display device, what is called internally reflected light, from leaving the liquid crystal display device. Thus, the circularly polarized light VA mode can suppress emission of light reflected on the surfaces of components such as black matrices, wiring, and electrodes in the liquid crystal cell toward the outside of the liquid crystal display device and, in particular, can prevent reduction in contrast ratio of the liquid crystal display device in a bright place (in bright environment).

In addition to the aforementioned internally reflected light, examples of reflected light which reduces the contrast ratio of the liquid crystal display device in bright environment include light reflected on the surface of the liquid crystal display device without entering the liquid crystal display device from the surrounding thereof, what is called surface-reflected light. As a result of suppressing internally reflected light in circularly polarized light VA-mode liquid crystal display devices, the amount of surface-reflected light has a marked influence on the visibility of displayed images. Thus, as a circularly polarized light VA-mode liquid crystal display device has a measure of suppressing surface-reflected light, it can achieve a very high contrast ratio in bright environment and a viewer can really feel markedly improved display quality.

Figure 35:
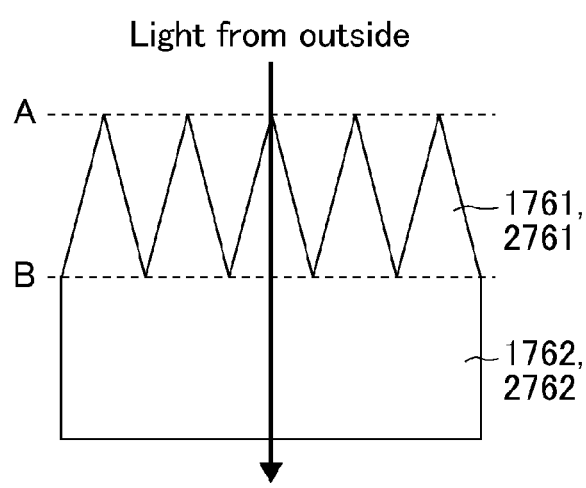
FIG. 35(a) is an enlarged schematic view of the cross section of a moth-eye film.
FIG. 35(b) is an exemplary diagram showing a change in the refractive index at the interface between the moth-eye film and the air layer.
Figure 35:
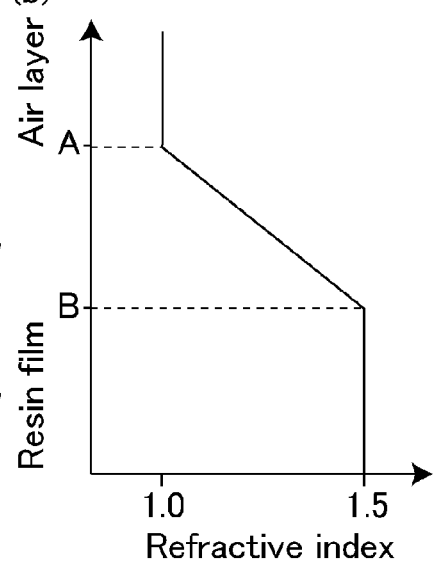

Examples of the anti-reflection film (layer) for suppressing surface reflection include anti-reflection films formed by stacking multiple films having different refractive indices and anti-reflection films including fine protrusions and depressions on the surface. In particular, a "moth-eye (eyes-of-moth) film", one of the latter anti-reflection films, includes many protrusions smaller than the wavelength of visible light (380 to 780 nm) on the surface, and shows a very excellent effect of suppressing surface reflection. As shown in FIG. 35(a), the light incident on the moth-eye film reaches a film base 1762 or 2762 via fine protrusions 1761 or 2761 on the surface, and thus the area between the air layer and the film base (the area between A and B in the figure), where the protrusions and the air layer coexist, can be treated as an area having a refractive index intermediate between the refractive indices of the material forming the film (about 1.5 in the case of resin film) and the air (1.0). In other words, the refractive index of this area continuously gradually increases from the refractive index of the air in contact with the surface of the film to the refractive index of the material forming the film within a distance shorter than the wavelength of visible light in response to the change in ratio by volume between the protrusions and the air layer, as shown in FIG. 35(b). As a result, the light incident on the moth-eye film does not recognize the interface between the air and the film as an interface of layers having different refractive indices, greatly suppressing reflection of light at the interface. The moth-eye film can, for example, reduce the surface reflectance of visible light to about 0.15%.

Figure 10:
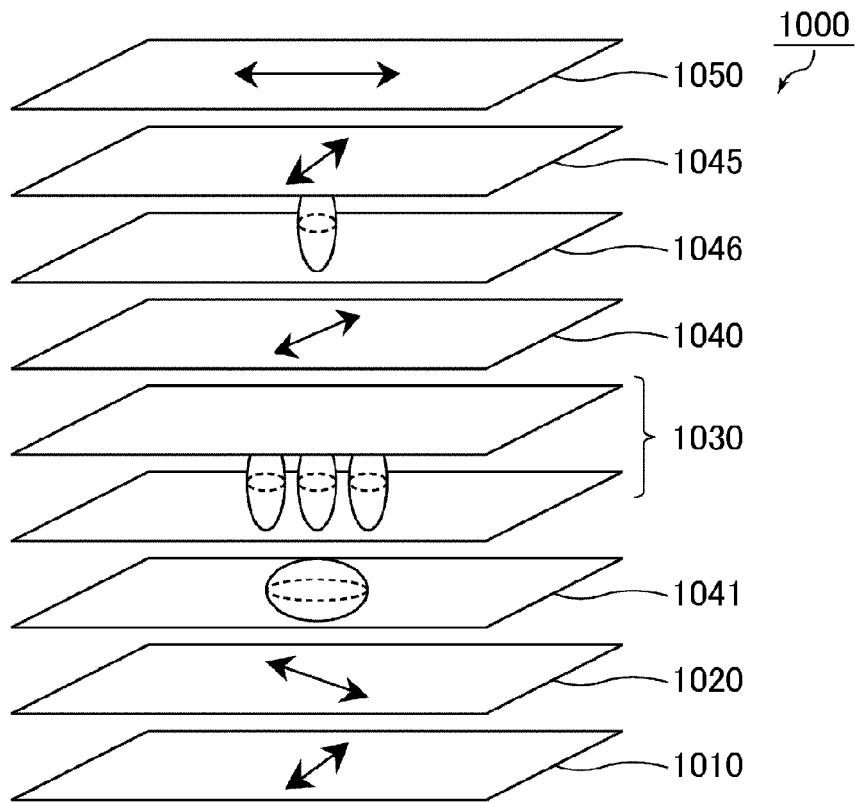
FIG. 10 is an exploded perspective view showing the structure of the first circularly polarized light VA-mode liquid crystal display device of the present invention including Type-I, Type-IV, and Type-III birefringent layers.
Figure 11:
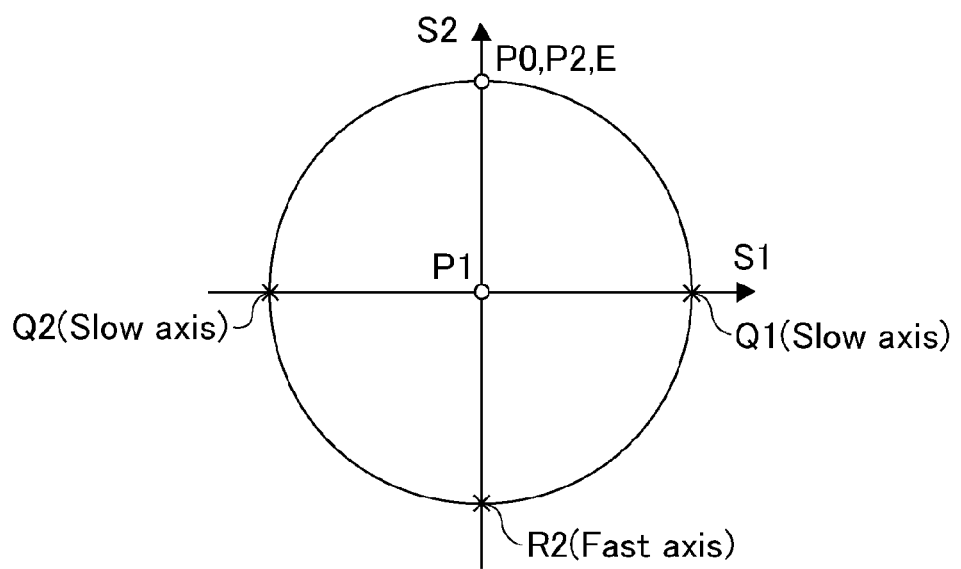
FIG. 11 shows a change in the polarization state as light passes through the components of the circularly polarized light VA-mode liquid crystal display device shown in FIG. 10 (a mode satisfying Nzq1=Nzq2=2.0, R3=−61 nm, Rlc=320 nm, R4=208 nm, Nz1=1.00, and R1=140 nm) observed in the front direction, projected on the S1-S2 plane on the Poincare sphere.
Figure 12:
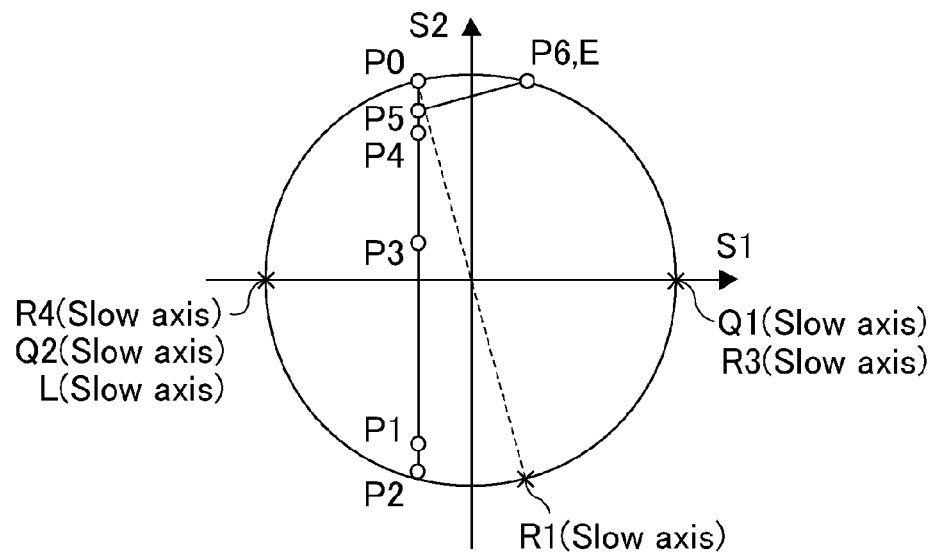
FIG. 12 shows a change in the polarization state as light passes through the components of the circularly polarized light VA-mode liquid crystal display device shown in FIG. 10 (a mode satisfying Nzq1=Nzq2=2.0, R3=−61 nm, Rlc=320 nm, R4=208 nm, Nz1=1.00, and R1=140 nm) observed in the oblique direction in an azimuth of 45° and a pole of 60°, projected on the S1-S2 plane on the Poincare sphere.
Figure 13:
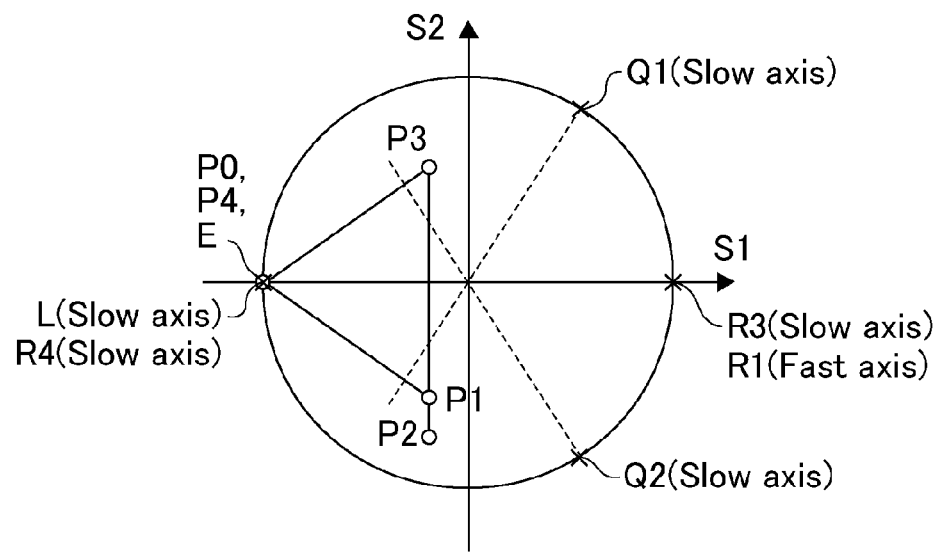
FIG. 13 shows a change in the polarization state as light passes through the components of the circularly polarized light VA-mode liquid crystal display device shown in FIG. 10 (a mode satisfying Nzq1=Nzq2=2.0, R3=−61 nm, Rlc=320 nm, R4=208 nm, Nz1=1.00, and R1=140 nm) observed in the oblique direction in an azimuth of 0° and a pole of 60°, projected on the S1-S2 plane on the Poincare sphere.
Figure 14:
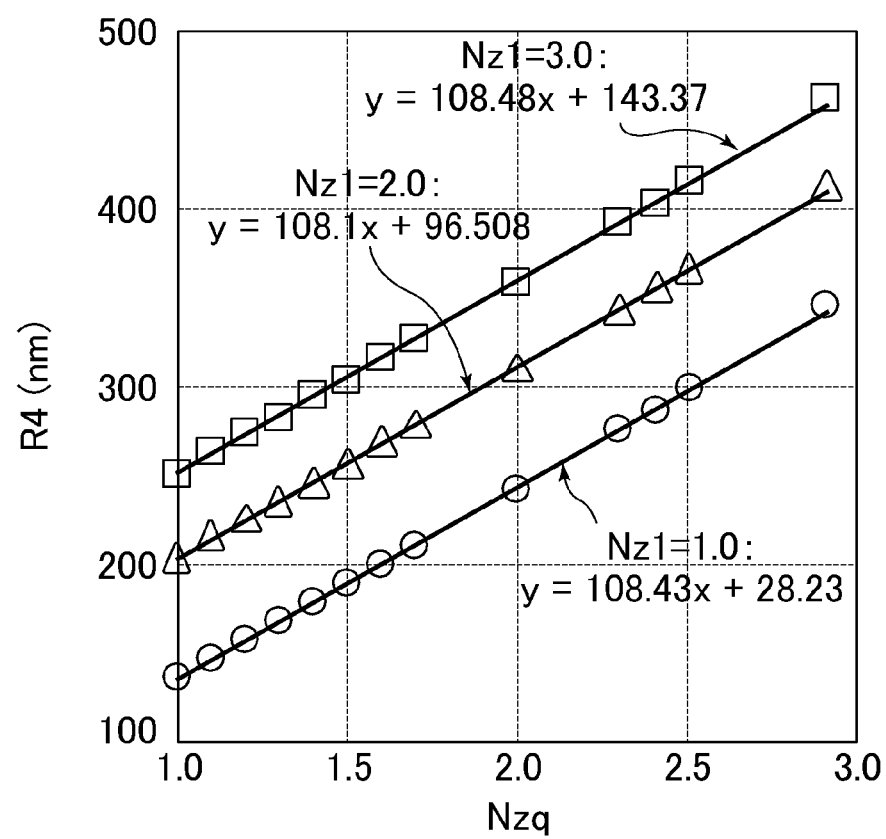
FIG. 14 is a graph showing the relationship between the average value Nzq of the Nz coefficients of the first and second λ/4 plates and the phase difference R4 in the perpendicular direction of the Type-IV birefringent layer in the circularly polarized light VA-mode liquid crystal display device shown in FIG. 10.
Figure 15:
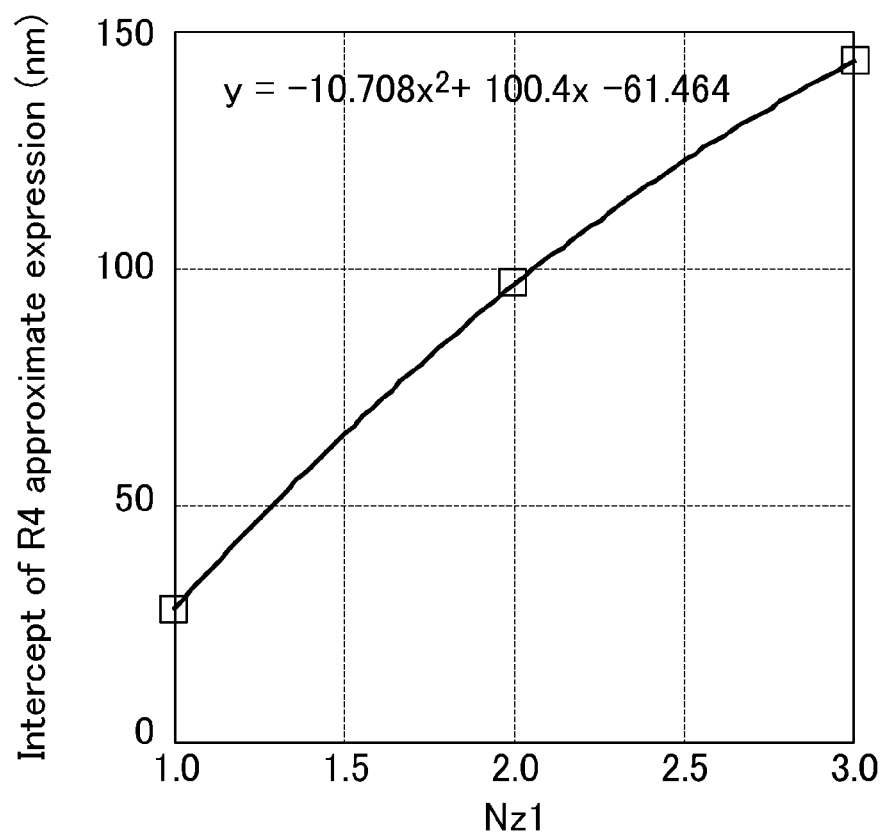
FIG. 15 is a graph showing the relationship between the Nz coefficient Nz1 of the first λ/4 plate and the approximate expression of the phase difference R4 in the perpendicular direction of the Type-IV birefringent layer in the circularly polarized light VA-mode liquid crystal display device shown in FIG. 10.
Figure 16:
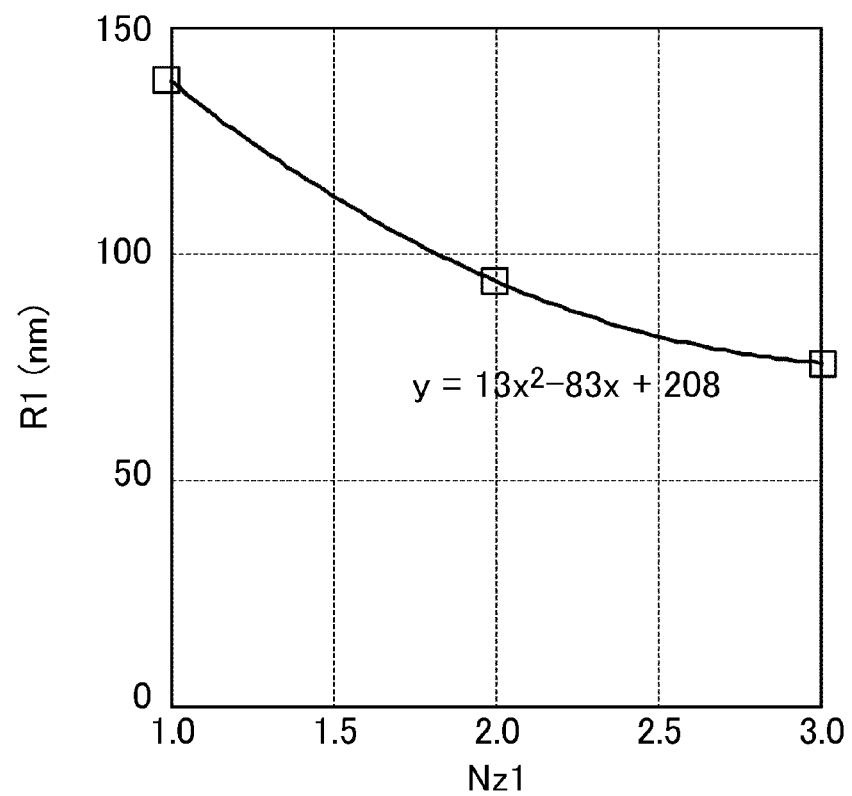
FIG. 16 is a graph showing the relationship between the Nz coefficient Nz1 of the first λ/4 plate and the in-plane phase difference R1 of the Type-I birefringent layer in the circularly polarized light VA-mode liquid crystal display device shown in FIG. 10.
Figure 17:
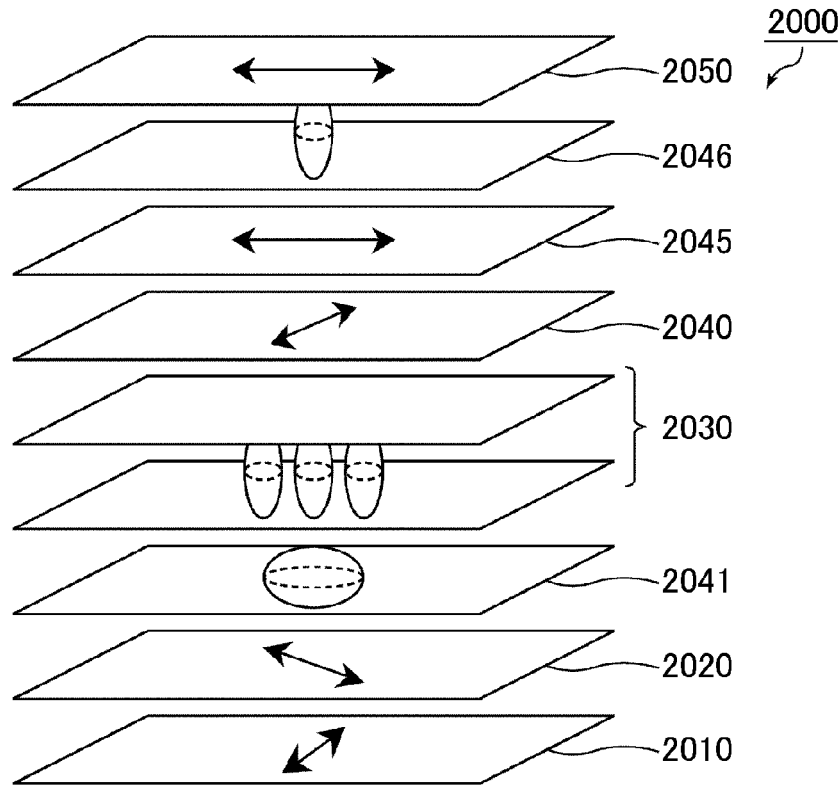
FIG. 17 is an exploded perspective view showing the structure of the second circularly polarized light VA-mode liquid crystal display device of the present invention including Type-I, Type-IV, and Type-III birefringent layers.
Figure 18:
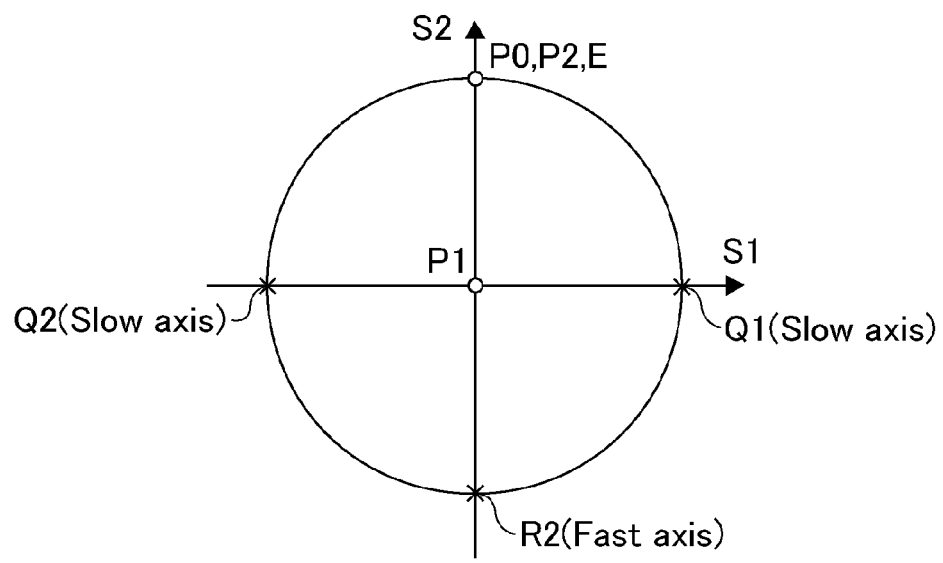
FIG. 18 shows a change in the polarization state as light passes through the components of the circularly polarized light VA-mode liquid crystal display device shown in FIG. 17 (a mode satisfying Nzq1=Nzq2=2.0, R3=−61 nm, Rlc=320 nm, R4=208 nm, Nz1=1.00, and R1=140 nm) observed in the front direction, projected on the S1-S2 plane on the Poincare sphere.
Figure 19:
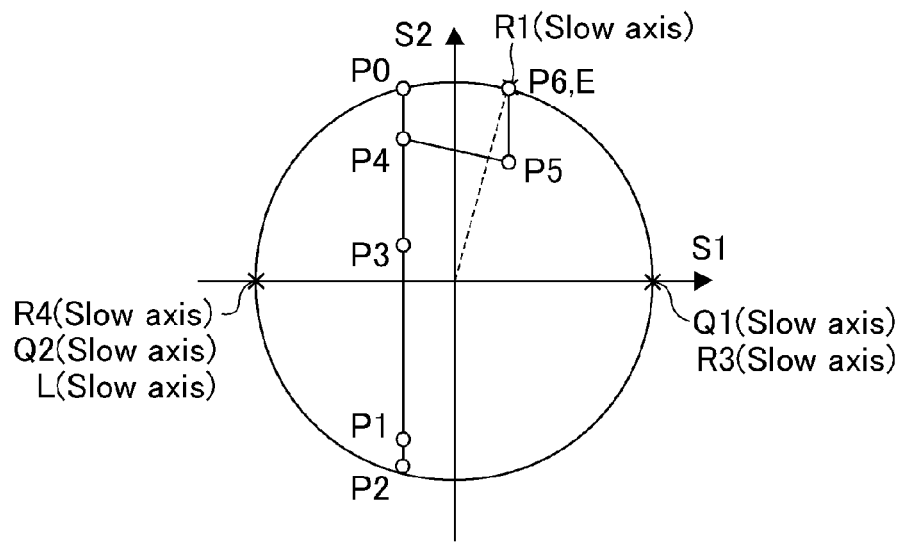
FIG. 19 shows a change in the polarization state as light passes through the components of the circularly polarized light VA-mode liquid crystal display device shown in FIG. 17 (a mode satisfying Nzq1=Nzq2=2.0, R3=−61 nm, Rlc=320 nm, R4=208 nm, Nz1=1.00, and R1=140 nm) observed in the oblique direction in an azimuth of 45° and a pole of 60°, projected on the S1-S2 plane on the Poincare sphere.
Figure 20:
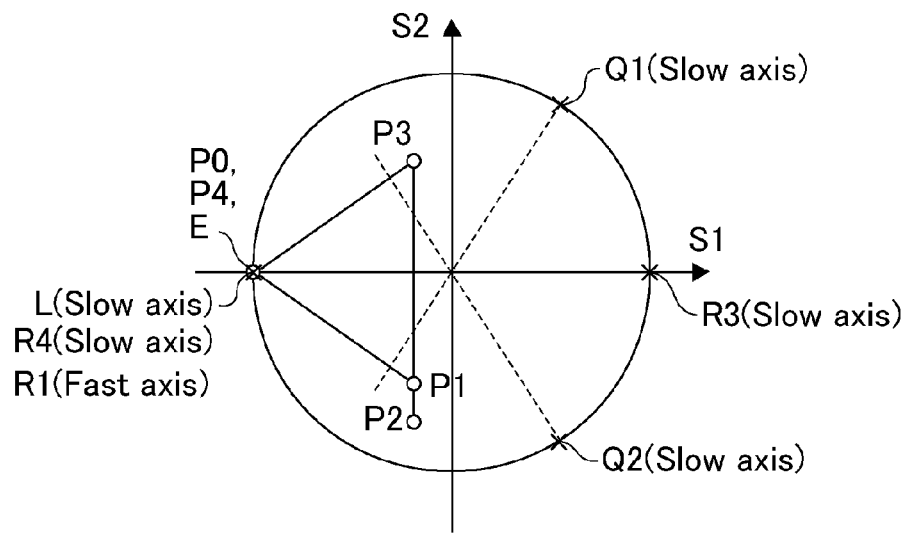
FIG. 20 shows a change in the polarization state as light passes through the components of the circularly polarized light VA-mode liquid crystal display device shown in FIG. 17 (a mode satisfying Nzq1=Nzq2=2.0, R3=−61 nm, Rlc=320 nm, R4=208 nm, Nz1=1.00, and R1=140 nm) observed in the oblique direction in an azimuth of 0° and a pole of 60°, projected on the S1-S2 plane on the Poincare sphere.
Figure 21:
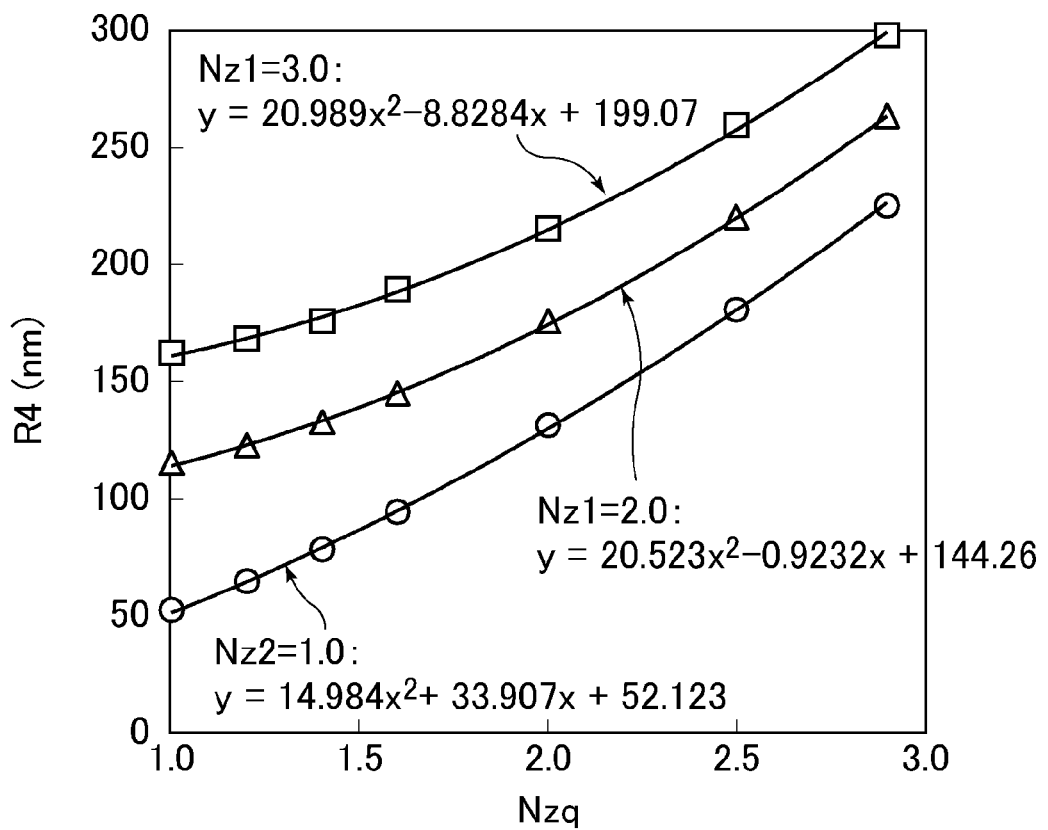
FIG. 21 is a graph showing the relationship between the average value Nzq of the Nz coefficients of the first and second λ/4 plates and the phase difference R4 in the perpendicular direction of the Type-IV birefringent layer in the circularly polarized light VA-mode liquid crystal display device shown in FIG. 17.
Figure 22:
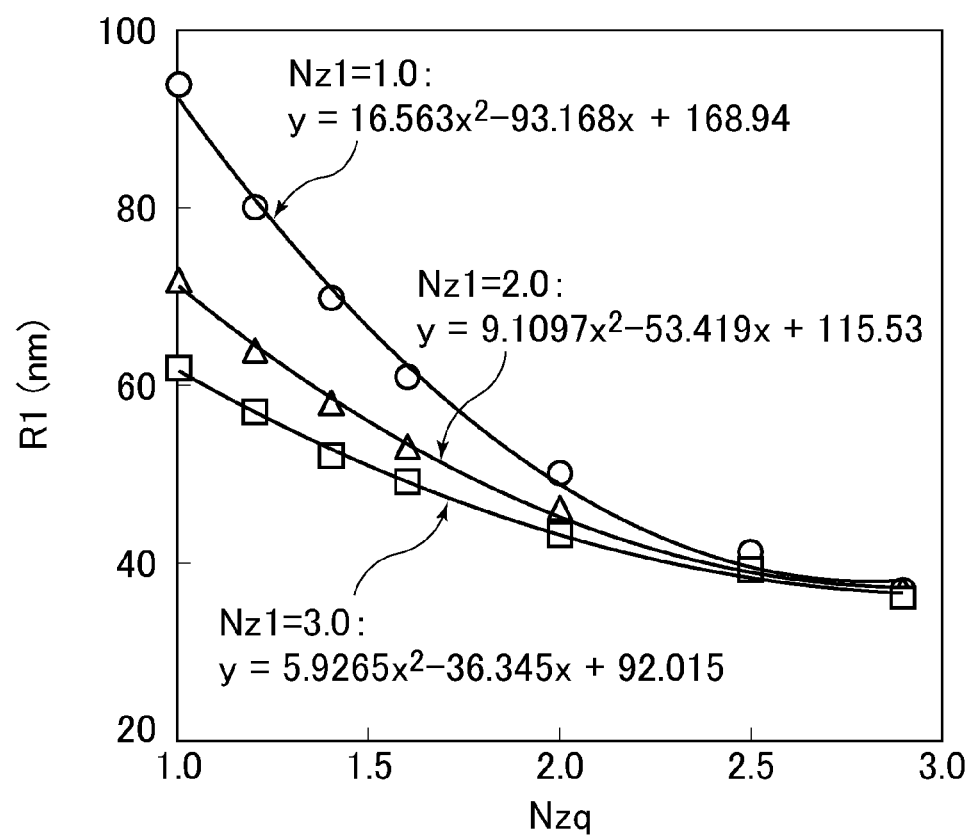
FIG. 22 is a graph showing the relationship between the average value Nzq of the Nz coefficients of the first and second λ/4 plates and in-plane phase difference R1 of the Type-I birefringent layer in the circularly polarized light VA-mode liquid crystal display device shown in FIG. 17.
Figure 36:
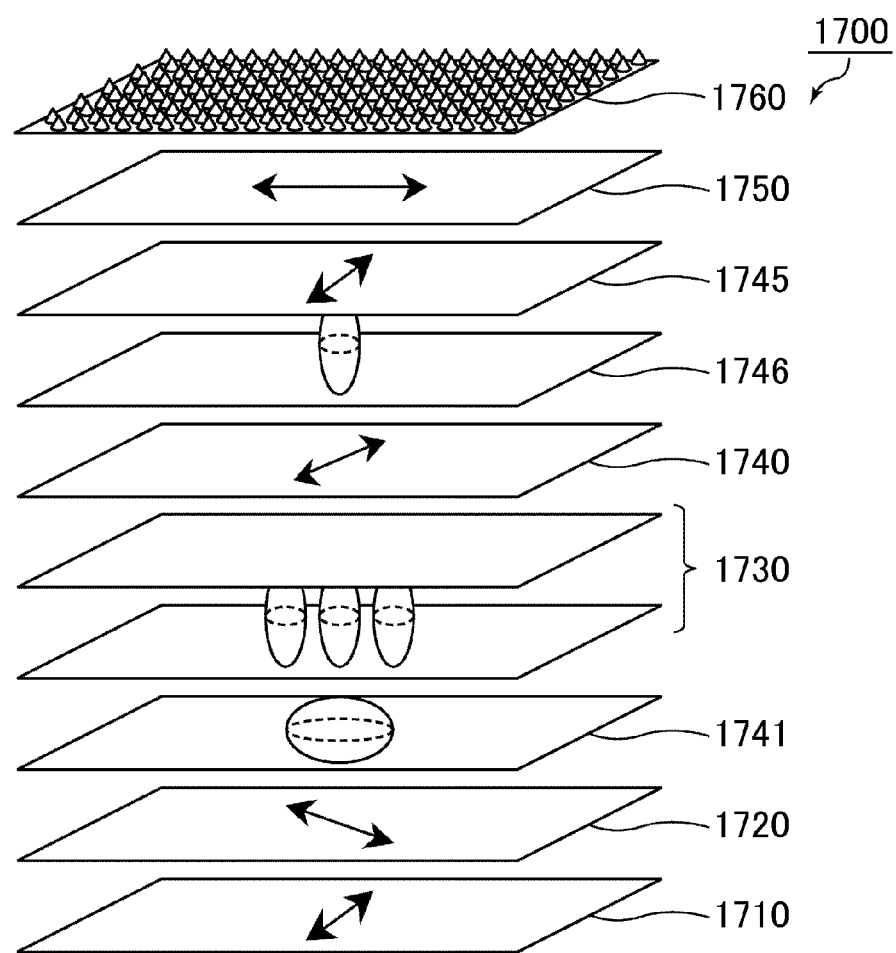
FIG. 36 is an exploded perspective view showing the structure of the circularly polarized light VA-mode liquid crystal display device shown in FIG. 10 including a moth-eye film.
Figure 37:
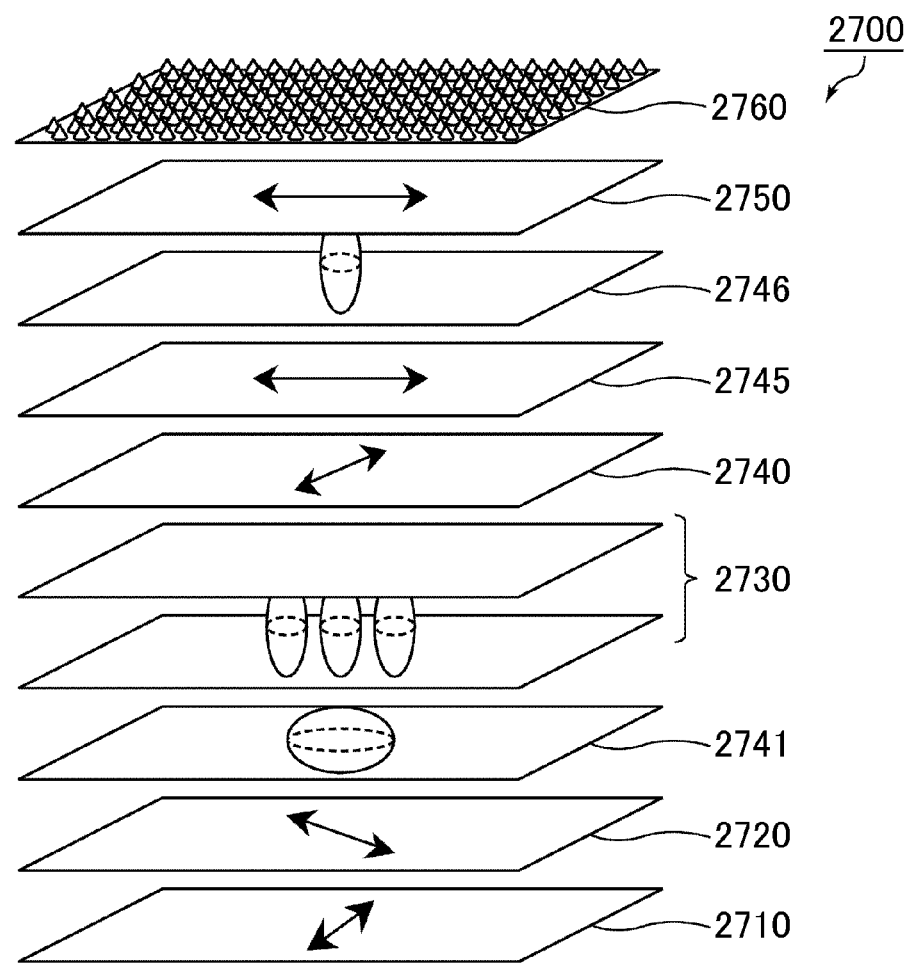
FIG. 37 is an exploded perspective view showing the structure of the circularly polarized light VA-mode liquid crystal display device shown in FIG. 17 including a moth-eye film.

The moth-eye film can give an effect of reducing the reflectance when disposed on the interface of layers having different refractive indices. For example, in the structure shown in FIG. 10 or FIG. 17, internal reflection generated inwardly the second polarizers 1050 or 2050 can be suppressed by a circularly polarizing plate formed by combination of the second polarizer 1050 or 2050 and the second λ/4 plate 1040 or 2040. Thus, in the case of disposing a moth-eye film in the structure of FIG. 10 or FIG. 17, for example, the moth-eye film is disposed on the display side (viewing side) of the second polarizer 1750 or 2750 as in the case of the moth-eye film 1760 or 2760 shown in FIG. 36 or FIG. 37. With a member such as a protection plate is disposed on the display side of the second polarizer 1750 or 2750 to form multiple interfaces, a moth-eye film may be formed on the respective interfaces, and it is preferably disposed at least on the surface exposed to the outside of the liquid crystal display device.

Specific examples of the moth-eye film include a resin film having multiple substantially conic protrusions which are about 200 nm in height and are disposed at intervals between the apexes of about 200 nm.

The moth-eye film may be produced by, for example, a technique of transferring the pattern of nanometer-order (1 to 1000 μm) protrusions and depressions engraved on a metal mold to a resin material applied onto a substrate, what is called a nano-imprinting technique. Examples of methods of curing a resin material in the nano-imprinting technique include a heat nano-imprinting technique and a UV nano-imprinting technique. The UV nano-imprinting technique is a technique in which a thin film of UV-curable resin is formed on a transparent substrate, a mold is pressed to the thin film, and then the thin film is irradiated with ultraviolet rays, thereby forming on the transparent substrate a thin film having a moth-eye structure whose pattern is one inverted from that of the mold.

In order to mass-produce thin films each having a moth-eye structure at low cost by a nano-imprinting technique, roll-to-roll treatment is more preferred than batch treatment. The roll-to-roll treatment makes it possible to continuously form thin films each having a moth-eye structure using a metal mold roll. Examples of such a metal mold roll include those having nanometer-order depressions formed by anode oxidation on the ground periphery of a columnar or cylindrical aluminum pipe polished. The anode oxidation allows for formation of substantially uniform nanometer-order depressions on the surface at random, thereby forming a seamless moth-eye structure on the surface of a metal mold roll, which is suitable for continuous production.

Any of the modes of the aforementioned examples may be appropriately combined with each other within the scope which does not deviate from the spirit of the present invention.

REFERENCE SIGNS LIST

100: circularly polarized light VA-mode liquid crystal display device
110: first polarizer
111: absorption axis of first polarizer
120: first λ/4 plate
121: the slow axis of the first λ/4 plate
130: VA-mode liquid crystal cell
140: second λ/4 plate
141: the slow axis of the second λ/4 plate
150: second polarizer
151: absorption axis of second polarizer
200: circularly polarized light VA-mode liquid crystal display device
210: first polarizer
220: first λ/4 plate
230: VA-mode liquid crystal cell
235: Type-III birefringent layer
240: second λ/4 plate
250: second polarizer
1000: circularly polarized light VA-mode liquid crystal display device
1010: first polarizer
1020: first λ/4 plate
1030: VA-mode liquid crystal cell
1040: second λ/4 plate
1041: Type-III birefringent layer
1045: Type-I birefringent layer
1046: Type-IV birefringent layer
1050: second polarizer
1100: circularly polarized light VA-mode liquid crystal display device
1110: first polarizer
1120: first λ/4 plate
1130: VA-mode liquid crystal cell
1140: second λ/4 plate
1141: Type-III birefringent layer
1145: Type-I birefringent layer
1146: Type-IV birefringent layer
1150: second polarizer
1200: circularly polarized light VA-mode liquid crystal display device
1210: first polarizer
1220: first λ/4 plate
1230: VA-mode liquid crystal cell
1240: second λ/4 plate
1245: Type-I birefringent layer
1246: Type-IV birefringent layer
1250: second polarizer
1300: circularly polarized light VA-mode liquid crystal display device
1310: first polarizer
1320: first λ/4 plate
1330: VA-mode liquid crystal cell
1340: second λ/4 plate
1341: Type-III birefringent layer
1345: Type-I birefringent layer
1346: Type-IV birefringent layer
1350: second polarizer
1400: circularly polarized light VA-mode liquid crystal display device
1410: first polarizer
1420: first λ/4 plate
1430: VA-mode liquid crystal cell
1440: second λ/4 plate
1441: Type-III birefringent layer
1445: Type-I birefringent layer
1446: Type-IV birefringent layer
1450: second polarizer
1500: circularly polarized light VA-mode liquid crystal display device
1510: first polarizer
1520: first λ/4 plate
1530: VA-mode liquid crystal cell
1540: second λ/4 plate
1545: Type-I birefringent layer
1546: Type-IV birefringent layer
1550: second polarizer
1600: circularly polarized light VA-mode liquid crystal display device
1610: first polarizer
1620: first λ/4 plate
1630: VA-mode liquid crystal cell
1640: second λ/4 plate
1645: Type-I birefringent layer
1646: Type-IV birefringent layer
1650: second polarizer
1700: circularly polarized light VA-mode liquid crystal display device
1710: first polarizer 1720: first λ/4 plate
1730: VA-mode liquid crystal cell
1740: second λ/4 plate
1741: Type-III birefringent layer
1745: Type-I birefringent layer
1746: Type-IV birefringent layer
1750: second polarizer
1760: moth-eye film
1761: protrusions
1762: film base
2000: circularly polarized light VA-mode liquid crystal display device
2010: first polarizer
2020: first λ/4 plate
2030: VA-mode liquid crystal cell
2040: second λ/4 plate
2041: Type-III birefringent layer
2045: Type-I birefringent layer
2046: Type-IV birefringent layer
2050: second polarizer
2100: circularly polarized light VA-mode liquid crystal display device
2110: first polarizer
2120: first λ/4 plate
2130: VA-mode liquid crystal cell
2140: second λ/4 plate
2141: Type-III birefringent layer
2145: Type-I birefringent layer
2146: Type-IV birefringent layer
2150: second polarizer
2200: circularly polarized light VA-mode liquid crystal display device
2210: first polarizer
2220: first λ/4 plate
2230: VA-mode liquid crystal cell
2240: second λ/4 plate
2245: Type-I birefringent layer
2246: Type-IV birefringent layer
2250: second polarizer
2300: circularly polarized light VA-mode liquid crystal display device
2310: first polarizer
2320: first λ/4 plate
2330: VA-mode liquid crystal cell
2340: second λ/4 plate
2341: Type-III birefringent layer
2345: Type-I birefringent layer
2346: Type-IV birefringent layer
2350: second polarizer
2400: circularly polarized light VA-mode liquid crystal display device
2410: first polarizer
2420: first λ/4 plate
2430: VA-mode liquid crystal cell
2440: second λ/4 plate
2441: Type-III birefringent layer
2445: Type-I birefringent layer
2446: Type-IV birefringent layer
2450: second polarizer
2500: circularly polarized light VA-mode liquid crystal display device
2510: first polarizer
2520: first λ/4 plate
2530: VA-mode liquid crystal cell
2540: second λ/4 plate
2545: Type-I birefringent layer
2546: Type-IV birefringent layer
2550: second polarizer
2600: circularly polarized light VA-mode liquid crystal display device
2610: first polarizer
2620: first λ/4 plate
2630: VA-mode liquid crystal cell
2640: second λ/4 plate
2650: second polarizer
2700: circularly polarized light VA-mode liquid crystal display device
2710: first polarizer
2720: first λ/4 plate
2730: VA-mode liquid crystal cell
2740: second λ/4 plate
2741: Type-III birefringent layer
2745: Type-I birefringent layer
2746: Type-IV birefringent layer
2750: second polarizer
2760: moth-eye film
2761: protrusions
2762: film base

The invention claimed is:

1. A liquid crystal display device comprising, in the order set forth:
   a first polarizer;
   a first Type-I birefringent layer with an in-plane phase differene of λ/4;
   a liquid crystal cell including a pair of substrates opposed to each other and a liquid crystal layer between the pair of substrates;
   a second Type-I birefringent layer with an in-plane phase difference of λ/4;
   a Type-IV birefringent layer;
   a third Type-I birefringent layer; and
   a second polarizer, where the Type-I birefringent layer is a birefringent layer satisfying nx>ny≥nz, and the Type-IV birefringent layer is a birefringent layer satisfying nx≈ny≤nz,
   an in-plane slow axis of the first Type-I birefringent layer defining an angle of about 45° with an absorption axis of the first polarizer,
   an in-plane slow axis of the second Type-I birefringent layer being substantially perpendicular to the in-plane slow axis of the first Type-I birefringent layer,
   an absorption axis of the second polarizer being substantially perpendicular to the absorption axis of the first polarizer,
   an in-plane slow axis of the third Type-I birefringent layer being substantially perpendicular to the absorption axis of the second polarizer,
   the liquid crystal cell satisfying a phase difference Rlc in the perpendicular direction of 275 nm or greater, and
   the liquid crystal display device displaying a black screen by aligning liquid crystal molecules in the liquid crystal layer in the direction substantially vertical to the substrate surface.

2. The liquid crystal display device according to claim 1, wherein the second Type-I birefringent layer and the first Type-I birefringent layer have different Nz coefficients.

3. The liquid crystal display device according to claim 2, wherein one of the first Type-I birefringent layer and the second Type-I birefringent layer has an Nz coefficient of 2 or greater, and
   the other of the first Type-I birefringent layer and the second Type-I birefringent layer has an Nz coefficient of not smaller than 1 but smaller than 2.

4. The liquid crystal display device according to claim 2, wherein one of the first and second Type-I birefringent layers with a greater Nz coefficient is disposed on a back side of the liquid crystal cell.

5. The liquid crystal display device according to claim 1, wherein the Type-IV birefringent layer and the third Type-I birefringent layer are disposed on a back side of the liquid crystal cell.

6. The liquid crystal display device according to claim 1, further comprising
a surface-treated layer on a viewing side of the second polarizer,
wherein the first Type-I birefringent layer has a greater Nz coefficient than the second Type-I birefringent layer.

7. The liquid crystal display device according to claim 1, further comprising
at least one Type-III birefringent layer at least between the first Type-I birefringent layer and the liquid crystal cell or between the liquid crystal cell and the second Type-I birefringent layer, where the Type-III birefringent layer is a birefringent layer satisfying nx≈ny≥nz.

8. The liquid crystal display device according to claim 7, wherein the at least one Type-III birefringent layer is disposed on a back side of the liquid crystal cell.

9. The liquid crystal display device according to claim 7, satisfying the following formulas (1) to (3):

$$1.0 \leq Nzq \leq 2.9 \quad (1)$$

$$(169 \text{ nm} \times Nzq - 81 \text{ nm}) - 50 \text{ nm} \leq Rlc + R3 \quad (2)$$

$$Rlc + R3 \leq (169 \text{ nm} \times Nzq - 81 \text{ nm}) + 50 \text{ nm} \quad (3)$$

wherein Nzq represents an average value of Nz coefficients of the first and second Type-I birefringent layers; Rlc represents a phase difference in the perpendicular direction of the liquid crystal cell displaying a black screen; and R3 represents the sum of phase differences in the perpendicular direction of the at least one Type-III birefringent layer.

10. The liquid crystal display device according to claim 9, satisfying the following formulas (4) to (7):

$$108.3 \times Nzq + (-10.7 \times Nz12 + 100.4 \times Nz1 - 61.5) - 50 \text{ nm} \leq R4 \quad (4)$$

$$R4 \leq 108.3 \times Nzq + (-10.7 \times Nz12 + 100.4 \times Nz1 - 61.5) + 50 \text{ nm} \quad (5)$$

$$13 \times Nz12 - 83 \times Nz1 + 208 - 30 \text{ nm} \leq R1 \quad (6)$$

$$R1 \leq 13 \times Nz12 - 83 \times Nz1 + 208 + 30 \text{ nm} \quad (7)$$

wherein Nz1 represents an Nz coefficient of the third Type-I birefringent layer; R1 represents an in-plane phase difference value of the third Type-I birefringent layer; and R4 represents a phase difference in the perpendicular direction of the Type-IV birefringent layer.

11. The liquid crystal display device according to claim 1, comprising:
no Type-III birefringent layer between the first Type-I birefringent layer and the liquid crystal cell nor between the liquid crystal cell and the second Type-I birefringent layer, where the Type-III birefringent layer is a birefringent layer satisfying nx≈ny≥nz.

12. The liquid crystal display device according to claim 11, satisfying the following formulas (1), (8), and (9):

$$1.0 \leq Nzq \leq 2.9 \quad (1)$$

$$(169 \text{ nm} \times Nzq - 81 \text{ nm}) - 50 \text{ nm} \leq Rlc + R3 \quad (8)$$

$$Rlc + R3 \leq (169 \text{ nm} \times Nzq - 81 \text{ nm}) + 50 \text{ nm} \quad (9)$$

wherein Nzq represents an average value of Nz coefficients of the first and second Type-I birefringent layers; and Rlc represents a phase difference in the perpendicular direction of the liquid crystal cell displaying a black screen.

13. The liquid crystal display device according to claim 12, satisfying the following formulas (4) to (7):

$$108.3 \times Nzq + (-10.7 \times Nz12 + 100.4 \times Nz1 - 61.5) - 50 \text{ nm} \leq R4 \quad (4)$$

$$R4 \leq 108.3 \times Nzq + (-10.7 \times Nz12 + 100.4 \times Nz1 - 61.5) + 50 \text{ nm} \quad (5)$$

$$13 \times Nz12 - 83 \times Nz1 + 208 - 30 \text{ nm} \leq R1 \quad (6)$$

$$R1 \leq 13 \times Nz12 - 83 \times Nz1 + 208 + 30 \text{ nm} \quad (7)$$

wherein Nz1 represents an Nz coefficient of the third Type-I birefringent layer; R1 represents an in-plane phase difference value of the third Type-I birefringent layer; and R4 represents a phase difference in the perpendicular direction of the Type-IV birefringent layer.

14. A liquid crystal display device comprising, in the order set forth:
a first polarizer;
a first Type-I birefringent layer with an in-plane phase difference of λ/4;
a liquid crystal cell including a pair of substrates opposed to each other and a liquid crystal layer disposed between the pair of substrates;
a second Type-I birefringent layer with an in-plane phase difference of λ/4;
a third Type-I birefringent layer;
a Type-IV birefringent layer; and
a second polarizer, wherein
the Type-I birefringent layer is a birefringent layer satisfying nx>ny≥nz, and the Type-IV birefringent layer is a birefringent layer satisfying nx≈ny≤nz,
an in-plane slow axis of the first Type-I birefringent layer forming an angle of about 45° with an absorption axis of the first polarizer,
an in-plane slow axis of the second Type-I birefringent layer being substantially perpendicular to the in-plane slow axis of the first Type-I birefringent layer,
an absorption axis of the second polarizer being substantially perpendicular to the absorption axis of the first polarizer,
an in-plane slow axis of the third Type-I birefringent layer being substantially parallel with the absorption axis of the second polarizer, and
the liquid crystal display device displaying a black screen by aligning liquid crystal molecules in the liquid crystal layer in the direction substantially vertical to the substrate surface,
the second Type-I birefringent layer and the first Type-I birefringent layer have different Nz coefficients,
one of the first Type-I birefringent layer and the second Type-I birefringent layer has an Nz coefficient of 2 or greater, and the other of the first Type-I birefringent layer and the second Type-I birefringent layer has an Nz coefficient of not smaller than 1 but smaller than 2.

15. A liquid crystal display device comprising, in the order set forth:
   a first polarizer;
   a first Type-I birefringent layer with an in-plane phase difference of $\lambda/4$;
   a liquid crystal cell including a pair of substrates opposed to each other and a liquid crystal layer disposed between the pair of substrates;
   a second Type-I birefringent layer with an in-plane phase difference of $\lambda/4$;
   a third Type-I birefringent layer;
   a Type-IV birefringent layer;
   a second polarizer; and
   a surface-treated layer on a viewing side of the second polarizer, wherein
   the Type-I birefringent layer is a birefringent layer satisfying $nx>ny \geq nz$, and the Type-IV birefringent layer is a birefringent layer satisfying $nx \approx ny \leq nz$,
   an in-plane slow axis of the first Type-I birefringent layer forming an angle of about 45° with an absorption axis of the first polarizer,
   an in-plane slow axis of the second Type-I birefringent layer being substantially perpendicular to the in-plane slow axis of the first Type-I birefringent layer,
   an absorption axis of the second polarizer being substantially perpendicular to the absorption axis of the first polarizer,
   an in-plane slow axis of the third Type-I birefringent layer being substantially parallel with the absorption axis of the second polarizer, and
   the liquid crystal display device displaying a black screen by aligning liquid crystal molecules in the liquid crystal layer in the direction substantially vertical to the substrate surface, and
   the first Type-I birefringent layer has a great Nz coefficient than the second Type-I birefringent layer.

* * * * *